United States Patent
Kawawa et al.

(10) Patent No.: US 11,050,930 B2
(45) Date of Patent: Jun. 29, 2021

(54) IMAGING APPARATUS, IMAGING METHOD, AND NON-TRANSITORY COMPUTER-READABLE MEDIUM FOR OBTAINING A HIGH RESOLUTION IMAGE IN AT LEAST TWO DIFFERENT MODES

(71) Applicant: Olympus Corporation, Hachioji (JP)

(72) Inventors: Takeshi Kawawa, Hachioji (JP); Satoshi Miyazaki, Tokyo (JP); Keiji Kunishige, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 16/698,832

(22) Filed: Nov. 27, 2019

(65) Prior Publication Data
US 2020/0195843 A1 Jun. 18, 2020

(30) Foreign Application Priority Data
Dec. 13, 2018 (JP) .............................. JP2018-233856

(51) Int. Cl.
*H04N 5/232* (2006.01)
*H04N 5/265* (2006.01)

(52) U.S. Cl.
CPC ....... *H04N 5/23232* (2013.01); *H04N 5/2327* (2013.01); *H04N 5/23216* (2013.01);
(Continued)

(58) Field of Classification Search
CPC ........... H04N 5/23232; H04N 5/23267; H04N 5/265; H04N 5/23287; H04N 5/23216; H04N 5/232941; H04N 5/2327; H04N 5/23245; H04N 5/23258; H04N 5/2354; H04N 5/232
See application file for complete search history.

(56) References Cited

U.S. PATENT DOCUMENTS

2006/0238621 A1* 10/2006 Okubo ............... H04N 5/23258
  348/208.99
2007/0058957 A1* 3/2007 Hosoda ............. H04N 5/23287
  396/55
(Continued)

FOREIGN PATENT DOCUMENTS

JP 5914716 B1 5/2016
JP 2016-152602 A 8/2016

*Primary Examiner* — Padma Haliyur
(74) *Attorney, Agent, or Firm* — John C. Pokotylo; Pokotylo Patent Services

(57) ABSTRACT

An imaging apparatus includes: an imager including an imaging sensor configured to acquire an optical image; and a processor configured to: perform pixel displacement to displace a positional relationship between a subject and the imager in a unit of a pixel pitch or less; detect an amount and a direction of a shake; perform shake correction to correct the positional relationship between the subject and the imager based on a detection result; perform first imaging for a first predetermined number of times for each position of the pixel displacement to generate a first group of images; combine the images of the first group to generate a first high-resolution image; perform second imaging for a second predetermined number of times for each position of the pixel displacement to generate a second group of images; and combine the images of the second group to generate a second high-resolution image.

15 Claims, 65 Drawing Sheets

(52) U.S. Cl.
CPC ..... *H04N 5/23245* (2013.01); *H04N 5/23267* (2013.01); *H04N 5/23287* (2013.01); *H04N 5/232941* (2018.08); *H04N 5/265* (2013.01)

(56) References Cited

U.S. PATENT DOCUMENTS

| | | | |
|---|---|---|---|
| 2007/0159535 A1* | 7/2007 | Kumagai | H04N 9/097 348/218.1 |
| 2007/0291114 A1* | 12/2007 | Oshima | H04N 5/23267 348/126 |
| 2009/0009636 A1* | 1/2009 | Endo | H04N 5/2354 348/241 |
| 2016/0248978 A1 | 8/2016 | Nishihara | |
| 2019/0199930 A1* | 6/2019 | Noguchi | H04N 5/23261 |
| 2019/0296062 A1* | 9/2019 | Terauchi | H04N 5/367 |

* cited by examiner

G PIXEL

R PIXEL

B PIXEL

CAPTURE FIRST IMAGE

CAPTURE SECOND IMAGE AFTER PERFORMING
UPWARD DISPLACEMENT OF ONE PIXEL

CAPTURE THIRD IMAGE AFTER PERFORMING
RIGHTWARD DISPLACEMENT OF ONE PIXEL

CAPTURE FOURTH IMAGE AFTER PERFORMING
DOWNWARD DISPLACEMENT OF ONE PIXEL

CAPTURE FIFTH IMAGE AFTER PERFORMING LEFTWARD
AND UPWARD DISPLACEMENT OF 0.5 PIXEL

CAPTURE SIXTH IMAGE AFTER PERFORMING
UPWARD DISPLACEMENT OF ONE PIXEL

CAPTURE SEVENTH IMAGE AFTER PERFORMING
RIGHTWARD DISPLACEMENT OF ONE PIXEL

CAPTURE EIGHTH IMAGE AFTER PERFORMING
DOWNWARD DISPLACEMENT OF ONE PIXEL

G PIXEL

R PIXEL

B PIXEL

CAPTURE FIRST IMAGE

CAPTURE SECOND IMAGE AFTER PERFORMING
UPWARD DISPLACEMENT OF ONE PIXEL

CAPTURE THIRD IMAGE AFTER PERFORMING
RIGHTWARD DISPLACEMENT OF ONE PIXEL

CAPTURE FOURTH IMAGE AFTER PERFORMING
DOWNWARD DISPLACEMENT OF ONE PIXEL

G PIXEL

R PIXEL

B PIXEL

CAPTURE FIRST IMAGE

CAPTURE SECOND IMAGE AFTER PERFORMING
UPWARD DISPLACEMENT OF ONE PIXEL

G PIXEL

R, B PIXEL

CAPTURE FIRST IMAGE EIGHT TIMES

CAPTURE SECOND IMAGE EIGHT TIMES AFTER PERFORMING
UPWARD DISPLACEMENT OF ONE PIXEL

CAPTURE THIRD IMAGE EIGHT TIMES AFTER PERFORMING
RIGHTWARD DISPLACEMENT OF ONE PIXEL

CAPTURE FOURTH IMAGE EIGHT TIMES AFTER PERFORMING
DOWNWARD DISPLACEMENT OF ONE PIXEL

CAPTURE FIFTH IMAGE EIGHT TIMES AFTER PERFORMING
LEFTWARD AND UPWARD DISPLACEMENT OF 0.5 PIXEL

CAPTURE SIXTH IMAGE EIGHT TIMES AFTER
PERFORMING UPWARD DISPLACEMENT OF ONE PIXEL

CAPTURE SEVENTH IMAGE EIGHT TIMES AFTER
PERFORMING RIGHTWARD DISPLACEMENT OF ONE PIXEL

CAPTURE EIGHTH IMAGE EIGHT TIMES AFTER PERFORMING
DOWNWARD DISPLACEMENT OF ONE PIXEL

G PIXEL

R PIXEL

B PIXEL

FIG.57
| HIGH RESOLUTION CAPTURE FLAG | HIGH RESOLUTION CAPTURE MODE | DISPLAY ICON |
|---|---|---|
| 1 | TRIPOD HIGH RESOLUTION CAPTURE | 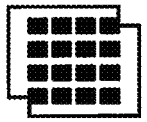 |
| 2 | HANDHELD HIGH RESOLUTION CAPTURE | 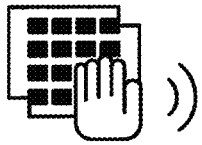 |
| 3 | AUTO-SELECT HIGH RESOLUTION CAPTURE |  |

FIG.59

| NUMBER-OF-CAPTURE FLAG | OPTIONS FOR NUMBER OF TIMES |
|---|---|
| 1 | 2 |
| 2 | 4 |
| 3 | 8 |
| 4 | 16=(2×8) |
| 5 | 32=(4×8) |
| 6 | 64=(8×8) |
| 7 | AUTO (2 TO 64) |

FIG.61

| HIGH RESOLUTION CAPTURE IMAGE QUALITY MODE FLAG | HIGH RESOLUTION CAPTURE IMAGE QUALITY MODE |
|---|---|
| 1 | 25M F |
| 2 | 50M F |
| 3 | 25M F +RAW |
| 4 | 50M F +RAW |

FIG.63

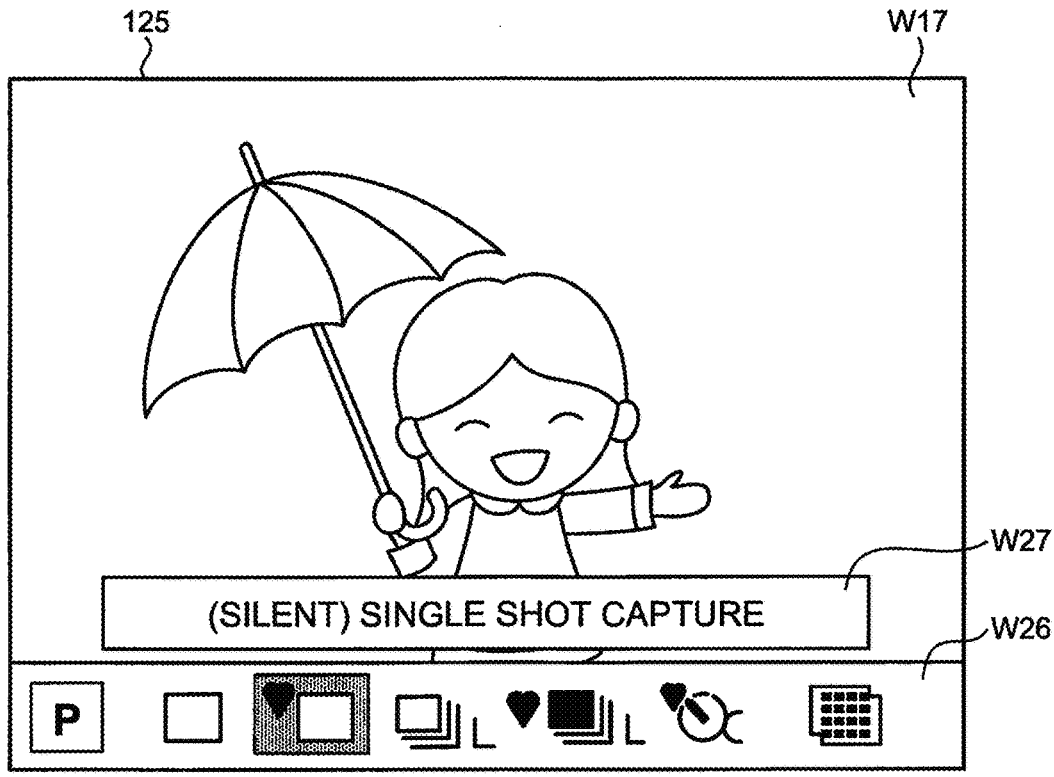

FIG.64

| DRIVE MODE FLAG | DRIVE MODE | | SHUTTER MODE TO BE USED |
|---|---|---|---|
| 1 | ☐ | (MECHANICAL) SINGLE SHOT CAPTURE | MECHANICAL SHUTTER |
| 2 | ♥☐ | (SILENT) SINGLE SHOT CAPTURE | ELECTRONIC ROLLING SHUTTER |
| 3 | ❏L | (MECHANICAL) BURST CAPTURE L | MECHANICAL SHUTTER |
| 4 | ♥■L | NO TIME LAG BURST CAPTURE L | ELECTRONIC ROLLING SHUTTER |
| 5 | ♥⏱ | (SILENT) CUSTOM SELF | ELECTRONIC ROLLING SHUTTER |
| 6 | | HIGH RESOLUTION CAPTURE | ELECTRONIC ROLLING SHUTTER |

FIG.69

| IS MODE FLAG | SHAKE CORRECTION MODE | |
|---|---|---|
| 0 | IS-OFF | SHAKE CORRECTION OFF |
| 1 | IS-ON | SHAKE CORRECTION ON |

IMAGING APPARATUS, IMAGING METHOD, AND NON-TRANSITORY COMPUTER-READABLE MEDIUM FOR OBTAINING A HIGH RESOLUTION IMAGE IN AT LEAST TWO DIFFERENT MODES

CROSS REFERENCES TO RELATED APPLICATIONS

This application is based upon and claims the benefit of priority from Japanese Patent Application No. 2018-233856, filed on Dec. 13, 2018, the entire contents of which are incorporated herein by reference.

BACKGROUND

1. Technical Field

The present disclosure relates to an imaging apparatus.

2. Related Art

In the related art, an image capturing method of continuously performing imaging while accurately displacing a relative positional relationship between an optical image of a subject and an imaging sensor with accuracy of one pixel or less and combining a plurality of obtained images to generate a high-resolution image has been known (for example, see Japanese Patent No. 5914716). Hereinafter, this image capturing method will be referred to as high resolution capture.

Further, an imaging technique of driving a lens or the imaging sensor to perform correction so as to prevent displacement of a relative positional relationship between an optical image of an exposed subject and the imaging sensor due to a shake or the like has been known. Hereinafter, this imaging technique will be referred to as a shake correction function.

In general, the shake correction function has certain accuracy with which the relative positional relationship between the optical image of the subject and the imaging sensor can be maintained such that displacement due to a shake falls within 5 pixels. Therefore, if the high resolution capture is used in a situation affected by a shake, it is difficult to achieve an effect to improve resolution, and an image defect called artifact occurs. Therefore, the high resolution capture is a function that can be limitedly used in a situation unaffected by a shake by fixing the imaging apparatus onto a tripod or placing the imaging apparatus on a table, and, an imaging target may be, as one example, a motionless object, such as a landscape or a building.

The shake includes a shake of the imaging apparatus due to vibration transmitted to the apparatus, in addition to vibration transmitted from a photographer or an operator.

Further, even when the motionless object is to be captured, in some cases, capture using a tripod may be prohibited, capture may be performed in a situation, an environment, or a place in which it is difficult to use a tripod, or it may be difficult to fix the imaging apparatus due to some restrictions or some reason although it is ideal to fix the imaging apparatus by using a fixing method other than the tripod, such as by mounting the imaging apparatus on a dedicated holder or fixing the imaging apparatus onto an arm extended from a robot. For these reasonings, the tripod is not unused or the imaging apparatus cannot be fixed, and capture may be performed in a case in which the imaging apparatus is held by hand, without using the tripod or without fixing the the imaging apparatus.

SUMMARY

According to one aspect of the present disclosure, there is provided an imaging apparatus including: an imager including an imaging sensor configured to acquire an optical image of a subject; and a processor including hardware, the processor being configured to: perform pixel displacement to displace a positional relationship between the subject and the imager in a unit of a pixel pitch or less; detect an amount and a direction of a shake; perform shake correction to correct the positional relationship between the subject and the imager based on a detection result of the amount and the direction of the shake; perform first imaging for a first predetermined number of times for each position of the pixel displacement to generate a first group of images; combine the images of the first group to generate a first high-resolution image; perform second imaging for a second predetermined number of times for each position of the pixel displacement to generate a second group of images; and combine the images of the second group to generate a second high-resolution image.

The above and other features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 57 is a diagram illustrating an example of a high resolution capture flag and a display icon;

FIG. 59 is a diagram illustrating an example of a number-of-capture flag;

FIG. 61 is a diagram illustrating an example of a high resolution capture image-quality mode flag;

FIG. 63 is a diagram illustrating an example of a drive mode selection menu;

FIG. 64 is a diagram illustrating an example of a drive mode flag;

FIG. 69 is a diagram illustrating an example of an IS mode flag.

DETAILED DESCRIPTION

Figure 1:
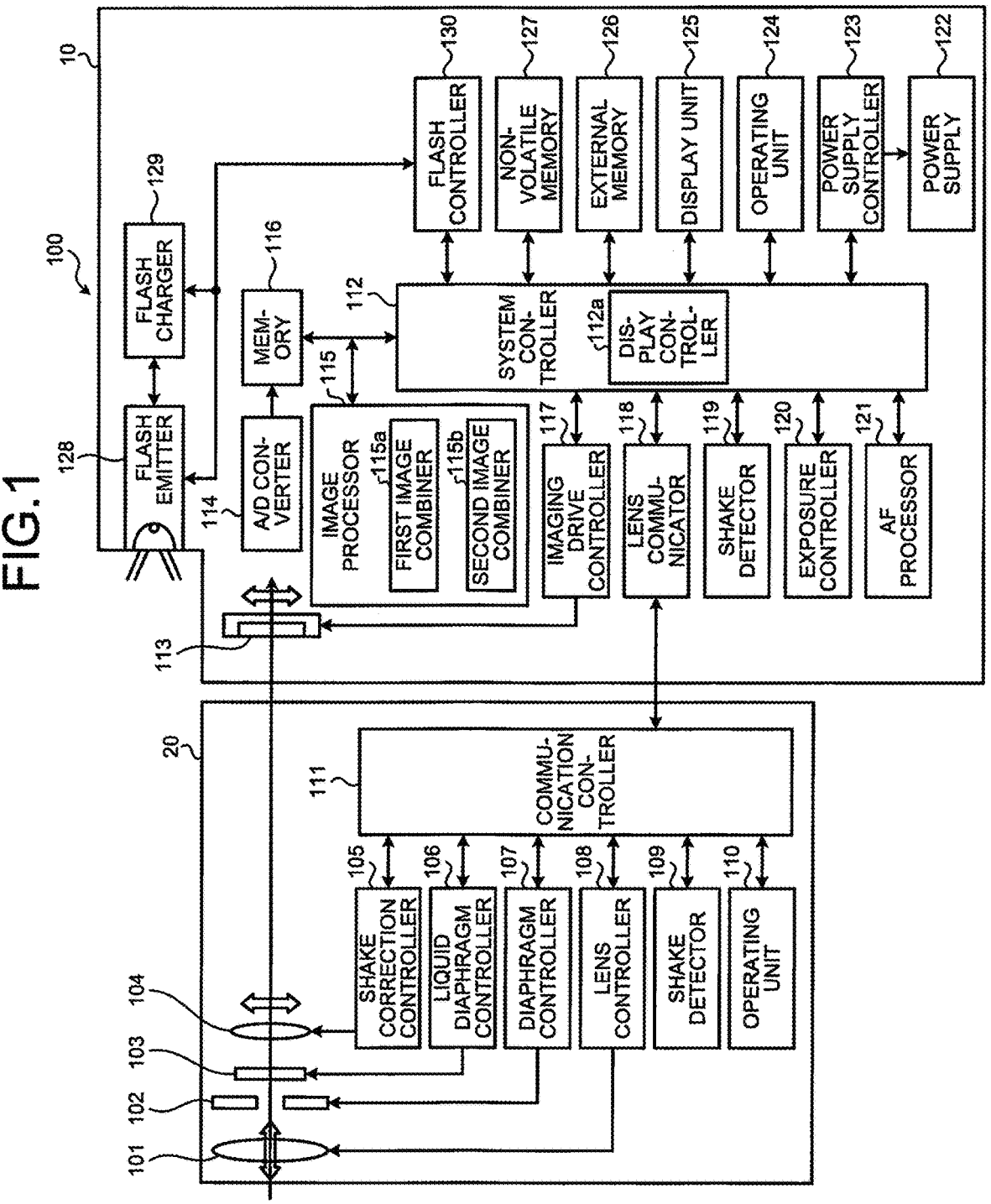
FIG. 1 is a diagram illustrating a configuration of an imaging apparatus according to a first embodiment.

FIG. 1 is a diagram illustrating a configuration of an imaging apparatus according to a first embodiment. As illustrated in FIG. 1, an imaging apparatus 100 according to the first embodiment is assumed as a single-lens reflex camera including a camera main body 10 and a lens part 20. The imaging apparatus 100 may be a fixed lens camera.

The lens part 20 includes an imaging lens 101, a diaphragm 102, a liquid diaphragm 103, and a shake correction lens 104.

The imaging lens 101 is an optical system for forming a subject image. The imaging lens 101 may include a zoom optical system or a focus adjustment system.

The diaphragm 102 and the liquid diaphragm 103 adjust an incident amount of a subject light flux.

The shake correction lens 104 moves in a direction perpendicular to an optical axis so as to cancel out vibration that has occurred in the imaging apparatus 100.

The lens part 20 further includes a shake correction controller 105, a liquid diaphragm controller 106, a diaphragm controller 107, a lens controller 108, a shake detector 109, an operating unit 110, and a communication controller 111. The lens part 20 is realized by various arithmetic circuits, such as an application specific integrated circuit (ASIC) and a field programmable gate array (FPGA), including a central process unit (CPU) or the like, and a storage device, such as a memory. Each of blocks that control the lens part 20 is realized by a program executed by an arithmetic circuit. In other words, the lens part 20 functions as the shake correction controller 105, the liquid diaphragm controller 106, the diaphragm controller 107, the lens controller 108, and the communication controller 111 through execution of the programs.

The shake correction controller 105 controls movement of the shake correction lens 104 in the direction perpendicular to the optical axis in accordance with an amount of a shake.

The liquid diaphragm controller 106 that changes transmittance controls the liquid diaphragm 103 in accordance with an instruction given by the camera main body 10, in order to adjust the incident amount of the subject light flux.

Similarly, the diaphragm controller 107 controls an amount of opening of the diaphragm 102 in accordance with an instruction given by the camera main body 10, in order to adjust the incident amount of the subject light flux. However, because the diaphragm 102 generates drive sounds, the liquid diaphragm 103 that operates in silence is used to adjust the amount of light while movies are captured.

The lens controller 108 moves a predetermined lens included in the imaging lens 101 in accordance with an instruction given by the camera main body 10 as to a zooming movement or a focus adjustment.

The shake detector 109 detects an amount and a direction of a shake applied to the lens part 20.

The operating unit 110 is a button for manually adjusting focus or the like, which is provided in the lens part 20.

The communication controller 111 controls communication between the lens part 20 and the camera main body 10.

The camera main body 10 includes a system controller 112, an imager 113, an analog-to-digital (A/D) converter 114, an image processor 115, a memory 116, an imaging drive controller 117, a lens communicator 118, a shake detector 119, an exposure controller 120, an autofocus (AF) processor 121, a power supply 122, a power supply controller 123, an operating unit 124, a display unit 125, an external memory 126, anon-volatile memory 127, a flash emitter 128, a flash charger 129, and a flash controller 130. The camera main body 10 is realized by various arithmetic circuits, such as an ASIC and an FPGA, including a CPU or the like, and a storage device, such as a memory. Each of blocks that control the camera main body 10 is realized by a program executed by an arithmetic circuit. In other words, the camera main body 10 functions as the system controller 112, the imaging drive controller 117, the exposure controller 120, the AF processor 121, the power supply controller 123, and the flash controller 130 through execution of the programs.

The system controller 112 is a control unit that integrally controls the imaging apparatus 100 and the camera main body 10. The system controller 112 reads a predetermined control program stored in the non-volatile memory 127 (to be described later) and executes various sequences. Further, the system controller 112 includes a display controller 112*a*. The display controller 112*a* controls display on the display unit 125.

The camera main body 10 includes the imager 113, the A/D converter 114, the image processor 115, and the memory 116.

Figure 2:
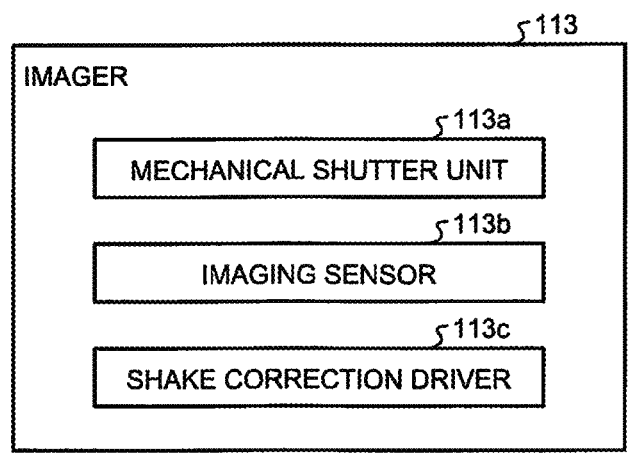
FIG. 2 is a diagram illustrating a configuration of an imager in FIG. 1.

FIG. 2 is a diagram illustrating a configuration of the imager in FIG. 1. As illustrated in FIG. 2, the imager 113 includes a mechanical shutter unit 113*a*, an imaging sensor 113*b*, and a shake correction driver 113*c*. The mechanical shutter unit 113*a* and the imaging sensor 113*b* are arranged on an optical axis of the imaging lens 101.

The mechanical shutter unit 113*a* adjusts an exposure time of the imaging sensor 113*b*. The mechanical shutter unit 113*a* opens and closes for a light flux of a subject image formed by the imaging lens 101, and is constituted by a well-known lens shutter, a well-known focal plane shutter, or the like. The mechanical shutter unit 113*a* may be substituted by an electronic shutter.

The imaging sensor 113*b* acquires an optical image of the subject. The imaging sensor 113*b* is a two-dimensional solid-state imaging sensor, such as a complementary metal oxide semiconductor (CMOS) image sensor or a charge coupled device (CCD) image sensor, and includes color filters, which are arranged in a Bayer array on the front thereof, and photoelectric conversion elements, such as photodiodes, which are arranged in accordance with the color filters. An imaging region is constituted by a group of pixels composed of each of the color filters and each of the corresponding photoelectric conversion elements. The imaging sensor 113*b* receives, by each of the pixels, light condensed by the imaging lens 101, converts the received light into a photocurrent, stores the photocurrent in a capacitor, and outputs the photocurrent as an analog voltage signal (image signal) to the A/D converter 114.

The shake correction driver 113*c* holds the imaging sensor 113*b* and moves in a direction in which a shake that has occurred in the camera main body 10 is canceled out, to thereby correct the shake.

The A/D converter 114 performs A/D conversion on the image signal subjected to the photoelectric conversion by the imaging sensor 113*b*, and outputs the image signal as image data to the memory 116. The memory 116 is constituted by a frame memory or a buffer memory, such as a video random access memory (VRAM) or a dynamic random access memory (DRAM). The memory 116 temporarily stores therein various kinds of data, such as image data obtained by the A/D converter 114 and image data processed by the image processor 115.

The image processor 115 is constituted by a graphics processing unit (GPU), a field programmable gate array (FPGA), or the like. The image processor 115 reads the image data that is temporarily stored in the memory 116, and performs image processing, such as white balance correction processing, synchronization processing, and color conversion processing, on the image data. Further, the image processor 115 compresses an image when recording the image in the external memory 126 (to be described later) and decompresses the compressed image data read from the external memory 126. Furthermore, the image processor 115 includes a first image combiner 115a and a second image combiner 115b.

The first image combiner 115a combines a first group of images captured by a first imaging drive controller 117c (to be described later) and generates a first high-resolution image.

The second image combiner 115b combines a second group of images captured by a second imaging drive controller 117d (to be described later) and generates a second high-resolution image.

Further, the camera main body 10 includes the imaging drive controller 117, the lens communicator 118, the shake detector 119, the exposure controller 120, and the AF processor 121.

Figure 3:
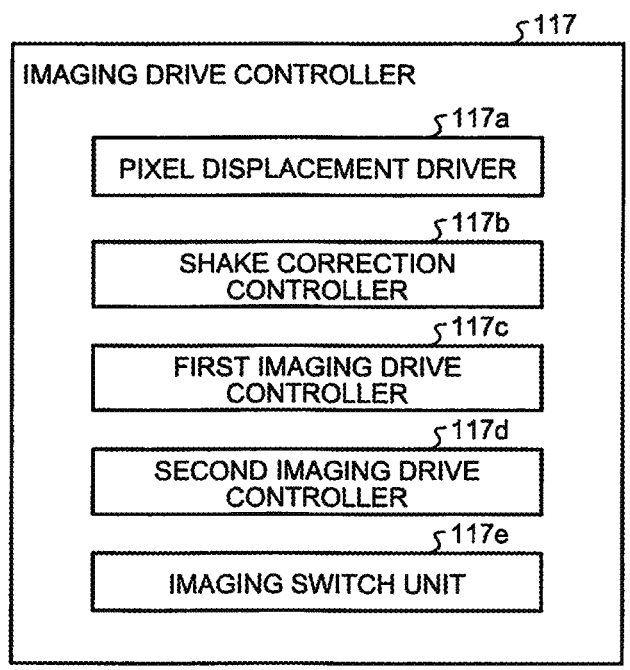
FIG. 3 is a diagram illustrating a configuration of an imaging drive controller in FIG. 1.

The imaging drive controller 117 controls various kinds of operation and drive of the imager 113. FIG. 3 is a diagram illustrating a configuration of the imaging drive controller in FIG. 1. As illustrated in FIG. 3, the imaging drive controller 117 includes a pixel displacement driver 117a, a shake correction controller 117b, the first imaging drive controller 117c, the second imaging drive controller 117d, and an imaging switch unit 117e.

The pixel displacement driver 117a performs pixel displacement to displace a positional relationship between the subject and the imaging sensor 113b in a unit of a pixel pitch or less (for example, a 0.5 pixel pitch or a 1 pixel pitch).

The shake correction controller 117b performs shake correction to correct the positional relationship between the subject and the imaging sensor 113b based on detection results obtained by the shake detector 109 and the shake detector 119.

The first imaging drive controller 117c performs imaging for a first predetermined number of times for each of positions that are adopted by the pixel displacement driver 117a in the pixel displacement (hereinafter, also referred to as "pixel displacement positions"), and generates a first group of images. Specifically, the first imaging drive controller 117c controls a first capture mode (hereinafter, referred to as "tripod high resolution capture") that is high resolution capture performed in a situation in which a tripod is used and a shake can hardly occur.

The second imaging drive controller 117d causes the shake correction controller 117b to perform shake correction, performs imaging for a second predetermined number of times for each of positions (pixel displacement positions) that are adopted by the pixel displacement driver 117a in the pixel displacement, and generates a second group of images. Specifically, the second imaging drive controller 117d controls a second capture mode (hereinafter, referred to as "handheld high resolution capture") that is high resolution capture performed in a situation in which a user holds the imaging apparatus 100 by hand without using a tripod and a shake occurs.

The imaging switch unit 117e switches between the imaging (tripod high resolution capture) performed by the first imaging drive controller 117c and the imaging (handheld high resolution capture) performed by the second imaging drive controller 117d. The imaging switch unit 117e may switch between the tripod high resolution capture and the handheld high resolution capture in response to an input of a user. Further, if a third capture mode (hereinafter, referred to as "auto-select high resolution capture") in which the tripod high resolution capture and the handheld high resolution capture are automatically switched is selected, the imaging switch unit 117e automatically switches between the tripod high resolution capture and the handheld high resolution capture in accordance with an amount and a direction of a shake, or the like. In this case, the amount of the shake may be detected immediately before or immediately after the user performs imaging by turning on (fully pressing) a capture start switch of a capture instruction operation button 124a (to be described later), may be detected when the user turns on (pressing halfway) a capture preparation switch of the capture instruction operation button 124a, or may be detected when the user presses a predetermined operation button. Further, it may be possible to detect the amount of the shake after a lapse of a predetermined time since a power supply of the imaging apparatus 100 is turned on or at predetermined time intervals, and then switch between the tripod high resolution capture and the handheld high resolution capture.

The lens communicator 118 performs communication with the communication controller 111 of the lens part 20 and controls data communication between the camera main body 10 and the lens part 20.

The shake detector 119 detects an amount and a direction of a shake in the camera main body 10.

The exposure controller 120 calculates subject luminance by using the image data that is temporarily stored in the memory 116. It is of course possible to calculate the subject luminance by using a dedicated photometric sensor.

The AF processor 121 extracts a high-frequency component from the image data that is temporarily stored in the memory 116, and detects a focus position based on a contrast value. Alternatively, the AF processor 121 processes a phase-difference detection pixel that is embedded in the imaging sensor 113b and calculates a focus position based on a distance measurement calculation result.

Further, the camera main body 10 includes the power supply 122, the power supply controller 123, the operating unit 124, the display unit 125, the external memory 126, and the non-volatile memory 127.

The power supply 122 is constituted by, for example, a power supply buttery, such as a secondary battery.

The power supply controller 123 causes a voltage of the power supply 122 to be set to a predetermined voltage, and supplies electric power to each of units. The power supply controller 123 detects a power supply voltage and a remaining amount of a battery included in the power supply 122.

Figure 4:
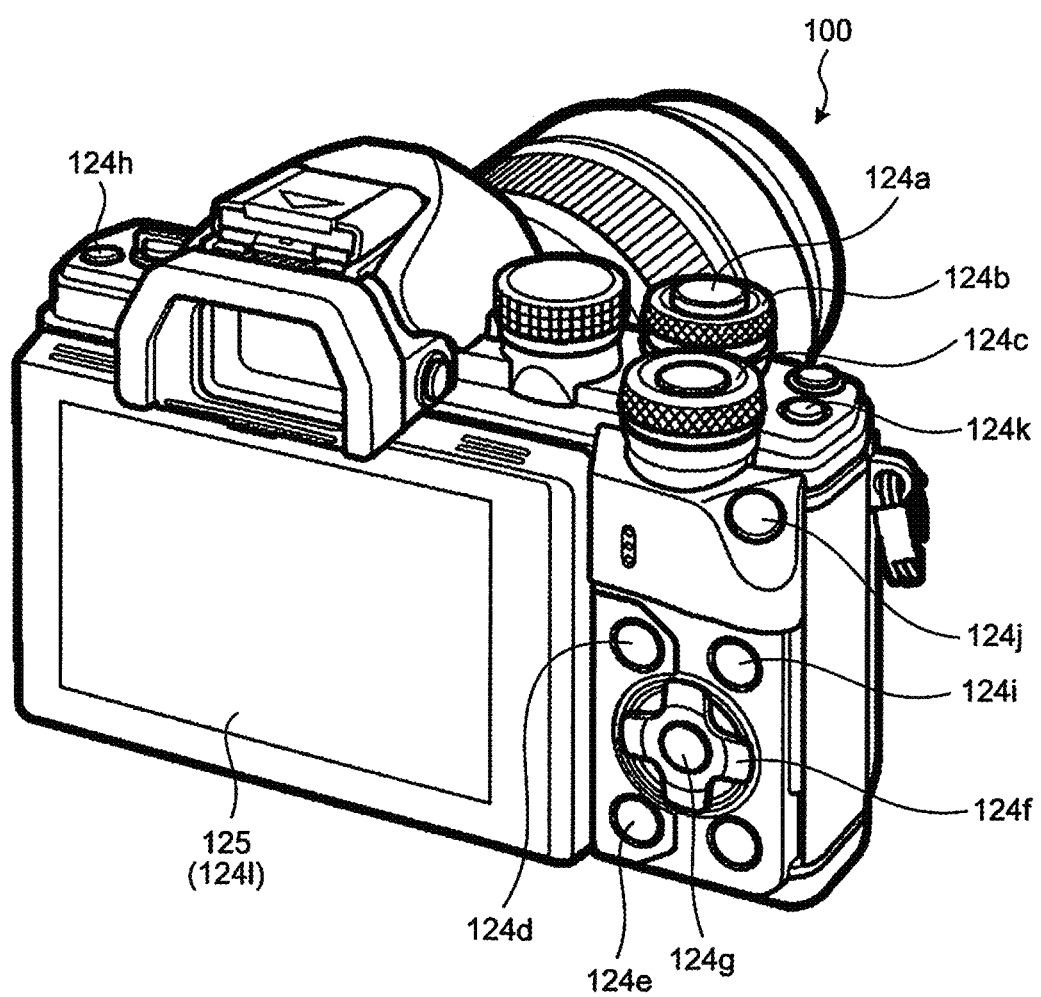
FIG. 4 is a perspective view illustrating an overall configuration of the imaging apparatus according to the first embodiment.

The operating unit 124 is an input means for inputting instructions of a photographer and an operator. FIG. 4 is a perspective view illustrating an overall configuration of the imaging apparatus according to the first embodiment. As illustrated in FIG. 4, the operating unit 124 includes the capture instruction operation button 124a, an F dial 124b, an R dial 124c, an INFORMATION button 124d, a MENU button 124e, a selection button 124f, a determination button 124g, a Quick (Q) button 124h, a drive button 124i, a high resolution capture button 124j, an image stabilization (IS) button 124k, and a touch panel 124l.

The capture instruction operation button 124a includes a two-stage switch composed of a capture preparation switch and a capture start switch. If the capture instruction operation button 124a is pressed halfway, the capture preparation switch is turned on, and if the capture instruction operation button 124a is fully pressed from a half-pressed state, the capture start switch is turned on. If the capture preparation switch is turned on, the system controller 112 executes a capture preparation sequence, such as an AE process and an AF process. Further, if the capture start switch is turned on, the system controller 112 executes a still image capture sequence and performs capture.

The F dial 124b is rotatable and receives an input of an instruction signal for changing a capture parameter that is set in a capture condition.

The R dial 124c is rotatable and receives an input of an instruction signal for changing a capture parameter that is set in the capture condition.

The INFORMATION button 124d receives an input of an instruction signal for causing the display unit 125 to display information on the imaging apparatus 100.

The MENU button 124e causes the display unit 125 to display a menu of the imaging apparatus 100. Specifically, if the MENU button 124e is pressed, the imaging apparatus 100 performs a menu process to be described later.

The selection button 124f selects an item or a condition in the menu screen or the like displayed on the display unit 125, and the determination button 124g confirms the selected condition. Meanwhile, the selection button 124f includes four buttons that are a top button, a bottom button, a left button, and a right button, but, in the following, the selection button 124f may be simply referred to as the top button, the bottom button, the left button, or the right button.

The Q button 124h receives an input of an instruction signal for starting a super control panel (SCP) process.

The drive button 124i receives an input of an instruction signal for switching between capture conditions, such as single shot capture and burst capture.

The high resolution capture button 124j receives an input of an instruction signal for switching between high resolution capture modes.

The IS button 124k receives an input of an instruction signal for switching between enabling and disabling the shake correction mode.

The touch panel 124l is arranged in a superimposed manner on a display region of the display unit 125, and receives an input of an instruction signal corresponding to a touch position touched by an external object.

The display unit 125 displays a live view, displays a playback of a captured image recorded in the external memory 126, displays an exposure control value or the like, and displays a menu screen for setting a capture mode or the like. The display unit 125 is, for example, a liquid crystal display, but may be an organic electro luminescence (EL) display or the like.

The external memory 126 is, for example, a storage medium that is freely attachable to and detachable from the camera main body 10. In the external memory 126, image data compressed by the image processor 115, voice data, and accompanying data are stored. The voice data is stored as audio of a video in synchronization with the captured image. The storage medium for storing the image data, the voice data, and the like is not limited to the external memory 126, and may be a different storage medium, such as a hard disk, that is incorporated in the camera main body 10.

The non-volatile memory 127 is an electrically rewritable non-volatile memory. The non-volatile memory 127 stores therein various parameters needed for operation of the imaging apparatus 100 and control programs executed by the system controller 112.

The camera main body 10 includes the flash emitter 128, the flash charger 129, and the flash controller 130.

The flash emitter 128 includes, for example, a luminous tube, such as a xenon (Xe) tube, and a reflector umbrella. The flash emitter 128 receives an emission instruction from the flash controller 130 and emits light by using energy that is stored in the capacitor of the flash charger 129.

The flash charger 129 stores therein energy that is needed for light emission of the flash emitter 128. The flash charger 129 includes a booster circuit that boosts a voltage, and the capacitor that stores therein energy at the boosted voltage.

The flash controller 130 controls charge operation in the flash charger 129 and flash emission in the flash emitter 128.

The system controller 112 is connected to the image processor 115 to the non-volatile memory 127, the flash controller 130, and the like. If a photographer or an operator operates any of operating parts of the operating unit 124, the system controller 112 executes various sequences corresponding to the operation performed by the photographer or the operator.

Figure 5:
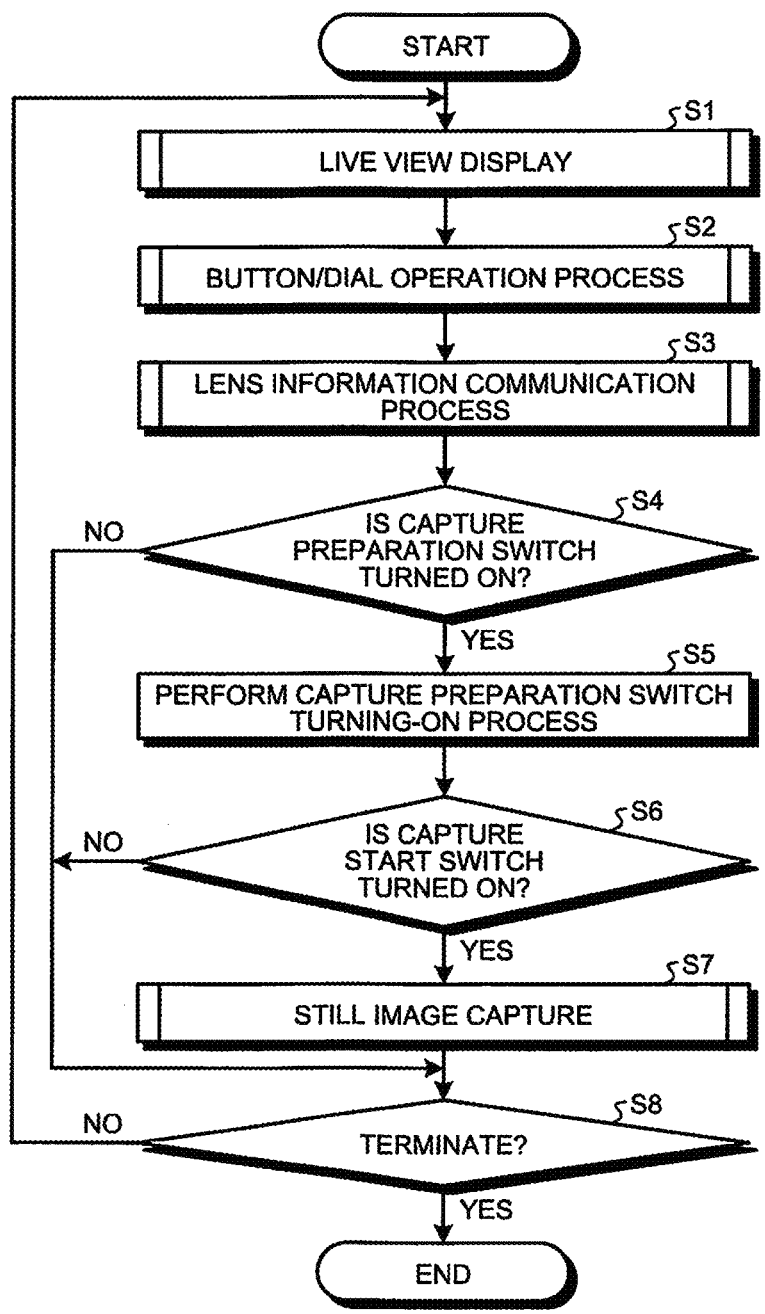
FIG. 5 is a flowchart illustrating an outline of a process performed by the imaging apparatus according to the first embodiment.

A process performed by the imaging apparatus 100 will be described below. FIG. 5 is a flowchart illustrating an outline of the process performed by the imaging apparatus according to the first embodiment.

As illustrated in FIG. 5, first, the system controller 112 causes the display unit 125 to display a live view image corresponding to image data generated by the imager 113 (Step S1). In this case, the system controller 112 causes the imager 113 to perform imaging and generate the image data, and causes the image processor 115 to perform image processing on the image data. Then, the display controller 112a causes the display unit 125 to display the live view image. Details of live view display will be described later.

Subsequently, the system controller 112 performs a process corresponding to an operation performed on each of buttons, dials, and the like in the operating unit 124 (Step S2). Details of a button/dial process will be described later.

Thereafter, the system controller 112 performs communication with the lens part 20 and acquires various kinds of information, such as settings of the lens part 20, via the lens communicator 118 and the communication controller 111 (Step S3). Details of a lens information communication process will be described later.

At Step S4, if the capture instruction operation button 124a is pressed halfway and the capture preparation switch enters an ON-state (Step S4: Yes), the imaging apparatus 100 performs a capture preparation switch turning-on process of causing the imaging lens 101 to come into focus, performing a photometric calculation, and locking AE, on the basis of the image data generated by the imager 113 (Step S5). After Step S5, the imaging apparatus 100 proceeds to Step S6 to be described later.

At Step S4, if the capture instruction operation button 124a is not pressed halfway and the capture preparation switch does not enter the ON-state (Step S4: No), the imaging apparatus 100 proceeds to Step S8 to be described later.

At Step S6, if the capture instruction operation button 124a is fully pressed and the capture start switch enters the ON-state (Step S6: Yes), the imaging apparatus 100 causes the imager 113 to perform still image capture (Step S7). Details of the still image capture will be described later.

After Step S7, the imaging apparatus 100 proceeds to Step S8 to be described later. In contrast, if the capture instruction operation button 124a is not fully pressed and the capture start switch does not enter the ON-state (Step S6: No), the imaging apparatus 100 proceeds to Step S8 to be described below.

At Step S8, if the operating unit 124 receives predetermined operation and terminates (Step S8: Yes), the imaging apparatus 100 terminates the process. In contrast, if the operating unit 124 does not receive the predetermined operation and does not terminate (Step S8: No), the imaging apparatus 100 returns to Step S1.

Figure 6:
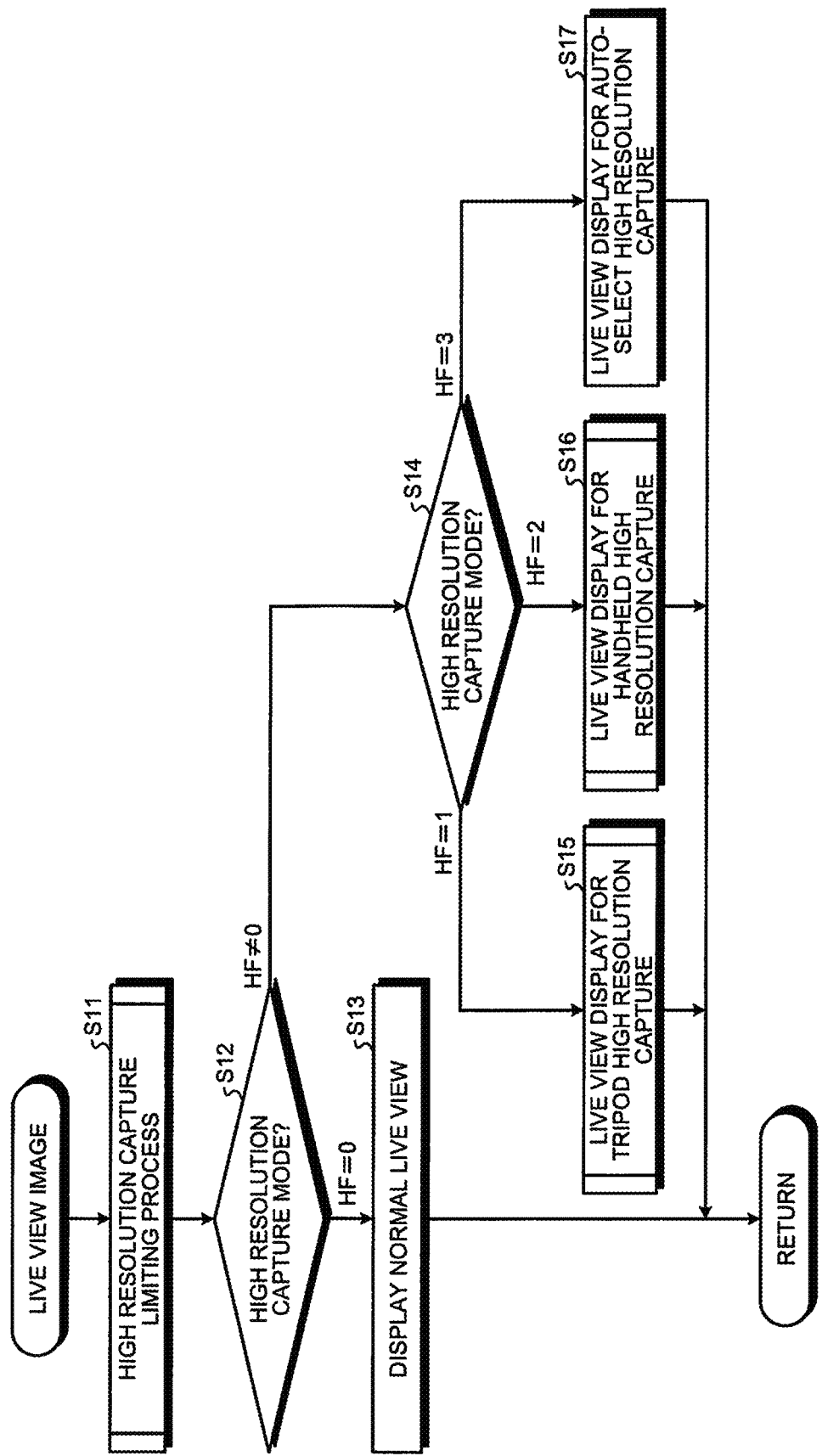
FIG. 6 is a flowchart illustrating an outline of live view display in FIG. 5.

The live view display described at Step S1 in FIG. 5 will be described below. FIG. 6 is a flowchart illustrating an outline of the live view display in FIG. 5.

As illustrated in FIG. 6, first, the system controller 112 limits a function of the high resolution capture itself or each of functions in the high resolution capture (Step S11). Details of a high resolution capture limiting process will be described later.

Subsequently, the system controller 112 determines whether a setting of the imaging apparatus 100 indicates a state for performing normal imaging instead of the high resolution capture (a high resolution capture flag (hereinafter, "HF")=0) or a state for performing the high resolution capture (HF≠1) (Step S12). If the system controller 112 determines that the setting of the imaging apparatus 100 indicates the state for performing the normal imaging (Step S12: HF=0), the imaging apparatus 100 proceeds to Step S13 to be described later. In contrast, if the system controller 112 determines that the setting of the imaging apparatus 100 indicates the state for performing the high resolution capture (Step S12: HF≠0), the imaging apparatus 100 proceeds to Step S14 to be described later.

At Step S13, the display controller 112a causes the display unit 125 to display a normal live view image. After Step S13, the imaging apparatus 100 returns to the main routine in FIG. 5.

At Step S14, the system controller 112 determines whether the setting of the imaging apparatus 100 indicates the tripod high resolution capture (HF=1), the handheld high resolution capture (HF=2), or the auto-select high resolution capture (HF=3).

If the system controller 112 determines that the setting of the imaging apparatus 100 indicates the tripod high resolution capture (Step S14: HF=1), the display controller 112a causes the display unit 125 to display a live view image for performing the tripod high resolution capture (Step S15).

Further, if the system controller 112 determines that the setting of the imaging apparatus 100 indicates the handheld high resolution capture (Step S14: HF=2), the display controller 112a causes the display unit 125 to display a live view image for performing the handheld high resolution capture (Step S16).

Furthermore, if the system controller 112 determines that the setting of the imaging apparatus 100 indicates the auto-select high resolution capture (Step S14: HF=3), the display controller 112a causes the display unit 125 to display a live view image for performing the auto-select high resolution capture (Step S17). Details of live view display for the tripod high resolution capture and live view display for the handheld high resolution capture will be described later. After each of the processes from Step S15 to S17, the imaging apparatus 100 returns to the main routine in FIG. 5.

Figure 7:
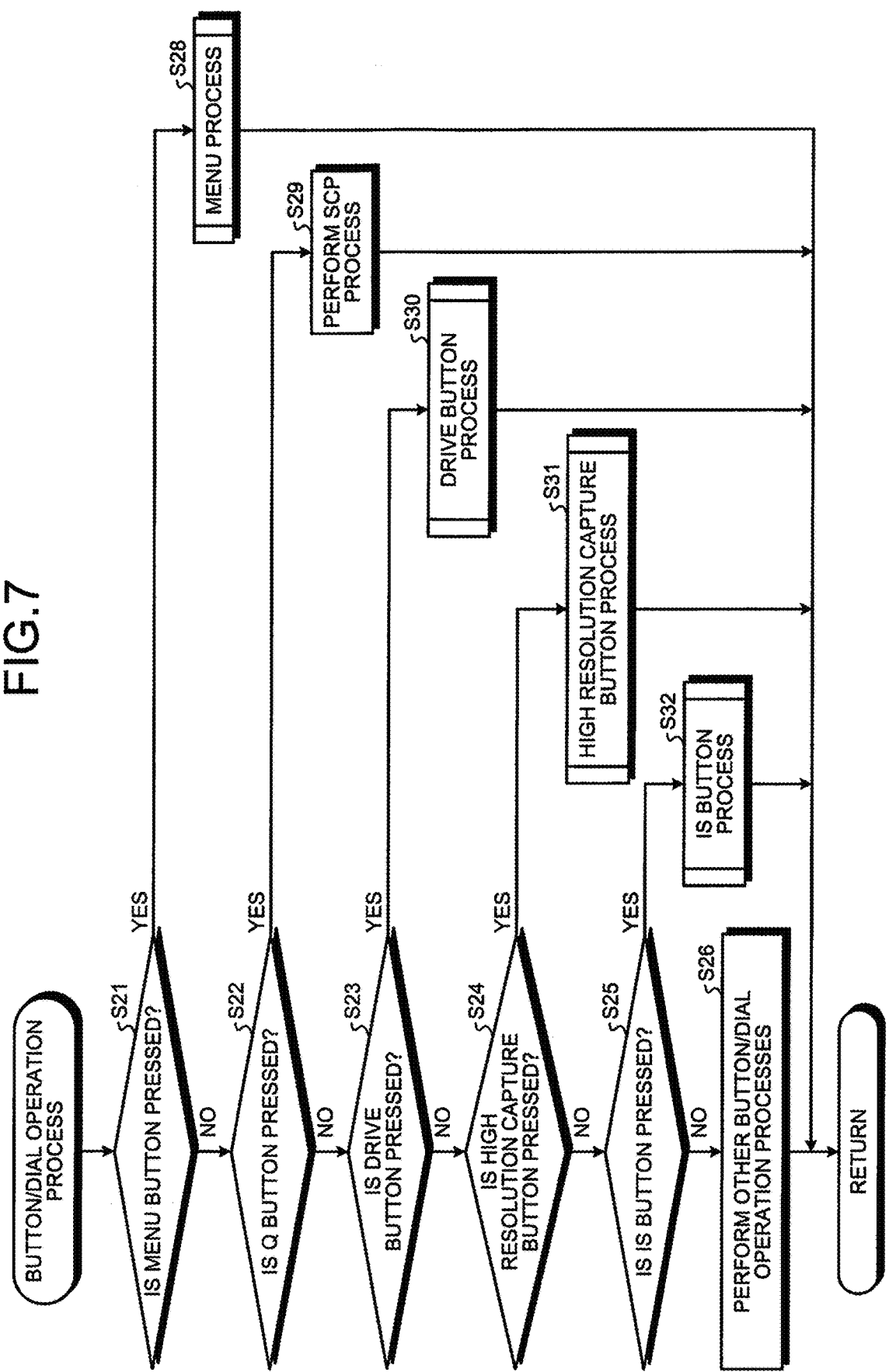
FIG. 7 is a flowchart illustrating an outline of a dial/button operation process in FIG. 5.

The button/dial operation process described at Step S2 in FIG. 5 will be described below. FIG. 7 is a flowchart illustrating an outline of the dial/button operation process in FIG. 5.

As illustrated in FIG. 7, first, the system controller 112 determines whether the MENU button 124e is pressed (Step S21). If the system controller 112 determines that the MENU button 124e is not pressed (Step S21: No), the imaging apparatus 100 proceeds to Step S22 to be described later. In contrast, if the system controller 112 determines that the MENU button 124e is pressed (Step S21: Yes), the imaging apparatus 100 proceeds to Step S28 to be described later.

At Step S22, the system controller 112 determines whether the Q button 124h is pressed. If the system controller 112 determines that the Q button 124h is not pressed (Step S22: No), the imaging apparatus 100 proceeds to Step S23 to be described later. In contrast, if the system controller 112 determines that the Q button 124h is pressed (Step S22: Yes), the imaging apparatus 100 proceeds to Step S29 to be described later.

At Step S23, the system controller 112 determines whether the drive button 124i is pressed. If the system controller 112 determines that the drive button 124i is not pressed (Step S23: No), the imaging apparatus 100 proceeds to Step S24 to be described later. In contrast, if the system controller 112 determines that the drive button 124i is pressed (Step S23: Yes), the imaging apparatus 100 proceeds to Step S30 to be described later.

At Step S24, the system controller 112 determines whether the high resolution capture button 124j is pressed. If the system controller 112 determines that the high resolution capture button 124j is not pressed (Step S24: No), the imaging apparatus 100 proceeds to Step S25 to be described later. In contrast, if the system controller 112 determines that the high resolution capture button 124j is pressed (Step S24: Yes), the imaging apparatus 100 proceeds to Step S31 to be described later.

At Step S25, the system controller 112 determines whether the IS button 124k is pressed. If the system controller 112 determines that the IS button 124k is not pressed (Step S25: No), the imaging apparatus 100 proceeds to Step S26 to be described later. In contrast, if the system controller 112 determines that the IS button 124k is pressed (Step S25: Yes), the imaging apparatus 100 proceeds to Step S32 to be described later.

At Step S26, the system controller 112 determines whether operation is performed on any button other than the MENU button 124e, the Q button 124h, the drive button 124i, the high resolution capture button 124j, and the IS button 124k, and performs a procedure corresponding to the operation. After Step S26, the imaging apparatus 100 returns to the main routine in FIG. 5. Details of a menu process at Step S28, a drive button process at Step S30, a high resolution capture button process at Step S31, and an IS button process at Step S32 will be described later.

Figure 8:
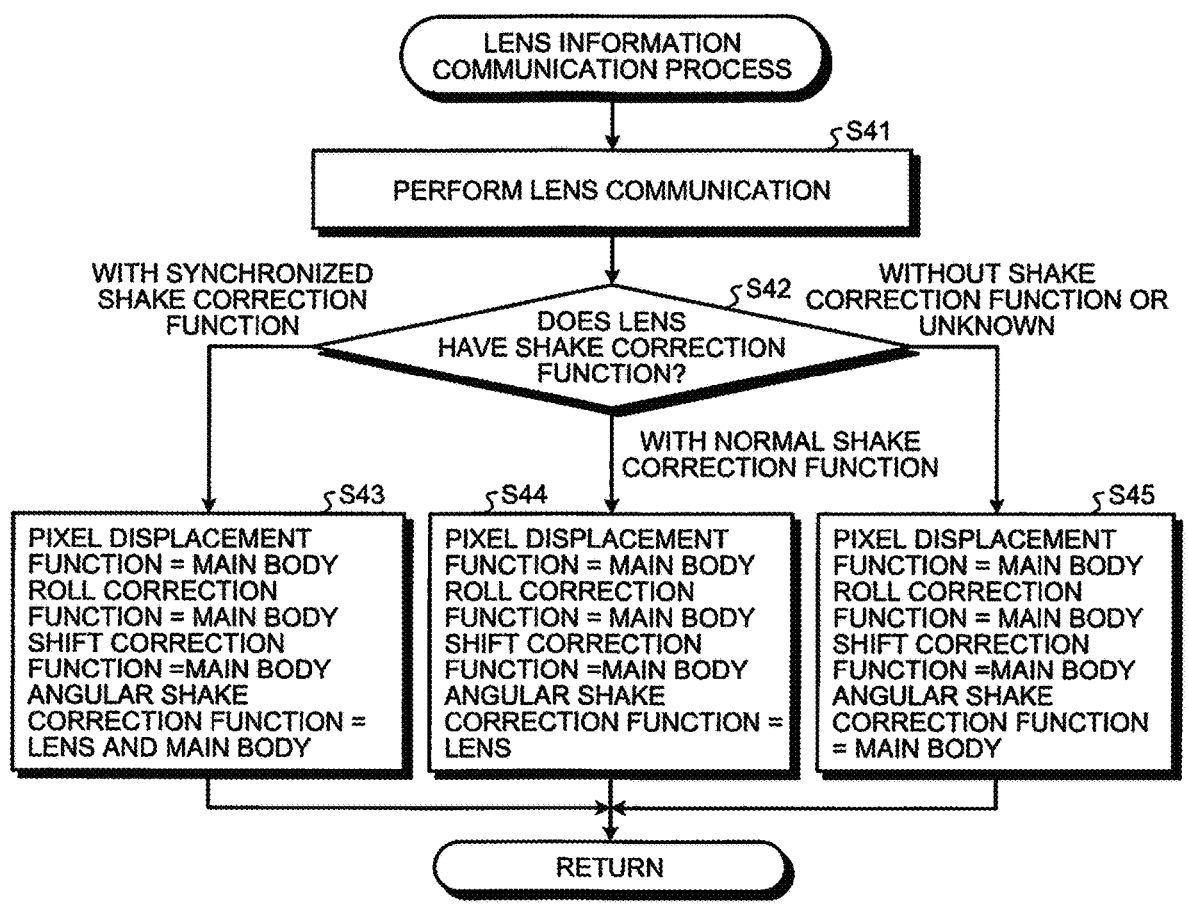
FIG. 8 is a flowchart illustrating an outline of a lens information communication process in FIG. 5.

The lens information communication process described at Step S3 in FIG. 5 will be described below. FIG. 8 is a flowchart illustrating an outline of the lens information communication process in FIG. 5.

As illustrated in FIG. 8, first, the system controller 112 performs communication with the lens part 20 via the lens communicator 118 and the communication controller 111 (Step S41).

Subsequently, the system controller 112 determines whether the lens part 20 is a lens that has a shake correction function (Step S42). If the system controller 112 determines that the lens part 20 is a lens that has a synchronized shake correction function (Step S42: with synchronized shake correction function), the system controller 112 assigns a pixel displacement function, a roll correction function, and a shift correction function to the camera main body 10, and assigns an angular correction function to the camera main body 10 and the lens part 20 (Step S43).

Figure 9:
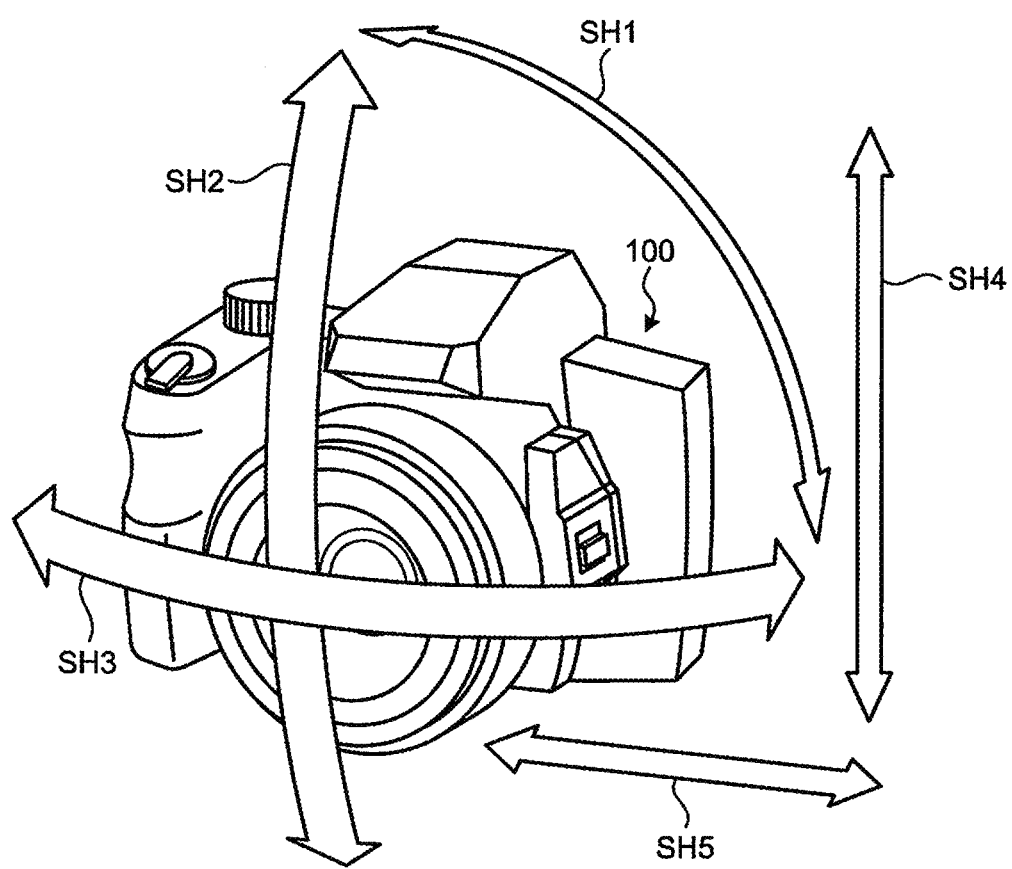
FIG. 9 is a diagram for explaining a direction of a shake.

FIG. 9 is a diagram for explaining a direction of a shake. As illustrated in FIG. 9, a shake of the imaging apparatus 100 includes roll that is a shake SH1 in a roll direction, an angular shake including a shake SH2 in a pitch direction and a shake SH3 in a yaw direction, and a shift including a shake SH4 in a vertical direction and a shake SH5 in a horizontal direction. The shake correction driver 113c is suitable for correction in a plane that is horizontal to the imaging sensor 113b, and therefore, the system controller 112 assigns the pixel displacement function, the roll correction function, and the shift correction function to the shake correction driver 113c of the camera main body 10. In contrast, the shake correction lens 104 is suitable for correction of an angle of incidence of a subject light flux on the imaging sensor 113b, and therefore, if the lens part 20 has the synchronized shake correction function, the system controller 112 assigns the angular correction function to the shake correction driver 113c of the camera main body 10 and the shake correction lens 104 of the lens part 20 to cause the shake correction driver 113c and the shake correction lens 104 to correct an angular shake in a synchronized manner.

Similarly, if the system controller 112 determines that the lens part 20 is a lens that has a normal shake correction function (Step S42: with normal shake correction function), the system controller 112 assigns the pixel displacement function, the roll correction function, and the shift correction function to the shake correction driver 113c of the camera main body 10. In contrast, if the lens part 20 does not have the synchronized shake correction function (has a normal synchronized function), the system controller 112 assigns the angular correction function to the shake correction lens 104 of the lens part 20 (Step S44).

Similarly, if the system controller 112 determines that the lens part 20 is a lens that does not have the shake correction function or a lens for which it is not clear if the shake correction function is provided (Step S42: with shake correction function or unknown), the system controller 112 assigns the pixel displacement function, the roll correction function, the shift correction function, and the angular correction function to the shake correction driver 113c of the camera main body 10 (Step S45). After each of the processes from Steps S43 to S45, the imaging apparatus 100 returns to the main routine in FIG. 5.

Figure 10:
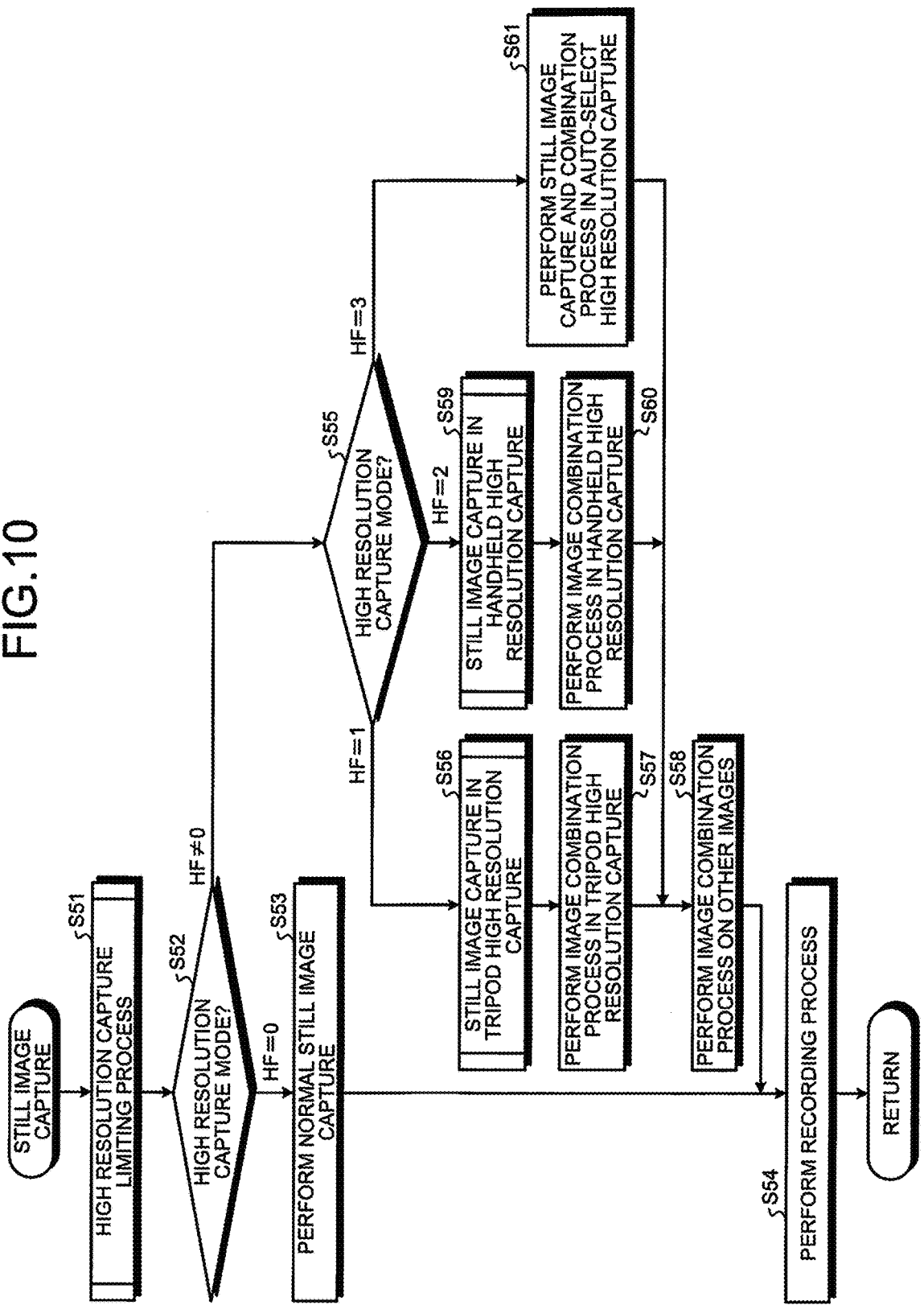
FIG. 10 is a flowchart illustrating an outline of still image capture in FIG. 5.

The still image capture described at Step S7 in FIG. 5 will be described below. FIG. 10 is a flowchart illustrating an outline of the still image capture in FIG. 5.

As illustrated in FIG. 10, first, the system controller 112 performs the high resolution capture limiting process similarly to Step S11 in FIG. 6 (Step S51).

Subsequently, similarly to Step S12 in FIG. 6, the system controller 112 determines whether the setting of the imaging apparatus 100 indicates the state for performing the normal imaging instead of the high resolution capture (HF=0) or the state for performing the high resolution capture (HF≠1) (Step S52). If the system controller 112 determines that the setting of the imaging apparatus 100 indicates the state for performing the normal imaging (Step S52: HF=0), the imaging apparatus 100 proceeds to Step S53 to be described later. In contrast, if the system controller 112 determines that the setting of the imaging apparatus 100 indicates the state for performing the high resolution capture (Step S52: HF≠0), the imaging apparatus 100 proceeds to Step S55 to be described later.

At Step S53, the imaging apparatus 100 causes the imaging drive controller 117 to control the imager 113 so as to perform normal still image capture without using the high resolution capture function. Further, the imaging apparatus 100 performs a process of causing the image processor 115 to perform predetermined image processing on an image captured by the imager 113 and record the image in the memory 116 (Step S54). Thereafter, the imaging apparatus 100 returns to the main routine in FIG. 5.

At Step S55, similarly to Step S14 in FIG. 6, the system controller 112 determines whether the setting of the imaging apparatus 100 indicates the tripod high resolution capture (HF=1), the handheld high resolution capture (HF=2), or the auto-select high resolution capture (HF=3).

If the system controller 112 determines that the setting of the imaging apparatus 100 indicates the tripod high resolution capture (Step S55: HF=1), the imaging apparatus 100 causes the first imaging drive controller 117c of the imaging drive controller 117 to control the imager 113 so as to perform still image capture in the tripod high resolution capture and generate a first group of images (Step S56). Subsequently, the imaging apparatus 100 causes the first image combiner 115a of the image processor 115 to combine the first group of images captured by the tripod high resolution capture and generate a first high-resolution image (Step S57). Details of the still image capture in the tripod high resolution capture will be described later.

Further, if the system controller 112 determines that the setting of the imaging apparatus 100 indicates the handheld high resolution capture (Step S55: HF=2), the imaging apparatus 100 causes the second imaging drive controller 117d of the imaging drive controller 117 to control the imager 113 so as to perform still image capture in the handheld high resolution capture and generate a second group of images (Step S59). Subsequently, the imaging apparatus 100 causes the second image combiner 115b of the image processor 115 to combine the second group of images captured by the handheld high resolution capture and generate a second high-resolution image (Step S60). Details of the still image capture in the handheld high resolution capture will be described later.

Furthermore, if the system controller 112 determines that the setting of the imaging apparatus 100 indicates the auto-select high resolution capture (Step S55: HF=3), the imaging apparatus 100 causes the imaging switch unit 117e of the imaging drive controller 117 to switch between the first imaging drive controller 117c and the second imaging drive controller 117d so as to perform the still image capture in the tripod high resolution capture or the handheld high resolution capture, and combines images in accordance with the imaging method (Step S61). Details of the still image capture in the auto-select high resolution capture will be described later.

At Step S58, the imaging apparatus 100 performs an image combination process other than the image combination in the high resolution capture on the images that are combined at Step S27, S60, or S61. Specifically, the imaging apparatus 100 performs an image combination process, such as an HDR combination process or a depth combination process. However, given a gate size of an ASIC or buffer efficiency, it is preferable to perform the HDR combination process before the image combination in the high resolution capture is performed. In contrast, it is preferable to perform the depth combination process after the image combination in the high resolution capture is performed. In this manner, in a case where a plurality of kinds of image combination capture, such as the HDR capture, the depth combination capture, and the high resolution capture, are to be performed, it is necessary to perform the capture in a complex capture sequence while changing exposure for each focus position movement and each pixel displacement, and perform image combination in a complex combination sequence in a reverse order.

Thereafter, the imaging apparatus 100 performs a process of recording the images combined at Step S58 in the memory 116 (Step S54). Thereafter, the imaging apparatus 100 returns to the main routine in FIG. 5.

Figure 11:
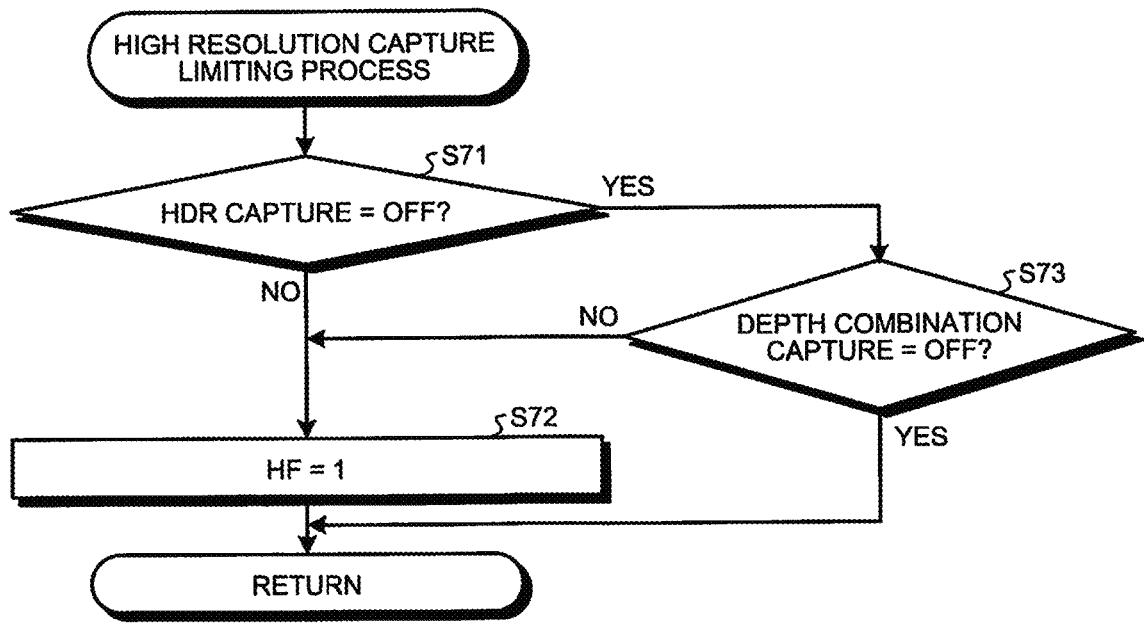
FIG. 11 is a flowchart illustrating an outline of a high resolution capture limiting process in FIG. 6.

The high resolution capture limiting process described at Step S11 in FIG. 6 and Step S51 in FIG. 10 will be described below. FIG. 11 is a flowchart illustrating an outline of the high resolution capture limiting process in FIG. 6.

As illustrated in FIG. 11, at Step S71, if the system controller 112 determines that the HDR capture function is turned on (Step S71: No), the system controller 112 sets HF to 1 (tripod high resolution mode) (Step S72). The HDR capture function is a function to capture a plurality of (for example, four) images while changing exposure in a single capture and generate an HDR image by combining the captured images. If the HDR capture function and the handheld high resolution capture (to be described later) are used concurrently, the number of captured images is increased due to a multiplicative relationship between them. Therefore, if the HDR capture function is enabled, the system controller 112 imposes a limitation so as not to perform the handheld high resolution capture. Thereafter, the process returns to the subroutine in FIG. 6 or FIG. 10.

At Step S71, if the system controller 112 determines that the HDR capture function is turned off (Step S71: Yes), the system controller 112 determines whether the depth combination capture function is turned off (Step S73).

At Step S73, if the system controller 112 determines that the depth combination capture function is turned on (Step S73: No), the system controller 112 proceeds to Step S72. The depth combination capture function is a function to capture a plurality of (for example, eight) images while changing a focus position in a single capture and generate an ultra-deep image by combining the captured images. If the depth combination capture function and the handheld high resolution capture (to be described later) are used concurrently, the number of captured images is increased due to a multiplicative relationship between them. Therefore, if the depth combination capture function is enabled, the system controller 112 imposes a limitation so as not to perform the handheld high resolution capture.

At Step S73, if the system controller 112 determines that the depth combination capture function is turned off (Step S73: Yes), the system controller 112 returns to the subroutine in FIG. 6 or FIG. 10. In other words, if the HDR capture function and the depth combination capture function are disabled, the process returns to the subroutine in FIG. 6 or FIG. 10 without imposing a limitation on the high resolution capture.

Figure 12:
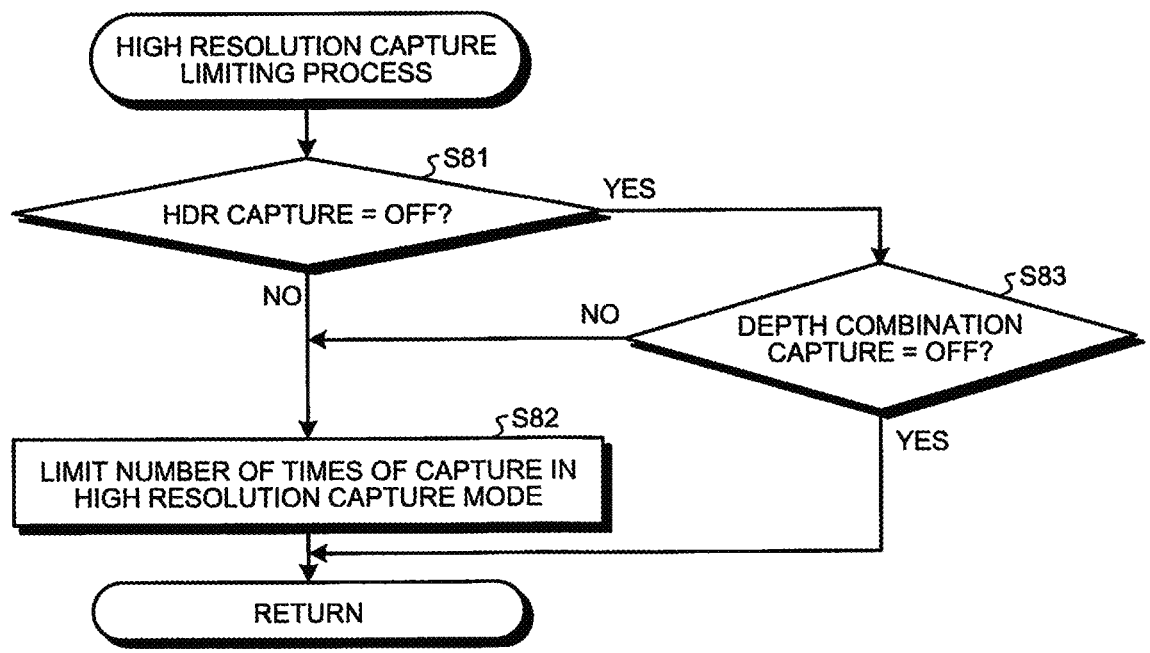
FIG. 12 is a flowchart illustrating an outline of a modification of the high resolution capture limiting process in FIG. 6.

A modification of the high resolution capture limiting process described at Step S11 in FIG. 6 and Step S51 in FIG. 10 will be described below. FIG. 12 is a flowchart illustrating an outline of the modification of the high resolution capture limiting process in FIG. 6.

As illustrated in FIG. 12, at Step S81, if the system controller 112 determines that the HDR capture function is turned on (Step S81: No), the system controller 112 limits the number of captured images in the high resolution capture mode. To prevent an excessive increase in the number of captured images when the HDR capture function and the high resolution capture are used concurrently, the system controller 112 limits the number of captured images for each pixel displacement position in the high resolution capture. Thereafter, the process returns to the subroutine in FIG. 6 or FIG. 10.

At Step S81, if the system controller 112 determines that the HDR capture function is turned off (Step S81: Yes), the system controller 112 determines whether the depth combination capture function is turned off (Step S83).

At Step S83, if the system controller 112 determines that the depth combination capture function is turned on (Step S83: No), the system controller 112 proceeds to Step S82. To prevent an excessive increase in the number of captured images when the depth combination capture function and the high resolution capture are used concurrently, the system controller 112 limits the number of captured images for each pixel displacement position in the high resolution capture (Step S82).

At Step S83, if the system controller 112 determines that the depth combination capture function is turned off (Step S83: Yes), the system controller 112 returns to the subroutine in FIG. 6 or FIG. 10. In other words, if the HDR capture function and the depth combination capture function are disabled, the process returns to the subroutine in FIG. 6 or FIG. 10 without limiting the number of captured images for each pixel displacement position in the high resolution capture.

Figure 13:
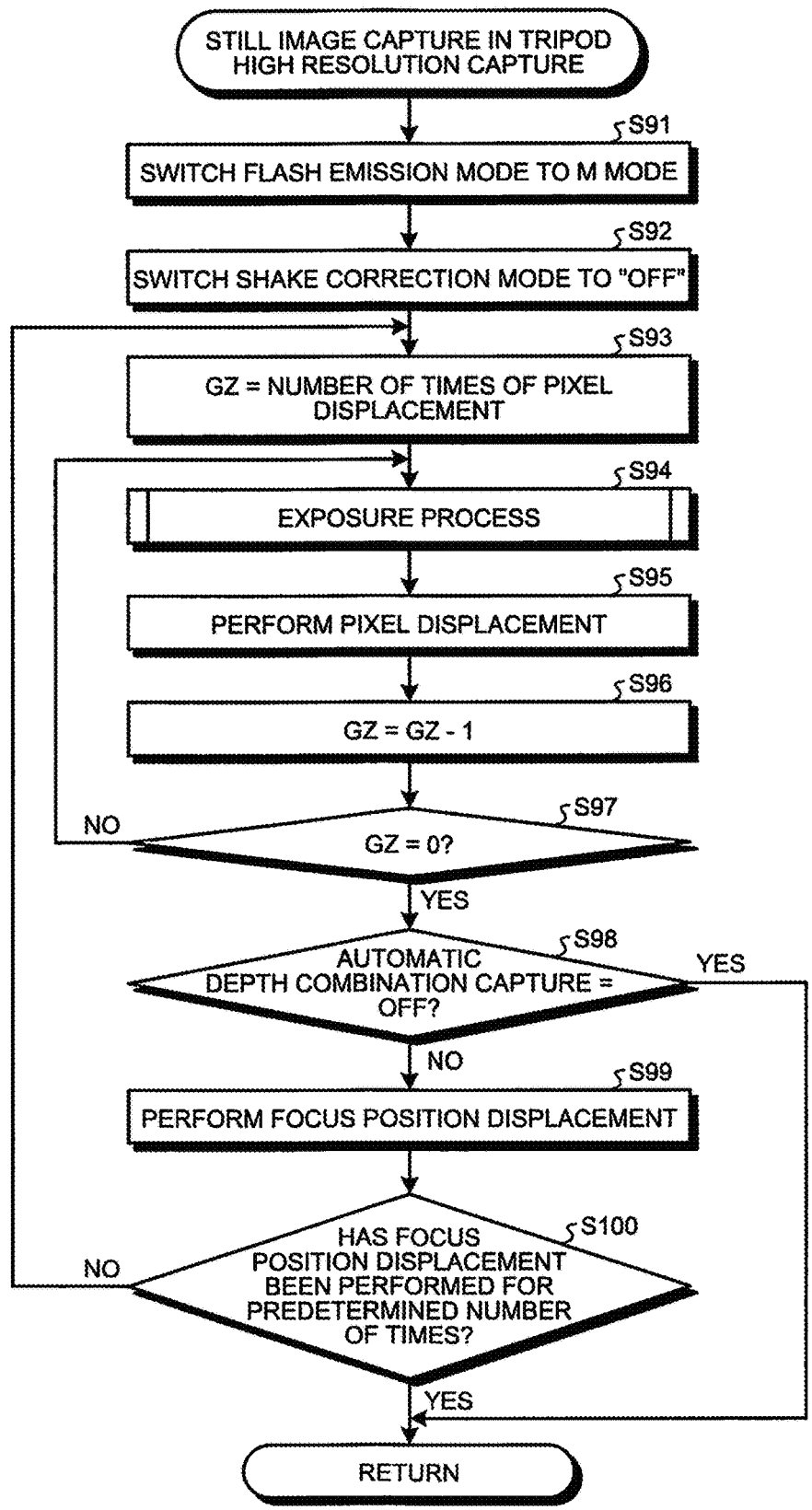
FIG. 13 is a flowchart illustrating an outline of still image capture in tripod high resolution capture in FIG. 10.

The still image capture in the tripod high resolution capture described at Step S56 in FIG. 10 will be described below. FIG. 13 is a flowchart illustrating an outline of the still image capture in the tripod high resolution capture in FIG. 10.

As illustrated in FIG. 13, first, the flash controller 130 limits a flash emission mode to a manual (M) emission mode (Step S91). In the high resolution capture, it is necessary to capture a plurality of images with strictly the same brightness, and therefore, normal flash capture based on pre-emission control in which light emission intensity accuracy is stabilized within only ±0.2 EV is not performed, and only flash capture based on manual emission control in which a light emission intensity can be reliably controlled with the light emission intensity accuracy maintained within ±0.1 EV. In this manner, the first imaging drive controller 117c may prohibit or limit flash emission performed by the flash controller 130.

Subsequently, the first imaging drive controller 117c performs imaging while holding the shake correction performed by the shake correction controller 117b (the shake correction mode is turned off) (Step S92). The tripod high resolution capture is assumed to be performed in a situation that is not affected by a shake because of use of a tripod or the like, and therefore, the shake correction function is stopped.

Thereafter, the system controller 112 sets a variable GZ to the number of times of pixel displacement (Step S93). For example, when a setting is made to perform pixel displacement eight times, the variable GZ=8.

Then, the imaging apparatus 100 performs an exposure process for setting exposure (Step S94). Details of the exposure process will be described later.

Subsequently, the pixel displacement driver 117a causes the shake correction driver 113c to perform pixel displacement to displace the positional relationship between the subject and the imaging sensor 113b, and causes the first imaging drive controller 117c to perform capture for a first predetermined number of times (Step S95).

Figure 14:
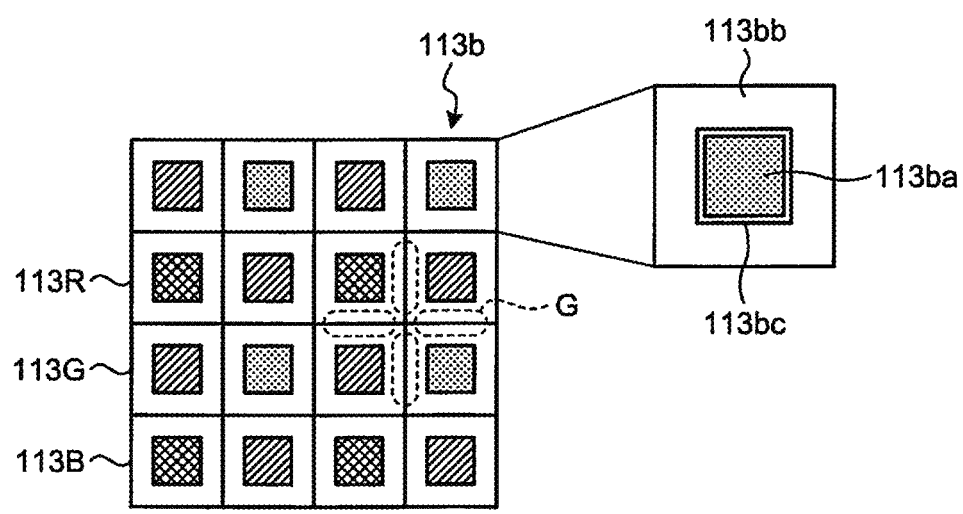
FIG. 14 is a diagram schematically illustrating how to perform imaging while displacing pixels in the tripod high resolution capture.
Figure 15A:
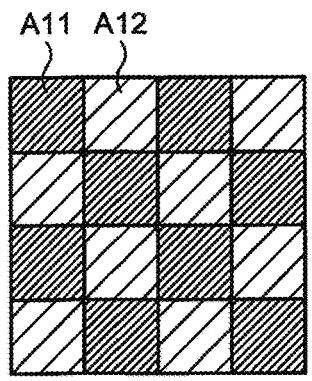
FIG. 15A to FIG. 15C are diagrams schematically illustrating how to perform imaging while displacing pixels in the tripod high resolution capture.
Figure 15B:
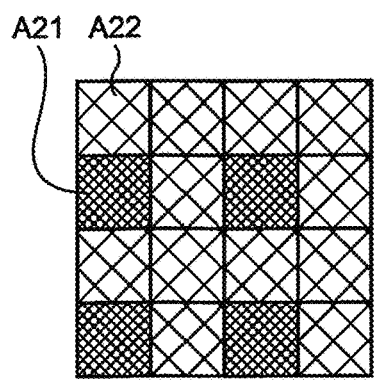
Figure 15C:
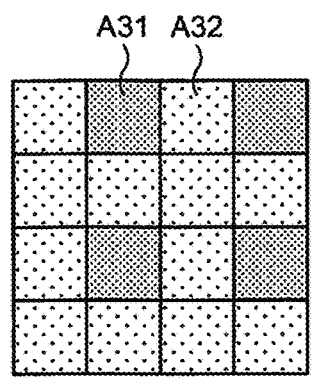
Figure 16A:
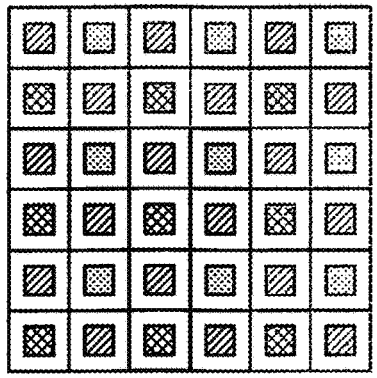
FIG. 16A to FIG. 16H are diagrams schematically illustrating how to perform imaging while displacing pixels in the tripod high resolution capture.
Figure 16B:
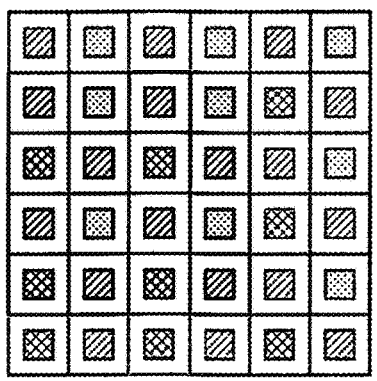
Figure 16C:
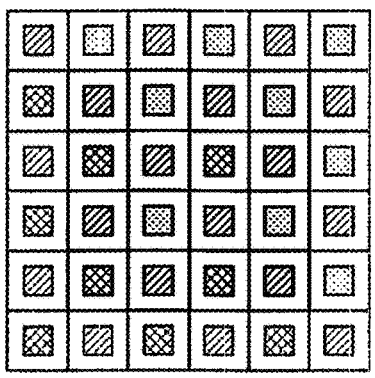
Figure 16D:
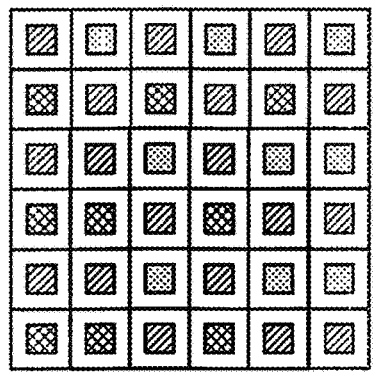
Figure 16E:
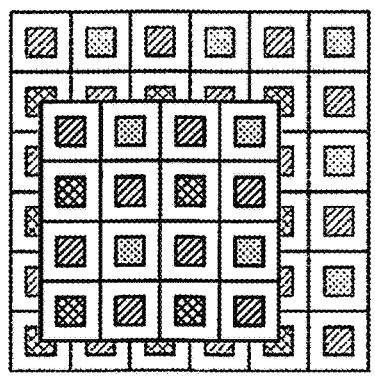
Figure 16F:
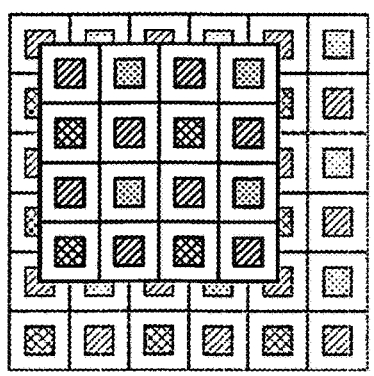
Figure 16G:
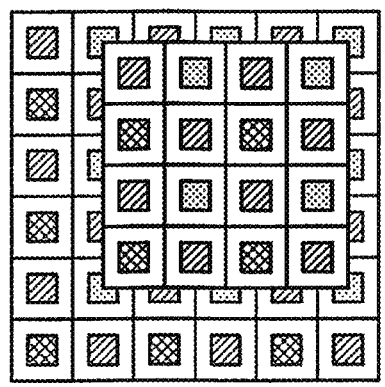
Figure 16H:
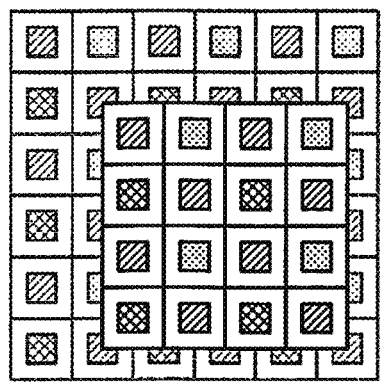

FIG. 14 to FIG. 21B are diagrams schematically illustrating how to perform imaging while displacing pixels in the tripod high resolution capture. As illustrated in FIG. 14, the imaging sensor 113b is composed of two-dimensionally arranged imaging sensors and RGB color filters, in which R pixels 113R having R color filters, G pixels 113G having G color filters, and B pixels 113B having B color filters are arranged in a Bayer array. The R pixels 113R, the G pixels 113G, and the B pixels 113B have openings 113ba, light shields 113bb, and color filters 113bc that cover the openings. Therefore, it is difficult to acquire image information in a gap G between openings of the pixels. Further, as illustrated in FIG. 15A to FIG. 15C, in the Bayer structure, pixels A11, A21, and A31 actually acquire image information, and pixels A12, A22, and A32 are only able to acquire estimated data based on Bayer interpolation. Therefore, an RGB image obtained by combining images illustrated in FIG. 15A to FIG. 15C has low resolution.

Figure 17A:
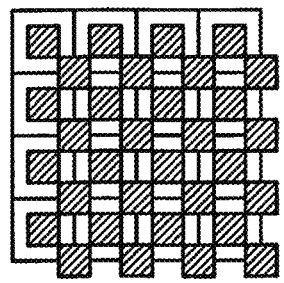
FIG. 17A to FIG. 17C are diagrams schematically illustrating how to perform imaging while displacing pixels in the tripod high resolution capture.
Figure 17B:
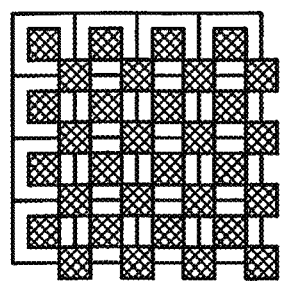
Figure 17C:
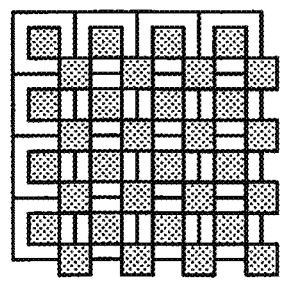
Figure 18A:
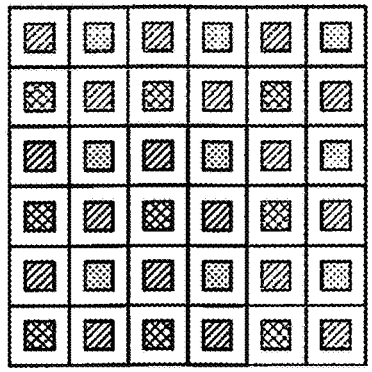
FIG. 18A to FIG. 18D are diagrams schematically illustrating how to perform imaging while displacing pixels in the tripod high resolution capture.
Figure 18B:
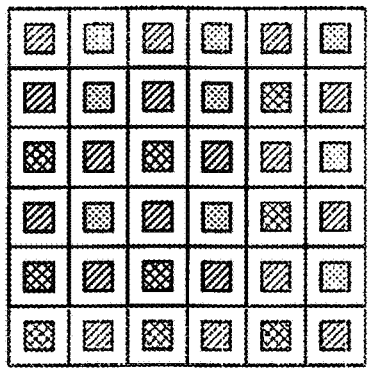
Figure 18C:
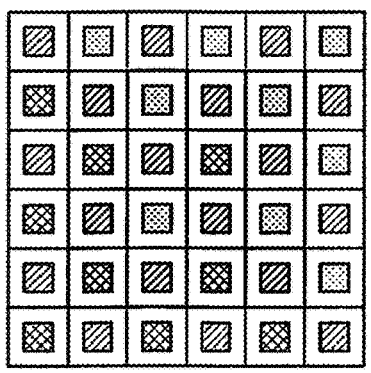
Figure 18D:
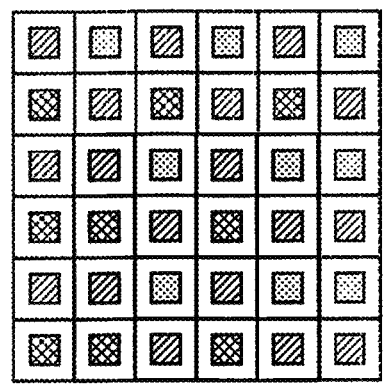

FIG. 16A to FIG. 16H are diagrams schematically illustrating how the pixel displacement driver 117a performs pixel displacement. FIG. 16A to FIG. 16H illustrate an example in which the number of times of the pixel displacement is set to eight. As illustrated in FIG. 16A to FIG. 16H, the pixel displacement driver 117a causes the imaging sensor 113b to perform pixel displacement eight times in a unit of 1 pixel or 0.5 pixel in each direction, and perform capture once in each case. Consequently, as illustrated in FIG. 17A to FIG. 17D, it is possible to acquire an eightfold-greater amount of information at each of the G pixels, the R pixels, and the B pixels. Then, it is possible to generate a high-resolution image by combining an image as illustrated in FIG. 17A twice, an image as illustrated in FIG. 17B once, and an image as illustrated in FIG. 17C once. While the first predetermined number of times of capture for each pixel displacement position is assumed as one in the above example, it may be possible to perform capture for a plurality of number of times for each pixel displacement position. However, if capture is performed for a plurality of number of times, it is necessary to perform the exposure process in each case.

Figure 19A:
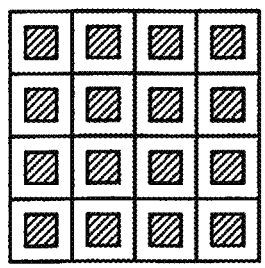
FIG. 19A to FIG. 19C are diagrams schematically illustrating how to perform imaging while displacing pixels in the tripod high resolution capture.
Figure 19B:
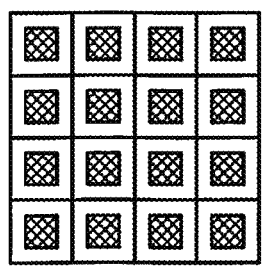
Figure 19C:
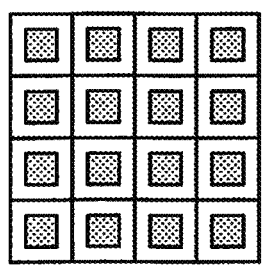

Further, the number of times of the pixel displacement may be set to four. As illustrated in FIG. 18A to FIG. 18D, the pixel displacement driver 117a causes the imaging sensor 113b to perform the pixel displacement four times for each pixel in each direction and perform capture once in each case. Consequently, as illustrated in FIG. 19A to FIG. 19D, it is possible to acquire a fourfold-greater amount of information at each of the G pixels, the R pixels, and the B pixels. Then, it is possible to generate a high-resolution image by combining an image as illustrated in FIG. 19A twice, an image as illustrated in FIG. 19B once, and an image as illustrated in FIG. 19C once.

Figure 20A:
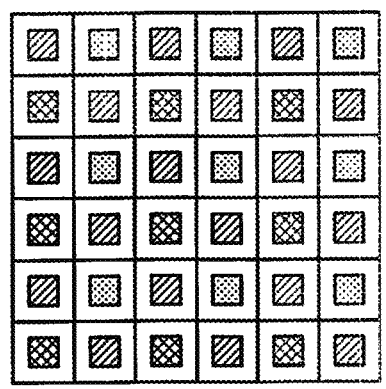
FIG. 20A and FIG. 20B are diagrams schematically illustrating how to perform imaging while displacing pixels in the tripod high resolution capture.
Figure 20B:
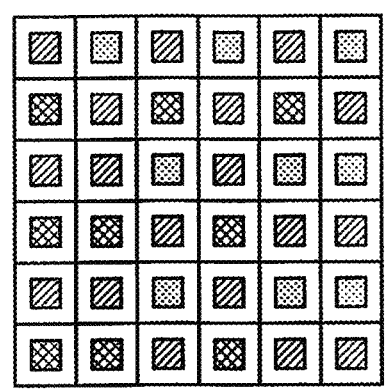
Figure 21A:
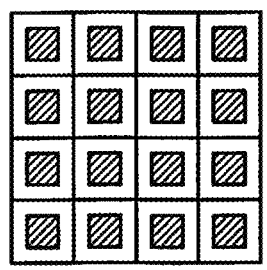
FIG. 21A and FIG. 21B are diagrams schematically illustrating how to perform imaging while displacing pixels in the tripod high resolution capture.
Figure 21B:
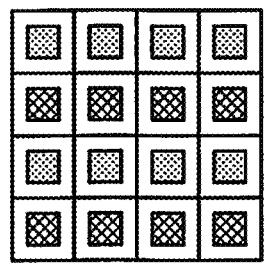

Similarly, the number of times of the pixel displacement may be set to two. As illustrated in FIG. 20A and FIG. 20B, the pixel displacement driver 117a causes the imaging sensor 113b to perform the pixel displacement twice for each pixel in each direction and perform capture once in each case. Consequently, as illustrated in FIG. 21A and FIG. 21B, it is possible to acquire a double amount of information at each of the G pixels, the R pixels, and the B pixels. Here, it is necessary to perform an interpolation process in a vertical direction with respect to the R pixels and the B pixels, and resolution of R and B in the vertical direction is not improved. However, the G pixels as actual resolution can be obtained at the same level as obtained by performing the pixel displacement four times as illustrated in FIG. 19A to FIG. 19C. In this manner, it is possible to generate a high-resolution image by combining the images in FIG. 21A and FIG. 21B while reducing a capture time and a processing time.

Referring back to FIG. 13, at Step S96, the system controller 112 calculates the variable GZ such that the variable GZ=GZ−1. In other words, the value of the variable GZ is decremented.

At Step S97, if the system controller 112 determines that the variable GZ is not 0 (Step S97: No), the system controller 112 returns to Step S94 and repeats the process. In contrast, at Step S97, if the system controller 112 determines that the variable GZ is 0 (Step S97: Yes), the system controller 112 proceeds to Step S98 to be described later. In other words, the imaging apparatus 100 performs capture for the first predetermined number of times at each pixel displacement position corresponding to the pre-set number of times of the pixel displacement.

At Step S98, if the system controller 112 determines that automatic depth combination capture is to be performed (Step S98: Yes), the imaging apparatus 100 performs imaging while displacing a focus position (Step S99).

At Step S100, the system controller 112 determines whether focus position displacement has been performed for a predetermined number of times (Step S100). If the focus position displacement has not been performed for the predetermined number of times (Step S100: No), the system controller 112 returns to Step S93 and repeats the process. In contrast, if the focus position displacement has been performed for the predetermined number of times (Step S100: Yes), the process returns to the subroutine illustrated in FIG. 10.

Further, at Step S98, if the system controller 112 determines that the automatic depth combination capture is not to be performed (Step S98: No), the system controller 112 returns to the subroutine illustrated in FIG. 10.

As described above, according to the first embodiment, it is possible to capture a high-resolution image without being affected by a shake (tripod high resolution capture).

Figure 22:
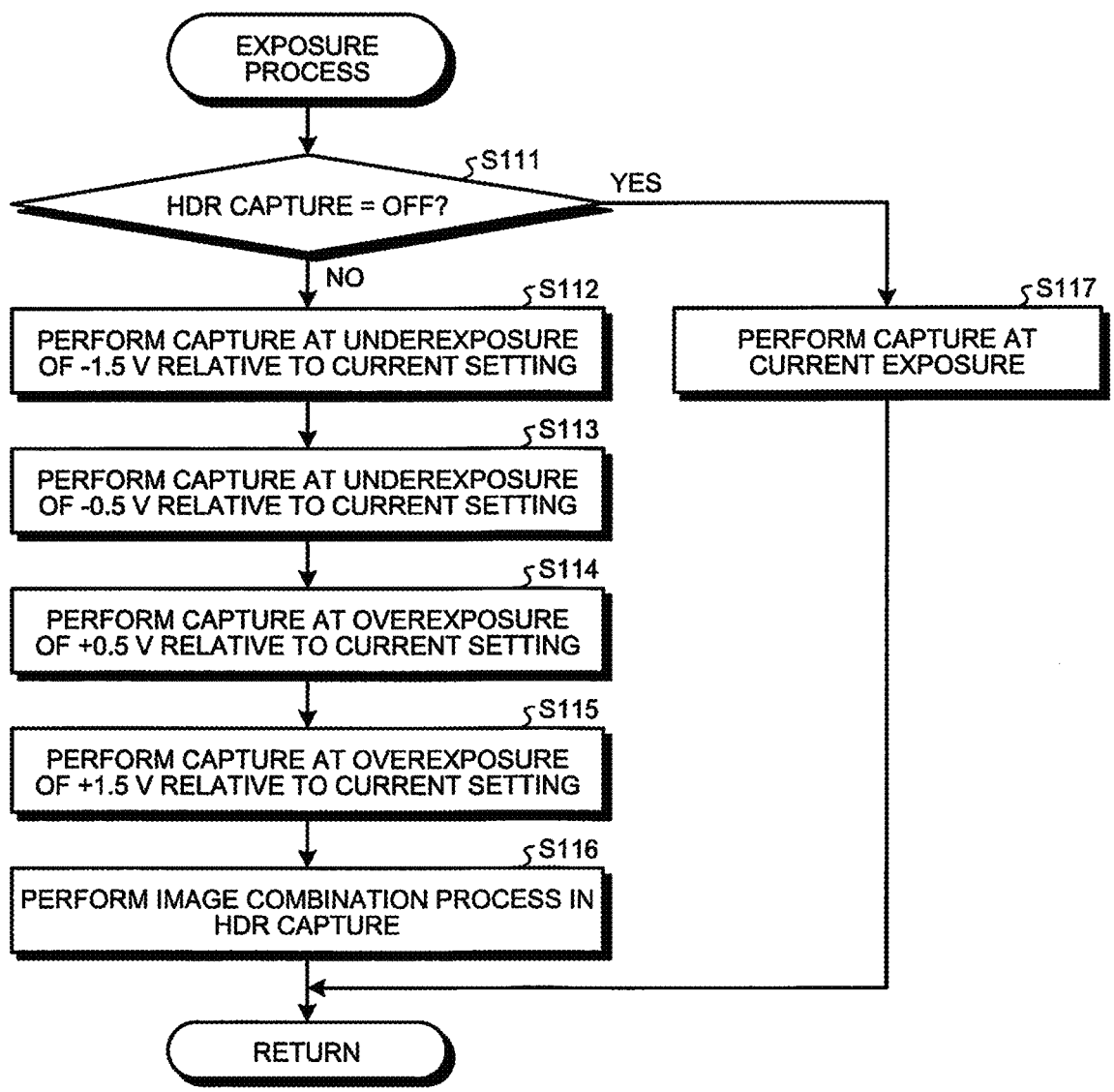
FIG. 22 is a flowchart illustrating an outline of an exposure process in FIG. 13.

The exposure process described at Step S94 in FIG. 13 will be described below. FIG. 22 is a flowchart illustrating an outline of the exposure process in FIG. 13.

As illustrated in FIG. 22, first, the system controller 112 determines whether the HDR capture is disabled (OFF) (Step S111).

If the system controller 112 determines that the HDR capture is disabled (OFF) (Step S111: Yes), the system controller 112 performs capture at current exposure (Step S117), and returns to the subroutine illustrated in FIG. 13.

In contrast, if the system controller 112 determines that the HDR capture is enabled (Step S111: No), the exposure controller 120 sets the exposure to −1.5 EV relative to the current setting and performs capture (Step S112). Similarly, the exposure controller 120 sets the exposure to −0.5 EV (Step S113), to +0.5 EV (Step S114), and to +1.5 EV (Step S115) relative to the current setting and performs capture at each exposure.

Thereafter, the image processor 115 performs a process of combining the images that are captured by the HDR capture (Step S116). Thereafter, the process returns to the subroutine illustrated in FIG. 13.

Figure 23:
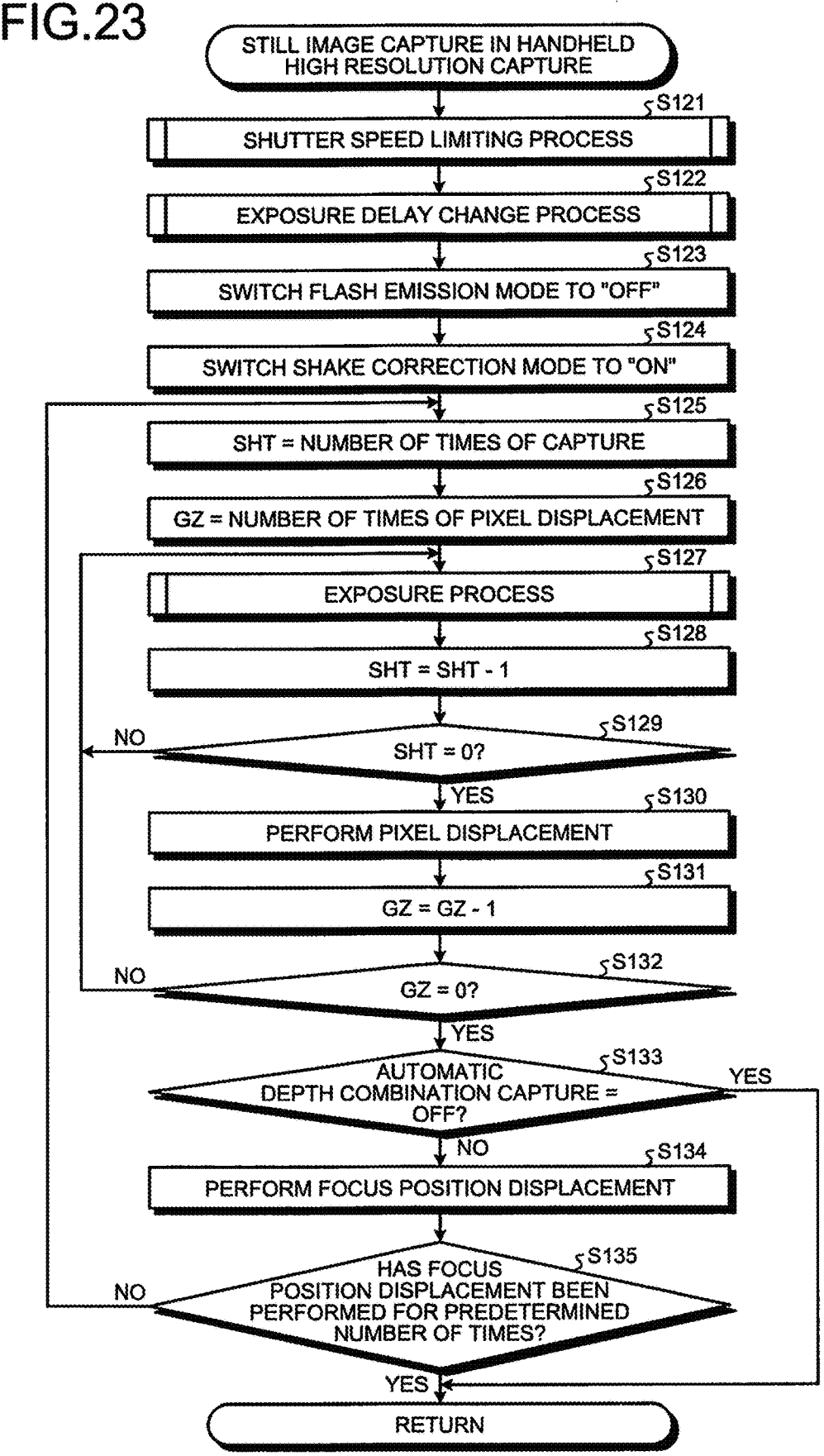
FIG. 23 is a flowchart illustrating an outline of still image capture in handheld high resolution capture in FIG. 10.
Figure 24A:
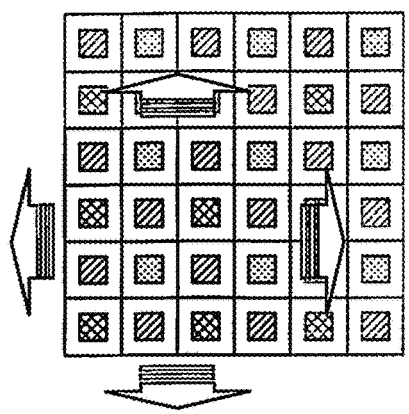
FIG. 24A to FIG. 24H are diagrams schematically illustrating how to perform imaging while displacing pixels in the handheld high resolution capture.
Figure 24B:
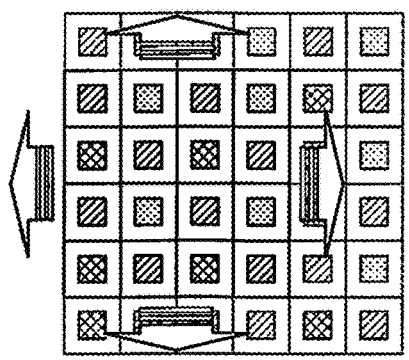
Figure 24C:
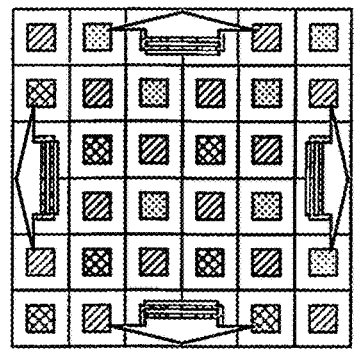
Figure 24D:
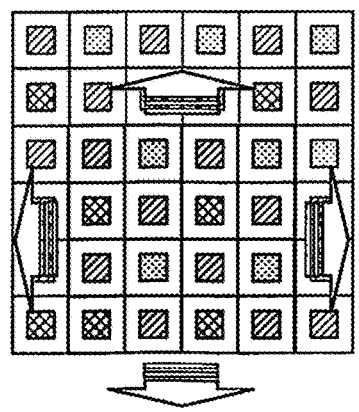
Figure 24E:
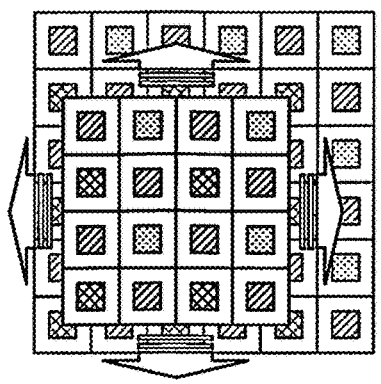
Figure 24F:
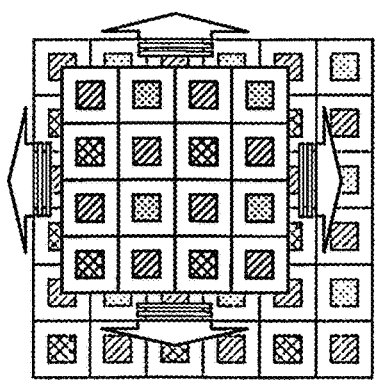
Figure 24G:
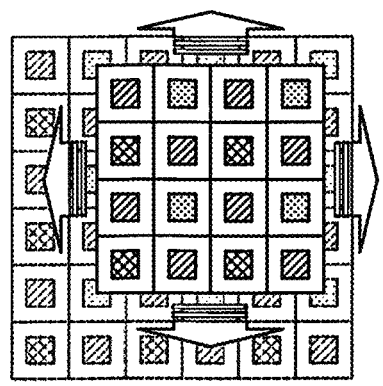
Figure 24H:
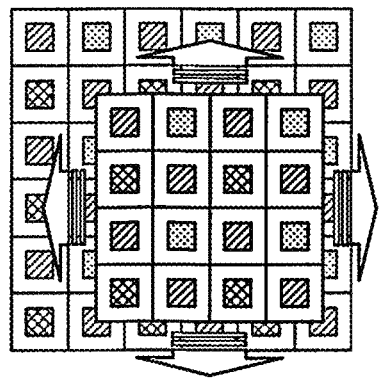

The still image capture in the handheld high resolution capture described at Step S59 in FIG. 10 will be described below. FIG. 23 is a flowchart illustrating an outline of the still image capture in the handheld high resolution capture in FIG. 10.

As illustrated in FIG. 23, first, the system controller 112 performs a process of limiting a shutter speed (Step S121). Details of a shutter speed limiting process will be described later.

Subsequently, the system controller 112 performs a process of changing an exposure delay (Step S122). Details of an exposure delay limiting process will be described later.

Thereafter, the flash controller 130 imposes a limitation to hold the flash (emission mode is turned off) (Step S123). In this manner, the second imaging drive controller 117d may prohibit or limit flash emission performed by the flash controller 130.

Subsequently, the shake correction controller 117b enables the shake correction function (turns on the shake correction mode) (Step S124).

Then, the system controller 112 sets a variable SHT to the number of times of capture (second predetermined number of times) (Step S125).

Thereafter, the system controller 112 sets the variable GZ to the number of times of the pixel displacement (Step S126).

Then, the imaging apparatus 100 performs the same exposure process as performed at Step S74 in FIG. 13 (Step S127).

Subsequently, the system controller 112 calculates the variable SHT such that the variable SHT=SHT−1. In other words, the value of the variable SHT is decremented (Step S128).

At Step S129, if the system controller 112 determines that the variable SHT is not 0 (Step S129: No), the system controller 112 returns to Step S127 and repeats the process. In contrast, at Step S129, if the system controller 112 determines that the variable SHT is 0 (Step S129: Yes), the system controller 112 proceeds to Step S130 to be described later. In other words, the imaging apparatus 100 repeats the exposure process in accordance with the second predetermined number of times. If the HDR capture is turned off, capture is performed for the second predetermined number of times.

Subsequently, the pixel displacement driver 117a causes the shake correction driver 113c to perform pixel displacement to displace the positional relationship between the subject and the imaging sensor 113b, and causes the second imaging drive controller 117d to perform capture (Step S130).

FIG. 24A to FIG. 26C are diagrams schematically illustrating how to perform imaging while displacing pixels in the handheld high resolution capture. FIG. 24A to FIG. 24H are diagrams illustrating how the pixel displacement driver 117a perform the pixel displacement. FIG. 24A to FIG. 24H illustrate an example in which the number of times of the pixel displacement is set to eight. As illustrated in FIG. 24A to FIG. 24H, the pixel displacement driver 117a causes the imaging sensor 113b to perform pixel displacement eight times in a unit of 1 pixel or 0.5 pixel in each direction, and perform capture once in each case while the shake correction controller 117b is caused to perform the shake correction.

Figure 25:
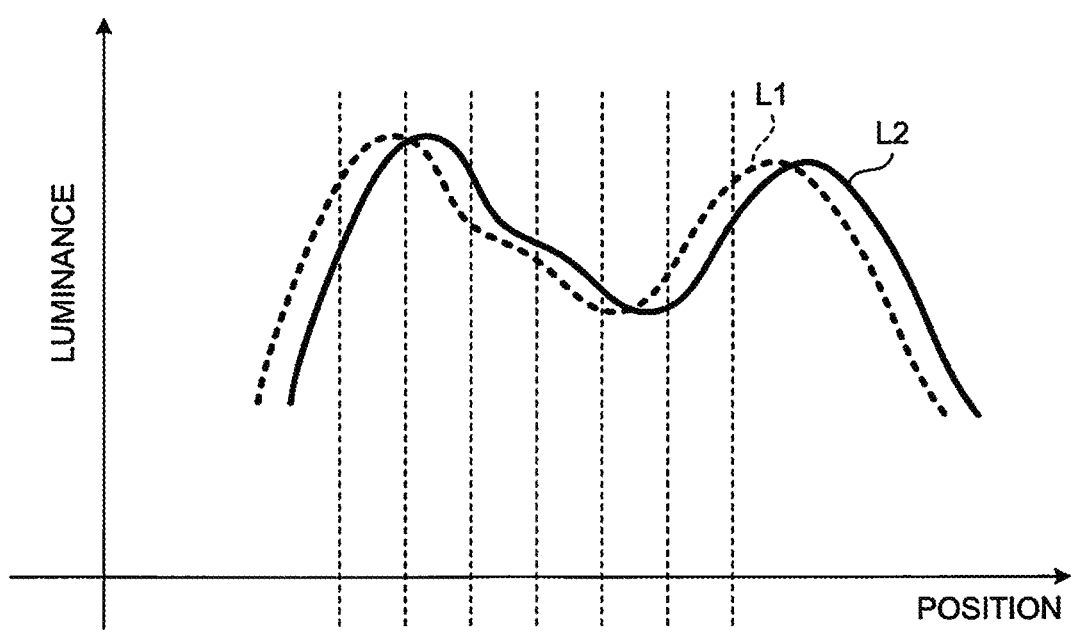
FIG. 25 is a diagram schematically illustrating how to perform imaging while displacing pixels in the handheld high resolution capture.

Images captured by the handheld high resolution capture are affected by oscillation due to a shake. The oscillation is reduced with an increase in a shake correction performance, with a decrease in the amount of a shake transmitted by a photographer or an operator, and with an increase in the shutter speed. FIG. 25 is a diagram for explaining a method of calculating and correcting an amount of oscillation. In FIG. 25, a vertical axis represents luminance and a horizontal axis represents a position in an image (vertical or a horizontal direction). As illustrated in FIG. 25, by performing a relative calculation comparison between luminance curves L1 and L2 of each of the captured images, it is possible to calculate the number of pixels corresponding to displacement in each of the images with accuracy of one pixel pitch or less. In general, oscillation corresponding to about 5 pixels may occur due to shake correction; however, oscillation corresponding to one or more pixels can be cancelled out by performing an image shift process. In the handheld high resolution capture, by performing capture for the second predetermined number of times (for example, eight times) at each pixel displacement position, calculating amounts of oscillation of images obtained by the capture performed eight times to thereby perform shift correction such that each of the images is corrected to an image in which oscillation corresponding to one pixel pitch or more does not occur, and obtaining an average, it is possible to reduce an error due to the oscillation and obtain an image with pixel displacement of one pixel pitch or less as initially desired. Further, it may be possible to obtain a median (majority value) instead of the average; however, it is possible to further reduce noise of images by using the average. In any case, in principle, an angle of view to be captured is reduced due to image shift operation, but shift of about 5 pixels is a substantially negligible error.

Figure 26A:
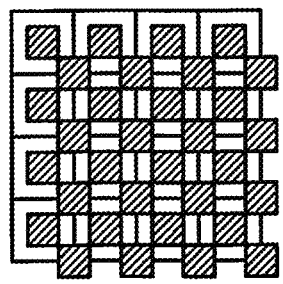
FIG. 26A to FIG. 26C are diagrams schematically illustrating how to perform imaging while displacing pixels in the handheld high resolution capture.
Figure 26B:
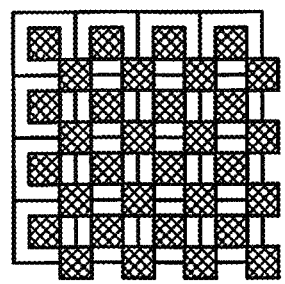
Figure 26C:
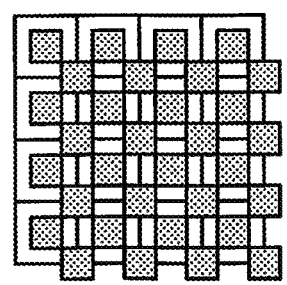

In this manner, it is possible to obtain an eightfold-greater amount of information for each of G pixels in two images as illustrated in FIG. 26A, R pixels in a single image as illustrated in FIG. 26B, and B pixels in a single image as illustrated in FIG. 26C, in each of which an influence of the oscillation is reduced. Then, it is possible to generate a high-resolution image by combining the images as illustrated in FIG. 26A to FIG. 26D. As described above, the second image combiner 115b detects image displacement in a group of captured images (second group of images) in a unit of a pixel pitch or less, shifts the image data such that displacement is one pixel pitch or less with respect to the target pixel displacement, and combines the image data. Further, the number of times of the pixel displacement may be four or two, in the same manner as in the tripod high resolution capture as described above.

Referring back to FIG. 23, at Step S131, the system controller 112 performs a calculation such that the variable GZ=GZ−1. In other words, the value of the variable GZ is decremented.

At Step S132, if the system controller 112 determines that the variable GZ is not 0 (Step S132: No), the system controller 112 returns to Step S127 and repeats the process. In contrast, at Step S132, if the system controller 112 determines that the variable GZ is 0 (Step S132: Yes), the system controller 112 proceeds to Step S133 to be described later. In other words, the imaging apparatus 100 performs capture for the second predetermined number of times at each pixel displacement position in accordance with the pre-set number of times of the pixel displacement.

Step S133 to S135 are the same processes as those at Step S98 to S100 in FIG. 13. Thereafter, the process returns to the subroutine in FIG. 10.

As described above, according to the first embodiment, even in a situation in which the imaging apparatus 100 is held by hand and a shake occurs, it is possible to capture a high-resolution image (handheld high resolution capture) while performing the shake correction.

Figure 27:
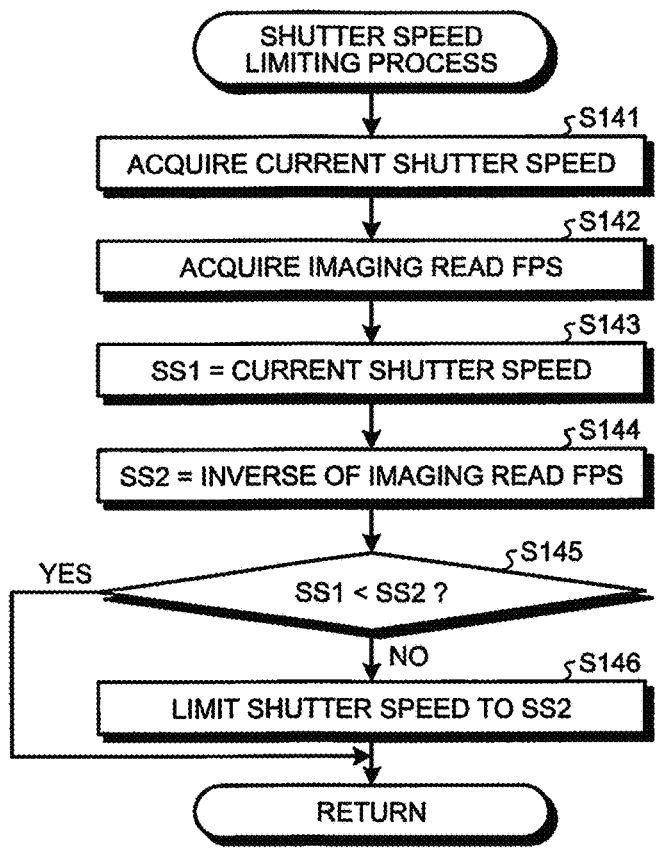
FIG. 27 is a flowchart illustrating an outline of a shutter speed limiting process in FIG. 23.

The shutter speed limiting process described at Step S121 in FIG. 23 will be described below. In the handheld high resolution capture, it is preferable to increase the shutter speed as much as possible and complete capture at a high speed in order to reduce a shake while capturing a plurality of images. FIG. 27 is a flowchart illustrating an outline of the shutter speed limiting process in FIG. 23.

As illustrated in FIG. 27, first, the system controller 112 acquires a current shutter speed (Step S141).

Subsequently, the system controller 112 acquires an imaging read fps in the imager 113 (Step S142).

Then, the system controller 112 sets a variable SS1 to the current shutter speed (Step S143).

Further, the system controller 112 sets a variable SS2 to an inverse of the imaging read fps (Step S144).

At Step S145, if the system controller 112 determines that the variable SS1<the variable SS2 (Step S145: Yes), the system controller 112 returns to the subroutine illustrated in FIG. 23. In other words, the current shutter speed is maintained at the variable SS1.

At Step S145, if the system controller 112 does not determine that the variable SS1<the variable SS2 (Step S145: No), the system controller 112 limits the shutter speed to the variable SS2 (Step S146). Thereafter, the process returns to the subroutine illustrated in FIG. 23. In other words, the shutter speed is set to the variable SS2 that is the inverse of the imaging read fps. Thereafter, the second imaging drive controller 117d performs the handheld high resolution capture at the set shutter speed.

As described above, the second imaging drive controller 117d may limit the lower limit value of the shutter speed of the shutter. If the shutter speed is smaller than the inverse of the imaging read fps, i.e., a time taken to imaging and reading, it is possible to reduce a capture time taken to capture a plurality of images. For example, if the fastest fps for imaging and reading is 60 fps, a shortest time taken to imaging and reading is 1/60 second. Therefore, if the shutter speed is limited to a speed higher than 1/60 second, it is possible to maintain the shortest time for continuous capture.

Figure 28:
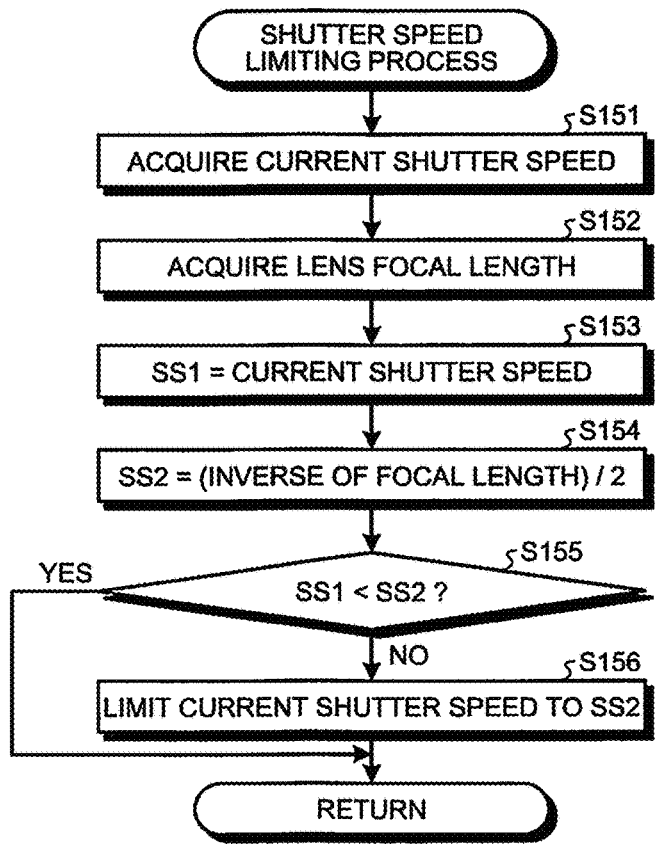
FIG. 28 is a flowchart illustrating an outline of a modification of the shutter speed limiting process in FIG. 23.

A first modification of the shutter speed limiting process described at Step S121 in FIG. 23 will be described. FIG. 28 is a flowchart illustrating an outline of the modification of the shutter speed limiting process in FIG. 23.

As illustrated in FIG. 28, first, the system controller 112 acquires the current shutter speed similarly to Step S141 in FIG. 27 (Step S151).

Subsequently, the system controller 112 acquires a lens focal length of the lens part 20 via the lens communicator 118 and the communication controller 111 (Step S152).

Then, the system controller 112 sets the variable SS1 to the current shutter speed (Step S153).

Further, the system controller 112 sets the variable SS2 to a half of an inverse of the lens focal length of the lens part 20 (Step S154).

At Step S155, if the system controller 112 determines that the variable SS1<the variable SS2 (Step S155: Yes), the system controller 112 returns to the subroutine illustrated in FIG. 23. In other words, the current shutter speed is maintained at the variable SS1.

At Step S155, if the system controller 112 does not determine that the variable SS1<the variable SS2 (Step S155: No), the system controller 112 limits the shutter speed to the variable SS2 (Step S156). Thereafter, the process returns to the subroutine illustrated in FIG. 23. In other words, the shutter speed is set to the variable SS2 that is the half of the inverse of the lens focal length of the lens part 20.

As described above, it may be possible to limit the lower limit value of the shutter speed in accordance with the lens focal length of the lens part 20. The shutter speed as the inverse of the lens focal length of the lens part 20 is what is called a "shake time", and is the speed that does not cause a shake to occur as long as the shutter speed is higher than the shake time. However, the shake can be prevented in a case where a single image is captured, and therefore, if a plurality of images are to be captured as in the handheld high resolution capture, it is necessary to perform correction using the shake correction function.

Figure 29:
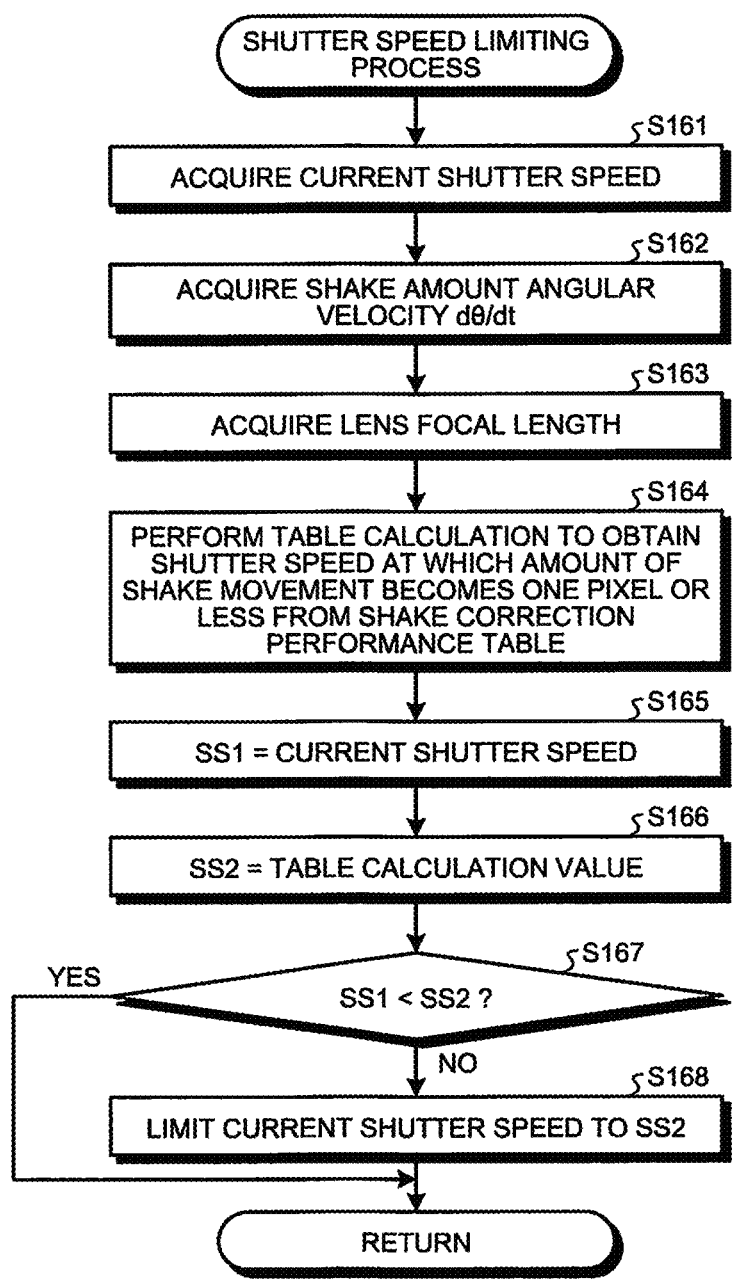
FIG. 29 is a flowchart illustrating an outline of a modification of the shutter speed limiting process in FIG. 23.

A second modification of the shutter speed limiting process described at Step S121 in FIG. 23 will be described below. FIG. 29 is a flowchart illustrating an outline of the modification of the shutter speed limiting process in FIG. 23.

As illustrated in FIG. 29, first, the system controller 112 acquires the current shutter speed similarly to Step S141 in FIG. 27 (Step S161).

Subsequently, the system controller 112 acquires a shake amount angular velocity $d\theta/dt$ from the shake detector 119 (Step S162).

Thereafter, similarly to Step S152 in FIG. 28, the system controller 112 acquires the lens focal length of the lens part 20 via the lens communicator 118 and the communication controller 111 (Step S163).

Figure 30:
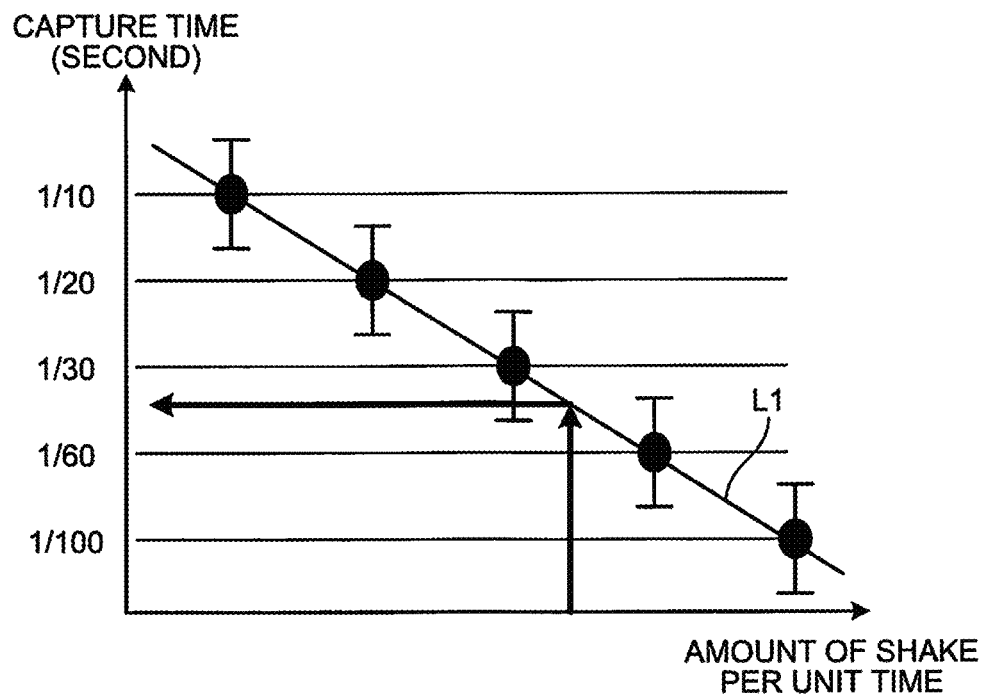
FIG. 30 is a diagram for schematically explaining how to limit a shutter speed.

Subsequently, the system controller 112 performs a table calculation to obtain a shutter speed at which a shake movement amount becomes one pixel or less from a shake correction performance table that is different for each focal length (Step S164). FIG. 30 is a diagram for schematically explaining how to limit the shutter speed. In FIG. 30, a vertical axis represents the shutter speed at which the shake movement amount becomes one pixel or less, and a horizontal axis represents an amount of shake (converted to the number of pixels) per unit time. Therefore, as indicated by a straight line L1 in FIG. 30, by limiting the shutter speed to a high-speed side with an increase in the amount of shake, it is possible to reduce the influence of a shake during exposure to one pixel or less.

Then, the system controller 112 sets the variable SS1 to the current shutter speed (Step S165).

Further, the system controller 112 sets the variable SS2 to a table calculation value obtained at Step S164 (Step S166).

At Step S167, if the system controller 112 determines that the variable SS1<the variable SS2 (Step S167: Yes), the system controller 112 returns to the subroutine in FIG. 23. In other words, the current shutter speed is maintained at the variable SS1.

At Step S167, if the system controller 112 does not determine that the variable SS1<the variable SS2 (Step S167: No), the system controller 112 limits the shutter speed to the variable SS2 (Step S168). Thereafter, the process returns to the subroutine in FIG. 23. In other words, the shutter speed is set to the variable SS2 as the shutter speed at which the influence of the shake is reduced to one pixel or less.

As described above, it may be possible to limit the lower limit value of the shutter speed in accordance with the amount of the shake detected by the shake detector 119.

Figure 31:
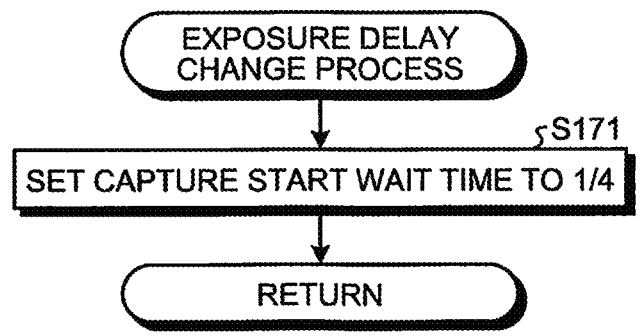
FIG. 31 is a flowchart illustrating an outline of an exposure delay change process in FIG. 23.

The exposure delay change process described at Step S122 in FIG. 23 will be described below. FIG. 31 is a flowchart illustrating an outline of the exposure delay change process in FIG. 23.

As illustrated in FIG. 31, the system controller 112 sets a wait time until capture (capture start wait time) after operation (full-press) on the capture start switch of the capture instruction operation button 124a to ¼ second (Step S171). As a result, the second imaging drive controller 117d performs the handheld high resolution capture after providing a delay between an input of capture start operation and a capture start time.

By setting the capture start wait time, it is possible to start capture after a shake of the imaging apparatus 100 that has occurred in response to pressing the capture instruction operation button 124a is reduced.

Figure 32:
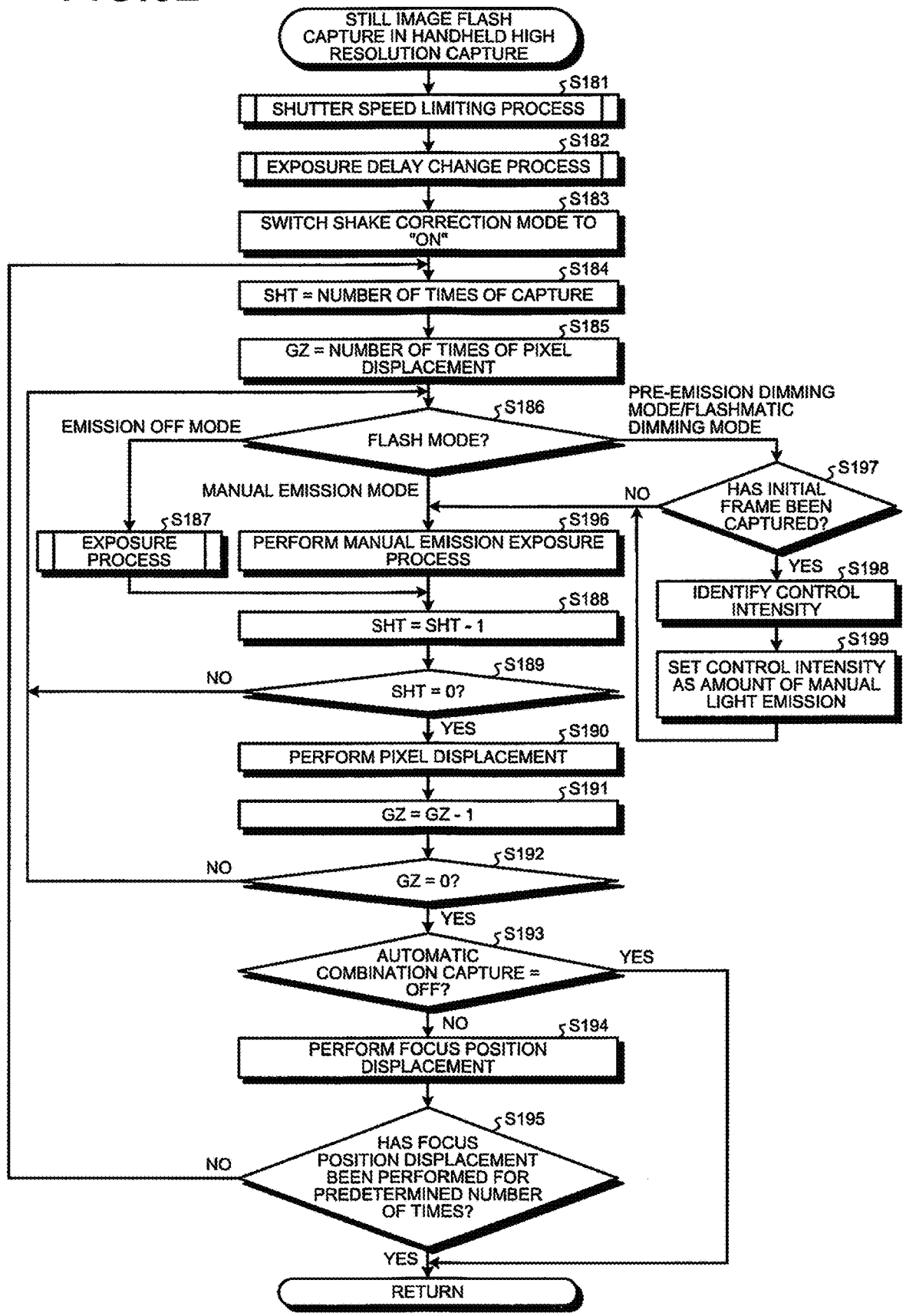
FIG. 32 is a flowchart illustrating an outline of a process in a case where flash is used in the still image capture in the handheld high resolution capture in FIG. 10.

Still image flash capture in the handheld high resolution capture will be described below as a modification of the still image capture in the handheld high resolution capture described at Step S59 in FIG. 10. FIG. 32 is a flowchart illustrating an outline of the process in a case where flash is used in the still image capture in the handheld high resolution capture in FIG. 10.

As illustrated in FIG. 32, first, processes from Steps S181 to S185 are performed similarly to Steps S121, S122, S124, S125, and S126 in FIG. 23.

Subsequently, the system controller 112 determines a flash mode (Step S186). At Step S186, if the system controller 112 determines that the flash is stopped (Step S186: emission OFF mode), the system controller 112 performs the same exposure process as performed at Step S74 in FIG. 13 (Step S187). Thereafter, processes from Steps S188 to S195 are performed similarly to Steps S128 to S135 in FIG. 23.

At Step S186, if the system controller 112 determines that a flash emission mode is set to a manual emission mode (Step S186: manual emission mode), the system controller 112 performs the same exposure process (manual emission exposure process) as performed at Step S74 in FIG. 13 at an amount of flash light that is set in response to an input of a user (Step S196).

At Step S186, if the system controller 112 determines that a pre-emission intensity control mode based on pre-emission control or a flashmatic intensity control mode is set (Step S186: pre-emission dimming mode/flashmatic intensity control mode), the system controller 112 determines whether an initial frame has been captured (Step S197).

At Step S197, if the system controller 112 determines that the initial frame has been captured (Step S197: Yes), the system controller 112 identifies a control intensity (Step S198). Specifically, in the case of the pre-emission intensity control mode, the system controller 112 causes the flash controller 130 to cause the flash emitter 128 to perform pre-emission, and causes the imaging sensor 113b of the imager 113 to detect reflected light from the subject, to thereby identify the control intensity. Further, in the case of the flashmatic intensity control mode, the system controller 112 detects a distance from the subject and identifies the control intensity in accordance with a calculation formula such that a guide number=ISO sensitivity/100×effective F number/subject distance.

Thereafter, the system controller 112 sets the identified control intensity as an amount of manual light emission (Step S199), and performs the same exposure process as performed at Step S74 in FIG. 13 at the set intensity (manual emission exposure process) (Step S196). In this manner, it is possible to fix and stabilize a light emission intensity for a plurality of subsequent frames to the light emission intensity for the initially captured frame, so that it is possible to prevent occurrence of artifact that is caused by an exposure difference between the frames at the time of combination.

As described above, in the handheld high resolution capture, by controlling light intensity using the manual control, the pre-intensity control, or the flashmatic intensity control in advance, and thereafter performing a series of handheld high resolution capture by using the control intensity, it is possible to perform the handheld high resolution capture by using the flash.

Figure 33:
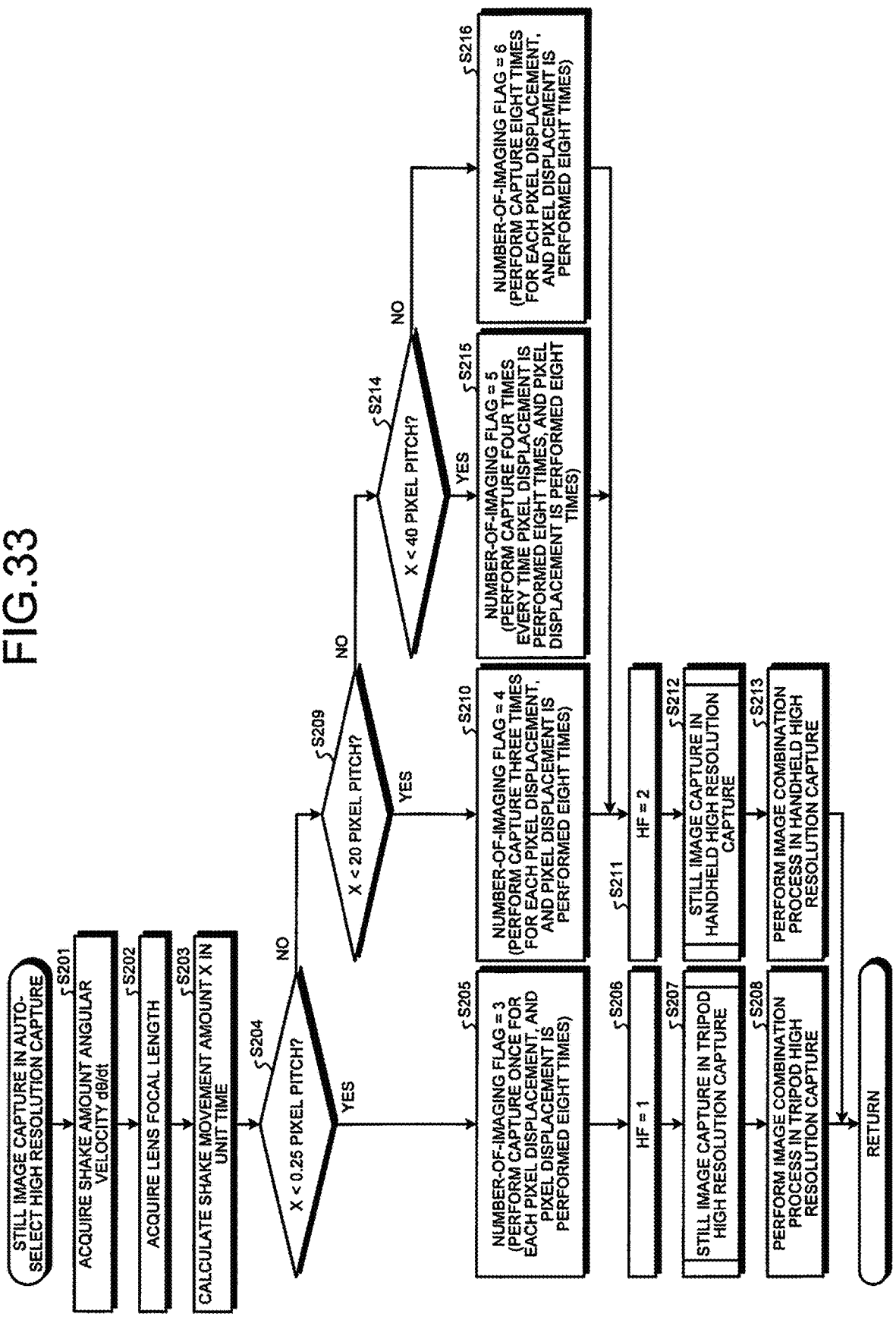
FIG. 33 is a flowchart illustrating an outline of still image capture in auto-select high resolution capture in FIG. 10.

The still image capture in the auto-select high resolution capture described at Step S61 in FIG. 10 will be described below. FIG. 33 is a flowchart illustrating an outline of the still image capture in the auto-select high resolution capture in FIG. 10.

As illustrated in FIG. 33, first, the system controller 112 acquires a shake amount angular velocity dθ/dt from the shake detector 109 or the shake detector 119 (Step S201).

Subsequently, the system controller 112 acquires the lens focal length of the lens part 20 via the lens communicator 118 and the communication controller 111 (Step S202).

Thereafter, the system controller 112 calculates a shake movement amount X per unit time (Step S203).

At Step S204, if the system controller 112 determines that the movement amount X<a 0.25 pixel pitch (Step S204: Yes), the imaging drive controller 117 sets a number-of-imaging flag to 3 (Step S205). Specifically, setting the number-of-imaging flag to 3 is to make a setting for performing capture once for each pixel displacement position and performing the pixel displacement eight times.

Subsequently, the system controller 112 sets a high resolution capture flag (HF) to 1 (Step S206).

Thereafter, the imaging switch unit 117e causes the first imaging drive controller 117c to perform imaging in accordance with the high resolution mode flag for the first predetermined number of times corresponding to the number-of-imaging flag. Specifically, the still image capture in the tripod high resolution capture as illustrated in FIG. 13 is performed once for each pixel displacement position (Step S207), and the first image combiner 115a of the image processor 115 combines the first group of images captured by the tripod high resolution capture to generate the first high-resolution image (Step S208). Thereafter, the process returns to the subroutine in FIG. 10.

At Step S204, if the system controller 112 does not determine that the movement amount X<a 0.25 pixel pitch (Step S204: No), and the system controller 112 determines that the movement amount X<a 20 pixel pitch (Step S209: Yes), the imaging drive controller 117 sets the number-of-imaging flag to 4 (Step S210). Specifically, setting the number-of-imaging flag to 4 is to make a setting for performing capture three times for each pixel displacement position and performing the pixel displacement eight times.

Subsequently, the system controller 112 sets the high resolution capture flag (HF) to 2 (Step S211).

Thereafter, the imaging switch unit 117e causes the second imaging drive controller 117d to perform imaging in accordance with the high resolution capture flag for the second predetermined number of times in accordance with the number-of-imaging flag. Specifically, the still image capture in the tripod high resolution capture as illustrated in FIG. 23 is performed three times for each pixel displacement position (Step S212), and the second image combiner 115b of the image processor 115 combines images captured by the handheld high resolution capture for the second predetermined number of times to generate the second high-resolution image (Step S213). Thereafter, the process returns to the subroutine in FIG. 10.

At Step S209, if the system controller 112 does not determine that the movement amount X<a 20 pixel pitch (Step S209: No), and the system controller 112 determines that the movement amount X<a 40 pixel pitch (Step S214: Yes), the imaging drive controller 117 sets the number-of-imaging flag to 5 (Step S215). Specifically, setting the number-of-imaging flag to 5 is to make a setting for performing capture five times for each pixel displacement position and performing the pixel displacement eight times (second predetermined number). Thereafter, the system controller 112 proceeds to Step S211. Then, the imaging switch unit 117e causes the second imaging drive controller 117d to perform imaging in accordance with the high resolution capture flag for the second predetermined number of times corresponding to the number-of-imaging flag.

At Step S214, if the system controller 112 does not determine that the movement amount X<a 40 pixel pitch (Step S214: No), the imaging drive controller 117 sets the number-of-imaging flag to 6 (Step S216). Specifically, setting the number-of-imaging flag to 6 is to make a setting for performing capture eight times for each pixel displacement position and performing the pixel displacement eight times. Thereafter, the system controller 112 proceeds to Step S211. Then, the imaging switch unit 117e causes the second imaging drive controller 117d to perform capture in accordance with the high resolution capture flag for the second predetermined number of times corresponding to the number-of-imaging flag.

As described above, the imaging switch unit 117e switches between the imaging performed by the first imaging drive controller 117c and the imaging performed by the second imaging drive controller 117d based on the detection result obtained by the shake detector 109 or the shake detector 119. In the auto-select high resolution capture, it is possible to capture the first high-resolution image by performing the tripod high resolution capture if a shake is less in accordance with the amount of the shake, and it is possible to capture the second high-resolution image by performing the handheld high resolution capture if the amount of the shake is large.

Further, the second imaging drive controller 117d changes the second predetermined number of times based on the detection result obtained by the shake detector 109 or the shake detector 119. As a result, in the handheld high resolution capture, by increasing the number of times of capture with an increase in the shake, it is possible to improve the possibility that a clear image can be captured as the second high-resolution image.

Figure 34:
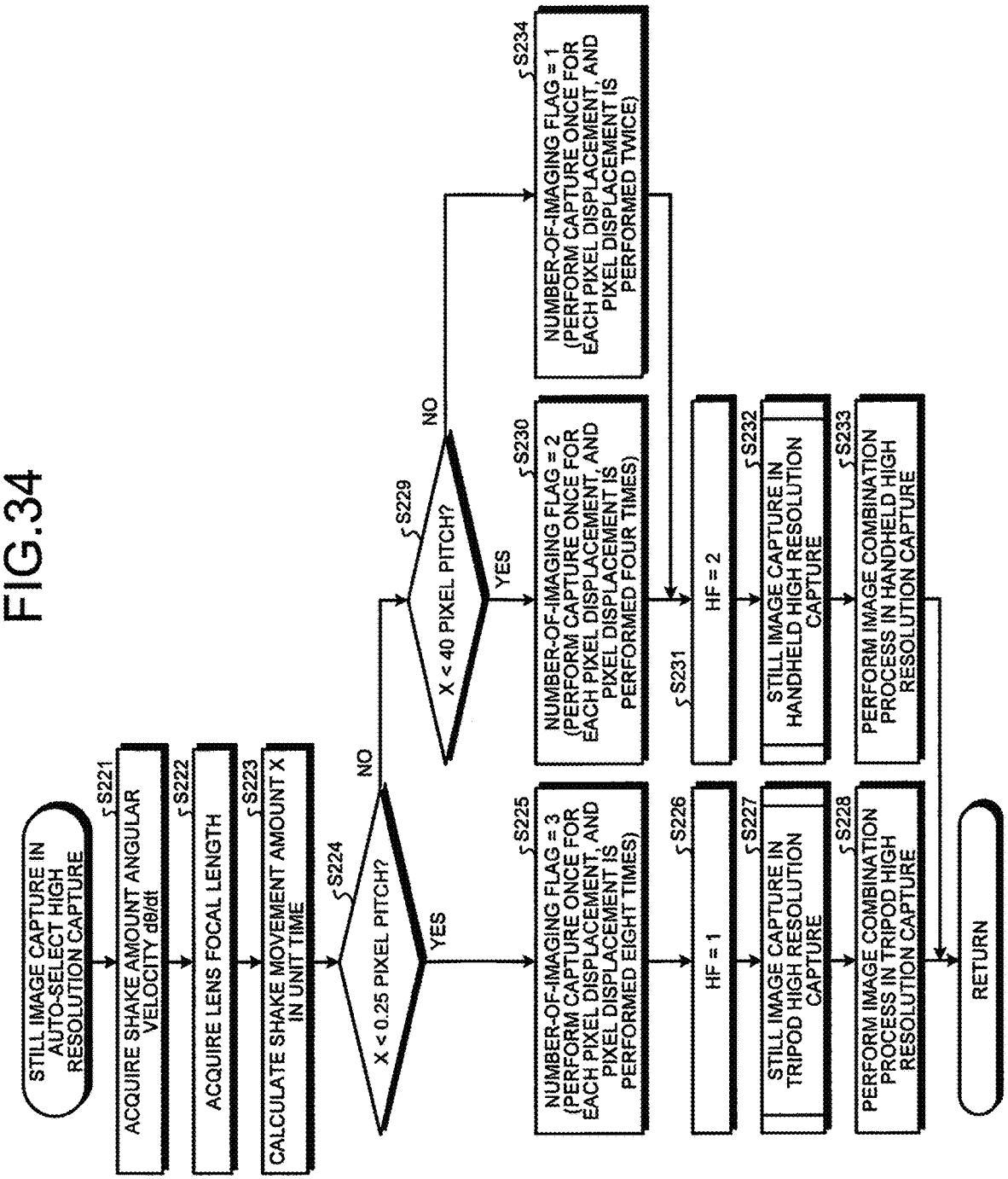
FIG. 34 is a flowchart illustrating an outline of a modification of the still image capture in the auto-select high resolution capture in FIG. 10.

A modification of the still image capture in the auto-select high resolution capture described at Step S61 in FIG. 10 will be described below. FIG. 34 is a flowchart illustrating an outline of the modification of the still image capture in the auto-select high resolution capture in FIG. 10.

As illustrated in FIG. 34, processes from Steps S221 to S228 are the same as the processes at Steps S201 to S208 in FIG. 33.

At Step S224, if the system controller 112 does not determine that the movement amount X<a 0.25 pixel pitch (Step S224: No), and the system controller 112 determines that the movement amount X<a 40 pixel pitch (Step S229: Yes), the imaging drive controller 117 sets the number-of-imaging flag to 2 (Step S230). Specifically, setting the number-of-imaging flag to 2 is to make a setting for performing capture once for each pixel displacement position and performing the pixel displacement four times.

Subsequently, the system controller 112 sets the high resolution capture flag (HF) to 2 (Step S231).

Thereafter, the second imaging drive controller 117d performs the still image capture in the handheld high resolution capture illustrated in FIG. 23 for a certain number of times of the pixel displacement corresponding to the number-of-imaging flag (Step S232), and the second image combiner 115b of the image processor 115 combines the images captured by the handheld high resolution capture for the second predetermined number of times to generate the second high-resolution image (Step S233). Thereafter, the process returns to the subroutine in FIG. 10.

At Step S229, if the system controller 112 does not determine that the movement amount X<a 40 pixel pitch (Step S229: No), the imaging drive controller 117 sets the number-of-imaging flag to 1 (Step S234). Specifically, setting the number-of-imaging flag to 1 is to make a setting for performing capture once for each pixel displacement position and performing the pixel displacement twice. Thereafter, the system controller 112 proceeds to Step S231, and the second imaging drive controller 117d performs the still image capture in the handheld high resolution capture for the number of times of the pixel displacement corresponding to the number-of-imaging flag.

As described above, the second imaging drive controller 117d changes the number of times of the pixel displacement based on the detection result obtained by the shake detector 109. In the auto-select high resolution capture, by reducing the number of times of imaging with an increase in the shake in the handheld high resolution capture, it is possible to reduce a total imaging time, reduce the influence of the shake, and improve the possibility that a clear image can be captured as the second high-resolution image.

Figure 35:
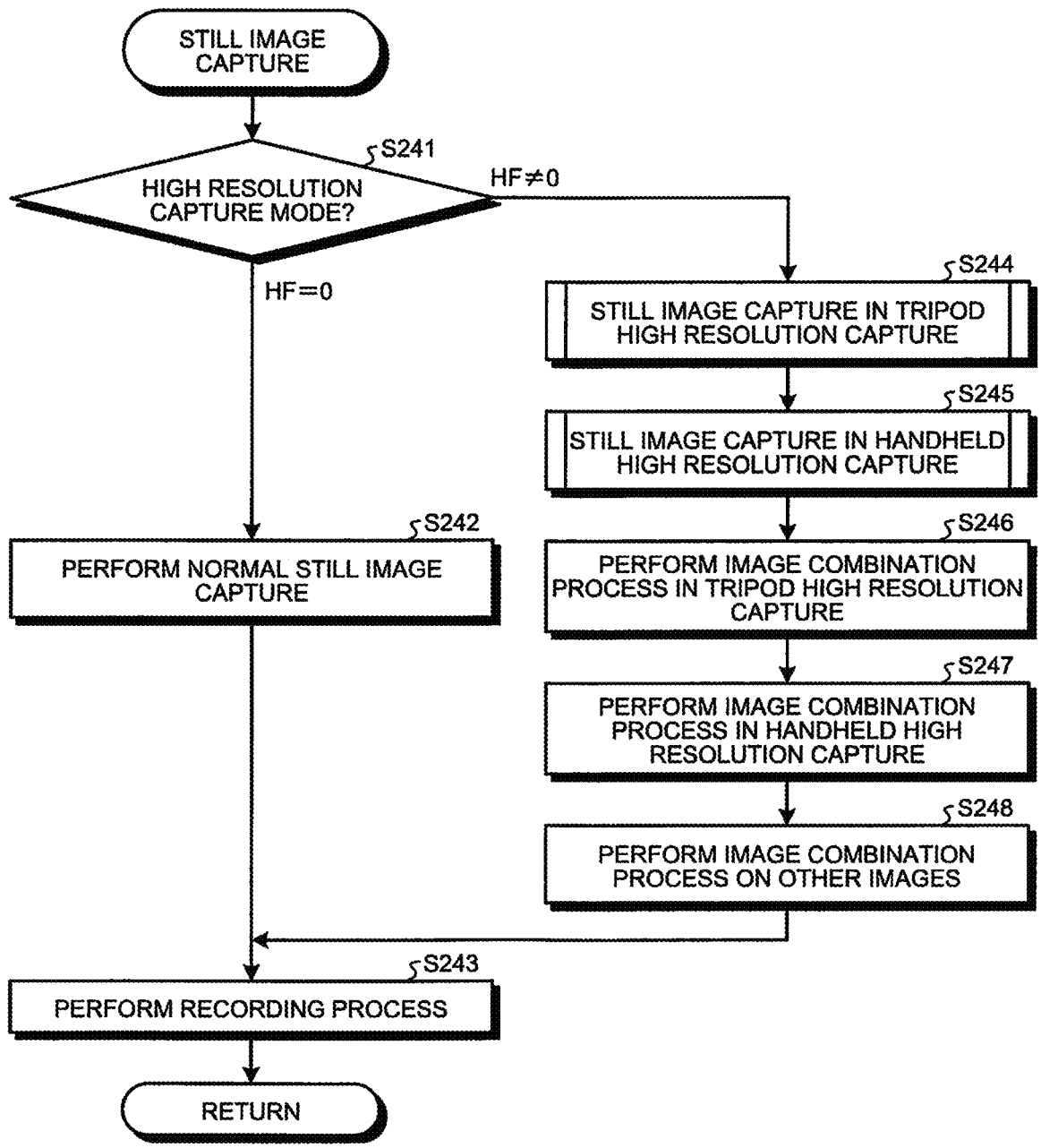
FIG. 35 is a flowchart illustrating an outline of a modification of the still image capture in FIG. 5.

A first modification of the still image capture described at Step S7 in FIG. 5 and FIG. 10 will be described below. FIG. 35 is a flowchart illustrating an outline of the modification of the still image capture in FIG. 5.

As illustrated in FIG. 35, first, the system controller 112 determines whether the setting of the imaging apparatus 100 indicates the state for performing the normal imaging instead of the high resolution capture (HF=0) or the state for performing the high resolution capture (HF=0), similarly to Step S52 in FIG. 10 (Step S241). If the system controller 112 determines that the setting of the imaging apparatus 100 indicates the state for performing the normal imaging (Step S241: HF=0), the imaging apparatus 100 proceeds to Step S242 to be described later. In contrast, if the system controller 112 determines that the setting of the imaging apparatus 100 indicates the state for performing the high resolution capture (Step S241: HF≠0), the imaging apparatus 100 proceeds to Step S244 to be described later.

At Step S242, the imaging apparatus 100 causes the imaging drive controller 117 to control the imager 113 so as to perform the normal still image capture without using the high resolution capture function. Further, the imaging apparatus 100 performs a process of causing the image processor 115 to perform predetermined image processing on an image captured by the imager 113 and record the image in the memory 116 (Step S243). Thereafter, the imaging apparatus 100 returns to the main routine in FIG. 5.

At Step S244, the imaging apparatus 100 performs processes from Steps S244 to S248, similarly to Steps S56, S59, S57, S60, and S58 in FIG. 10. In other words, the imaging switch unit 117e alternatively and continuously performs imaging by the first imaging drive controller 117c (tripod high resolution capture) and imaging by the second imaging drive controller 117d (handheld high resolution capture).

As described above, the imaging apparatus 100 may perform both of the tripod high resolution capture and the handheld high resolution capture, and may generate both of the first high-resolution image and the second high-resolution image. Even if the tripod high resolution capture is unsuccessful due to the influence of a shake or the like, in some cases, the handheld high resolution capture may be successful, so that a success rate of the high resolution capture can be improved. The user may compare the first high-resolution image and the second high-resolution image and use a preferred one of the images. It is preferable to first perform capture at Steps S244 and S245, and thereafter perform the image combination process at Steps S246 and S247. By performing the image combination process that takes several seconds to several tens of seconds after capture, it is possible to reduce a time during which the user needs to hold the imaging apparatus 100.

Figure 36:
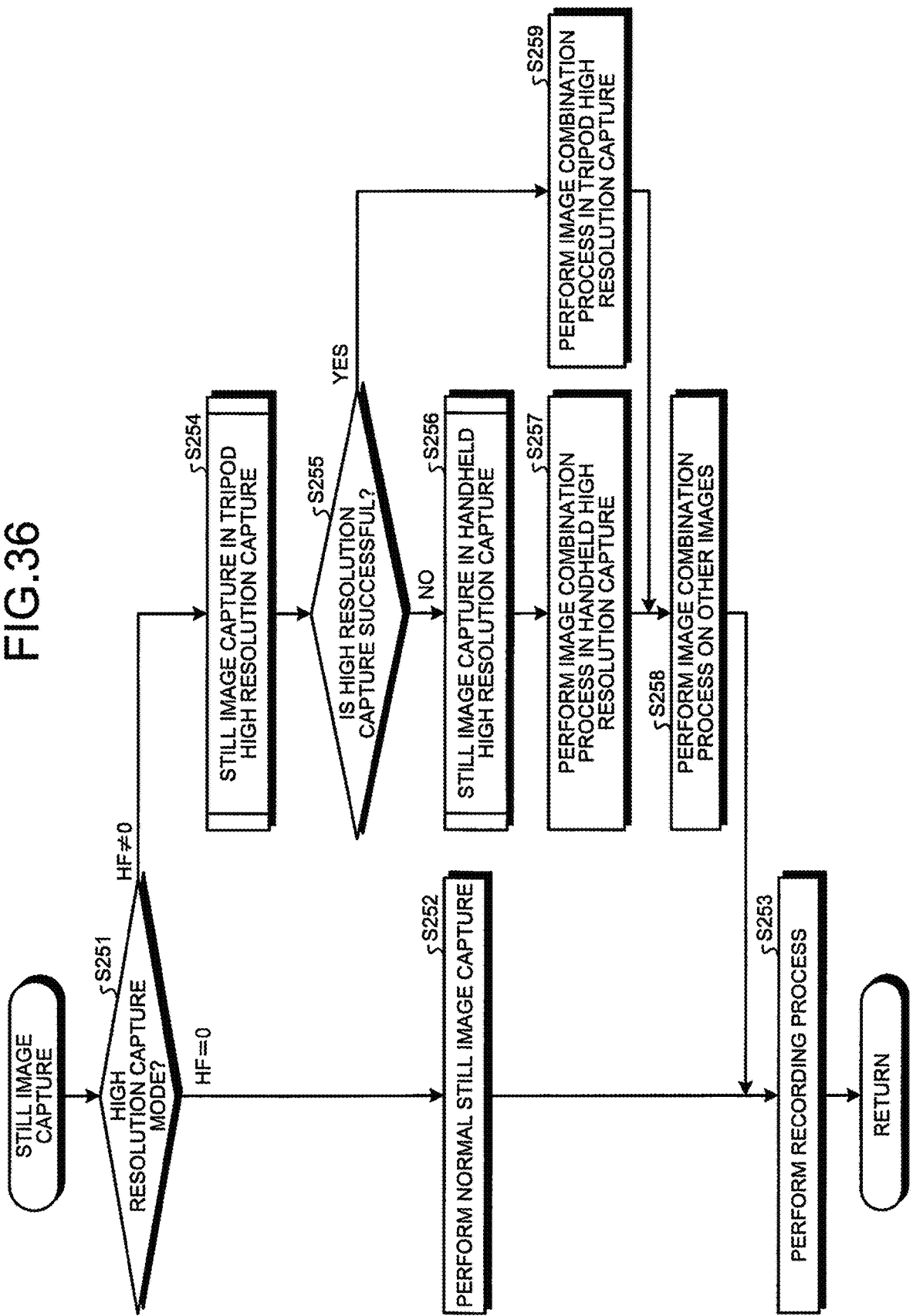
FIG. 36 is a flowchart illustrating an outline of a modification of the still image capture in FIG. 5.

A second modification of the still image capture described at Step S7 in FIG. 5 and FIG. 10 will be described below. FIG. 36 is a flowchart illustrating an outline of the modification of the still image capture in FIG. 5.

As illustrated in FIG. 36, first, the system controller 112 determines whether the setting of the imaging apparatus 100 indicates the state for performing the normal imaging instead of the high resolution capture (HF=0) or the state for performing the high resolution capture (HF≠1), similarly to Step S52 in FIG. 10 (Step S251). If the system controller 112 determines that the setting of the imaging apparatus 100 indicates the state for performing the normal imaging (Step S251: HF=0), the imaging apparatus 100 proceeds to Step S252 to be described later. In contrast, if the system controller 112 determines that the setting of the imaging apparatus 100 indicates the state for performing the high resolution capture (Step S251: HF≠0), the imaging apparatus 100 proceeds to Step S254 to be described later.

At Step S252, the imaging apparatus 100 causes the imaging drive controller 117 to control the imager 113 so as to perform the normal still image capture without using the high resolution capture function. Further, the imaging apparatus 100 performs a process of causing the image processor 115 to perform predetermined image processing on an image captured by the imager 113 and record the image in the memory 116 (Step S253). Thereafter, the imaging apparatus 100 returns to the main routine in FIG. 5.

At Step S254, the imaging apparatus 100 performs the tripod high resolution capture similarly to Step S56 in FIG. 10. Further, the system controller 112 determines whether the tripod high resolution capture is successful on the basis of the captured image (Step S255). It is sufficient to perform the determination on whether the tripod high resolution capture is successful on the basis of whether an amount of a shake during the tripod high resolution capture is within a threshold.

At Step S255, if the system controller 112 determines that the tripod high resolution capture is not successful (Step S255: No), the imaging apparatus 100 performs the handheld high resolution capture similarly to Step S59 in FIG. 10 (Step S256). Further, the imaging apparatus 100 perform processes at Steps S257 and S258 similarly to the processes at Steps S60 and S58 in FIG. 10.

At Step S255, if the system controller 112 determines that the tripod high resolution capture is successful (Step S255: Yes), the imaging apparatus 100 performs the image combination process in the tripod high resolution capture similarly to Step S57 in FIG. 10 (Step S259).

As described above, the imaging apparatus 100 may generate the first high-resolution image when the tripod high resolution capture is successful, and may perform the handheld high resolution capture to generate the second high-resolution image when the tripod high resolution capture is not successful. When the tripod high resolution capture is successful, it is not necessary to perform the handheld high resolution capture, so that it is possible to reduce a capture time because the handheld high resolution capture is not performed.

Figure 37:
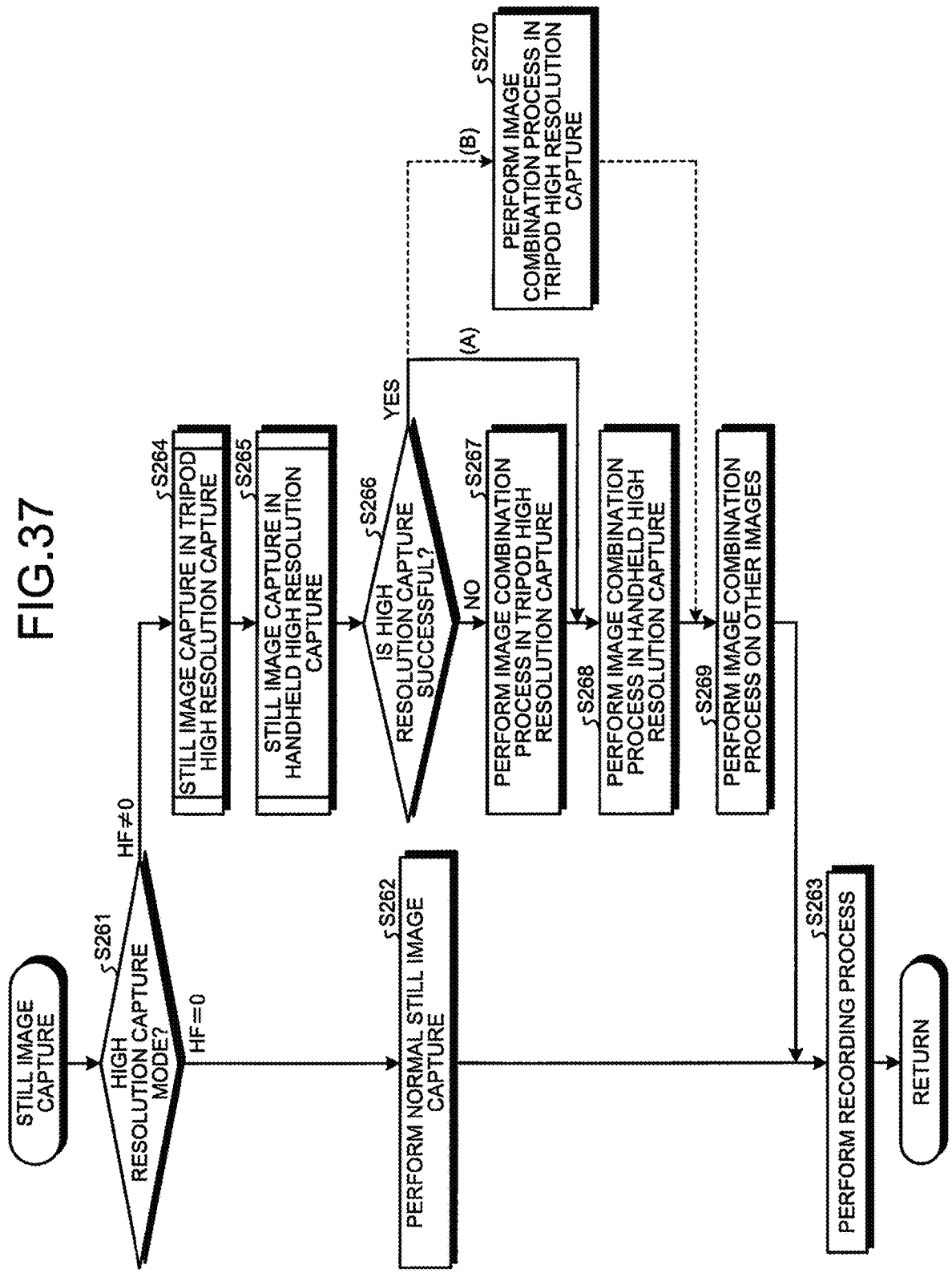
FIG. 37 is a flowchart illustrating an outline of a modification of the still image capture in FIG. 5.

A first modification of the still image capture described at Step S7 in FIG. 5 and FIG. 10 will be described below. FIG. 37 is a flowchart illustrating an outline of the modification of the still image capture in FIG. 5.

As illustrated in FIG. 37, first, the system controller 112 determines whether the setting of the imaging apparatus 100 indicates the state for performing the normal imaging instead of the high resolution capture (HF=0) or the state for performing the high resolution capture (HF≠1), similarly to Step S52 in FIG. 10 (Step S261). If the system controller 112 determines that the setting of the imaging apparatus 100 indicates the state for performing the normal imaging (Step S261: HF=0), the imaging apparatus 100 proceeds to Step S262 to be described later. In contrast, if the system controller 112 determines that the setting of the imaging apparatus 100 indicates the state for performing the high resolution capture (Step S241: HF≠0), the imaging apparatus 100 proceeds to Step S264 to be described later.

At Step S262, the imaging apparatus 100 causes the imaging drive controller 117 to control the imager 113 so as to perform the normal still image capture without using the high resolution capture function. Further, the imaging apparatus 100 performs a process of causing the image processor 115 to perform predetermined image processing on an image captured by the imager 113 and record the image in the memory 116 (Step S263). Thereafter, the imaging apparatus 100 returns to the main routine in FIG. 5.

At Step S264, the imaging apparatus 100 performs processes at Steps S264 and S265 similarly to Steps S56 and S59 in FIG. 10.

Subsequently, the system controller 112 determines whether the tripod high resolution capture is successful on the basis of the captured image (Step S266).

At Step S266, if the system controller 112 determines that the tripod high resolution capture is not successful (Step S266: No), the imaging apparatus 100 performs processes from Steps S267 to S269 similarly to Steps S57, S60, and S58 in FIG. 10.

At Step S266, if the system controller 112 determines that the tripod high resolution capture is successful (Step S266: Yes (A)), the imaging apparatus 100 performs the image combination process in the handheld high resolution capture similarly to Step S59 in FIG. 10 (Step S268). In this manner, when the tripod high resolution capture is successful, it is highly likely that the handheld high resolution capture is also successful, so that it may be possible to generate only the second high-resolution image by the handheld high resolution capture in which an SN ratio is improved.

Further, at Step S266, if the system controller 112 determines that the tripod high resolution capture is successful (Step S266: Yes (B)), the imaging apparatus 100 performs the image combination process in the tripod high resolution capture similarly to Step S57 in FIG. 10 (Step S270). In this manner, when the tripod high resolution capture is successful, it may be possible to generate the first high-resolution image by performing only the combination process in the tripod high resolution capture for which a processing time is short.

The menu process described at Step S28 in FIG. 7 will be described below. FIG. 38 to FIG. 43 are diagrams schematically illustrating an overview of a method of setting the setting information by the user.

Figure 38:
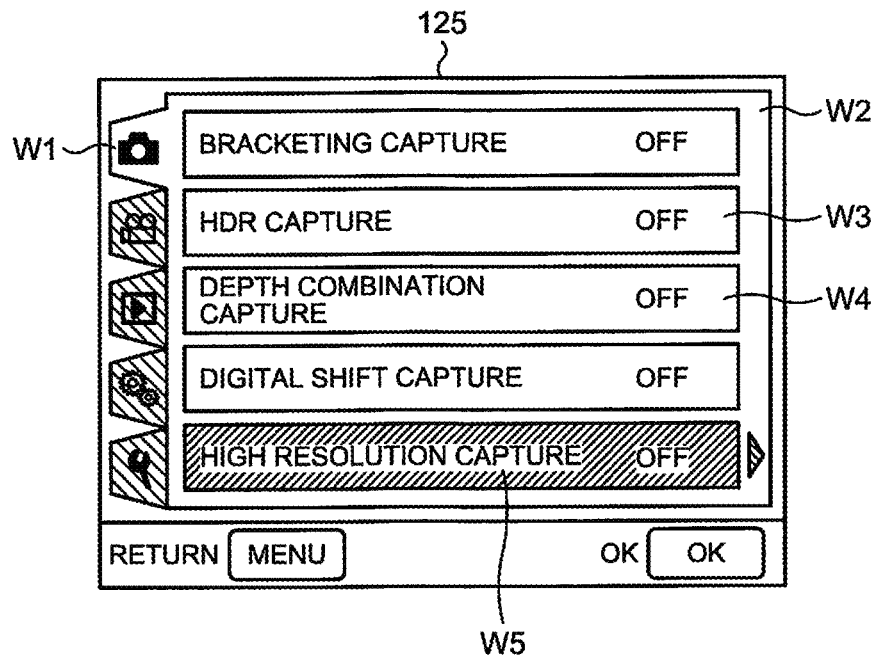
FIG. 38 is a diagram schematically illustrating an outline of a setting information setting method performed by a user.

As illustrated in FIG. 38, first, if the user selects an capture menu tab W1 in the menu screen by operating the MENU button 124e, the upward/downward button of the selection button 124f, and the like, the display controller 112a causes the display unit 125 to display an operation screen W2 for changing a setting for each of imaging functions.

Figure 39:
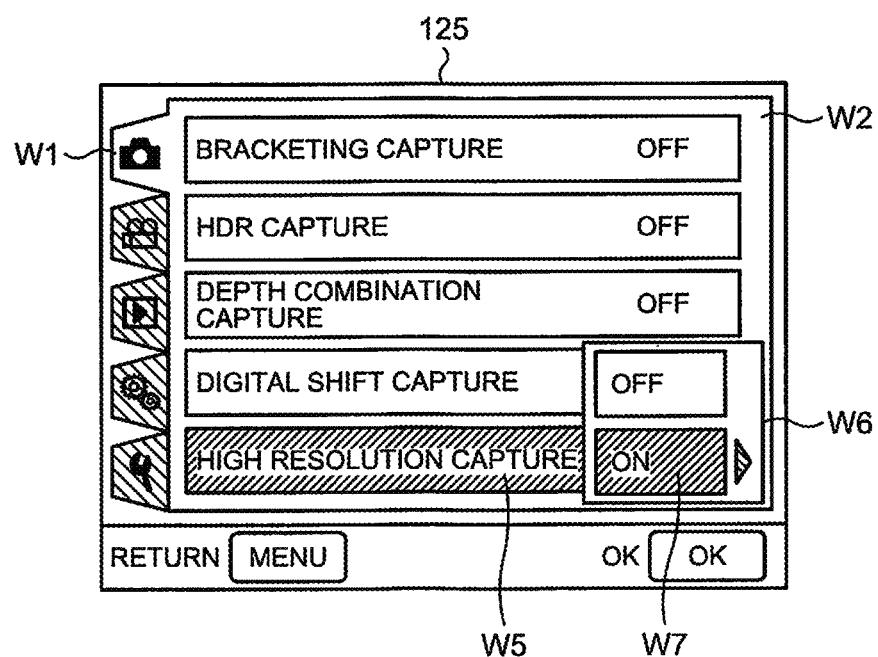
FIG. 39 is a diagram schematically illustrating an outline of the setting information setting method performed by a user.

Subsequently, if the user selects a menu function W5 by operating a rightward button of the selection button 124f, as illustrated in FIG. 39, the display controller 112a causes the display unit 125 to display an ON/OFF selection menu W6 for selecting whether to enable a high resolution capture function (FIG. 38→FIG. 39). Details of the menu functions W3 and W4 will be described later.

Thereafter, as illustrated in FIG. 39, the user selects a menu of ON or OFF by operating the upward/downward button or the like of the selection button 124f.

Figure 40:
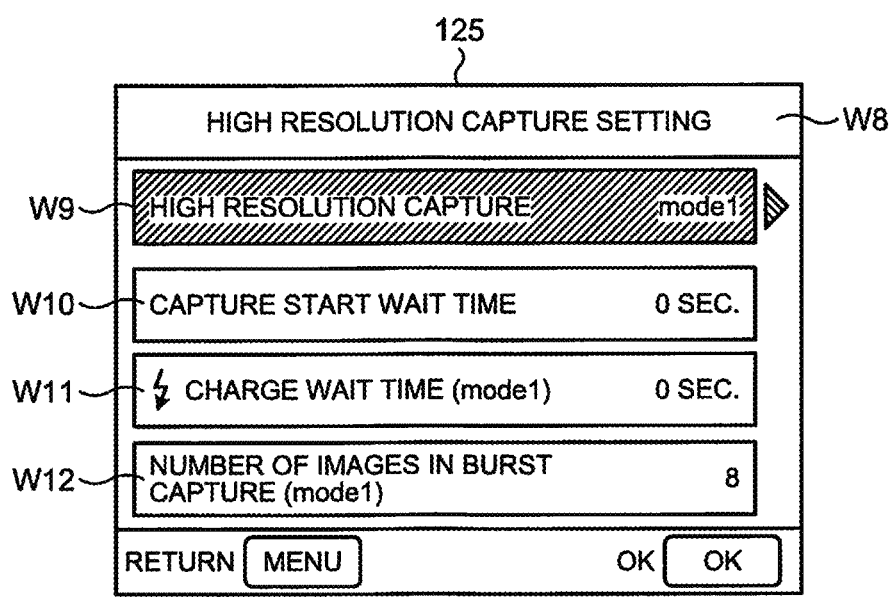
FIG. 40 is a diagram schematically illustrating an outline of the setting information setting method performed by a user.

Then, if the user selects the ON menu W7 for enabling the high resolution capture by operating the rightward button of the selection button 124f, the display controller 112a causes the display unit 125 to display a high resolution capture setting change screen W8 as illustrated in FIG. 40 (FIG. 39→FIG. 40).

Figure 41:
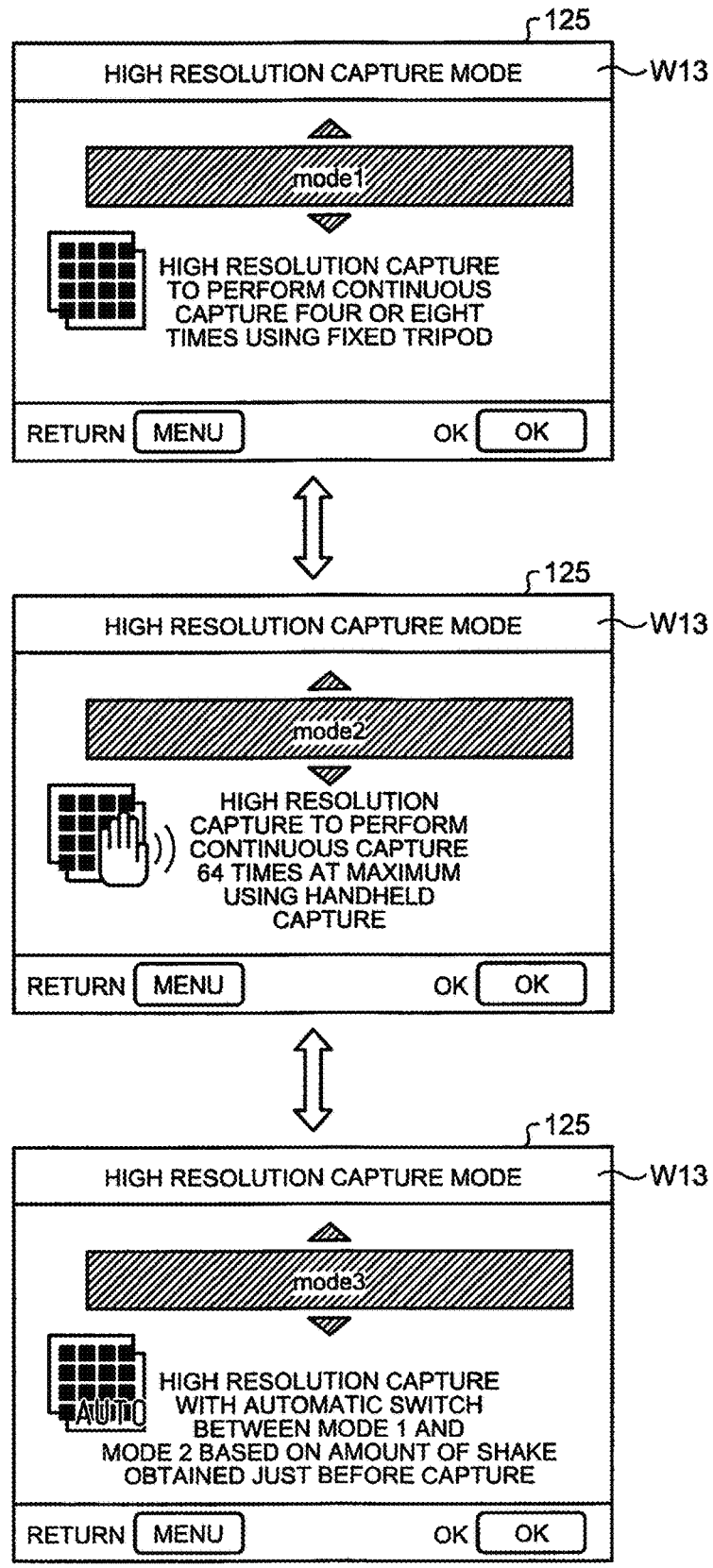
FIG. 41 is a diagram schematically illustrating an outline of the setting information setting method performed by a user.

Subsequently, if the user selects a menu function W9 for changing a high resolution capture mode by operating the rightward button of the selection button 124f, the display controller 112a displays a selection screen W13 for selecting a mode 1 to a mode 3 of the high resolution capture as illustrated in FIG. 41 (FIG. 40→FIG. 41). Details of the menu functions W10 to W12 will be described later.

In the selection screen W13, it is possible to switch among the mode 1 to the mode 3 of the high resolution capture by operating the upward/downward button of the selection button 124f, and it is possible to view a description of the selected mode.

Thereafter, as illustrated in FIG. 41, if any of the mode 1 to the mode 3 is selected and the determination button 124g is operated, the high resolution capture of the selected mode is enabled. Meanwhile, the mode 1 corresponds to the tripod high resolution capture, the mode 2 corresponds to the handheld high resolution capture, and the mode 3 corresponds to the auto-select high resolution capture. As a result, the imaging switch unit 117e switches between the imaging performed by the first imaging drive controller 117c (tripod high resolution capture) and the imaging performed by the second imaging drive controller 117d (handheld high resolution capture) in accordance with the mode input by the user. Therefore, the imaging apparatus 100 is able to change the setting of the high resolution capture on the basis of operation performed by the user on the operating unit 124.

Figure 42:
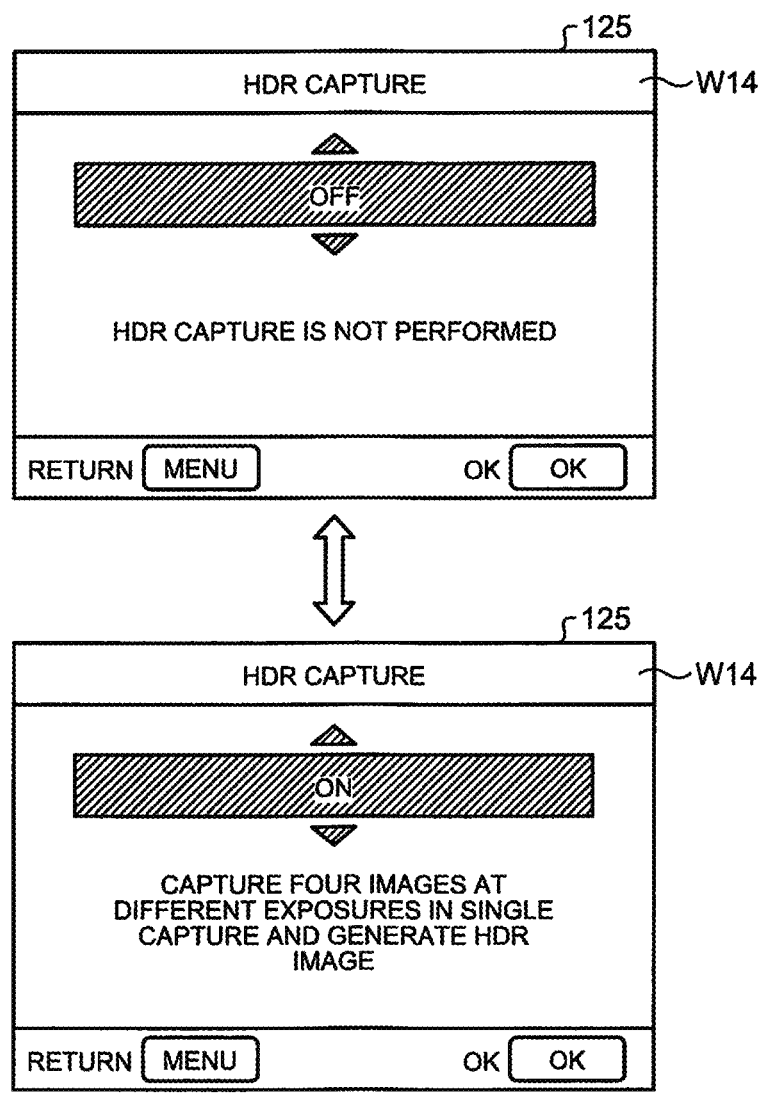
FIG. 42 is a diagram schematically illustrating an outline of the setting information setting method performed by a user.

Referring back to FIG. 38, if the user selects the menu function W3 for making a setting on whether to perform the HDR capture by operating the rightward button of the selection button 124f, the display controller 112a displays a selection screen W14 for selecting ON or OFF of the HDR capture as illustrated in FIG. 42.

In the selection screen W14, it is possible to switch between ON and OFF of the HDR capture by operating the top/bottom/down buttons of the selection button 124f, and it is possible to view a description of the selected state.

Thereafter, if one of ON and OFF of the HDR capture is selected and the determination button 124g is operated, it is possible to set ON or OFF of the HDR capture.

Figure 43:
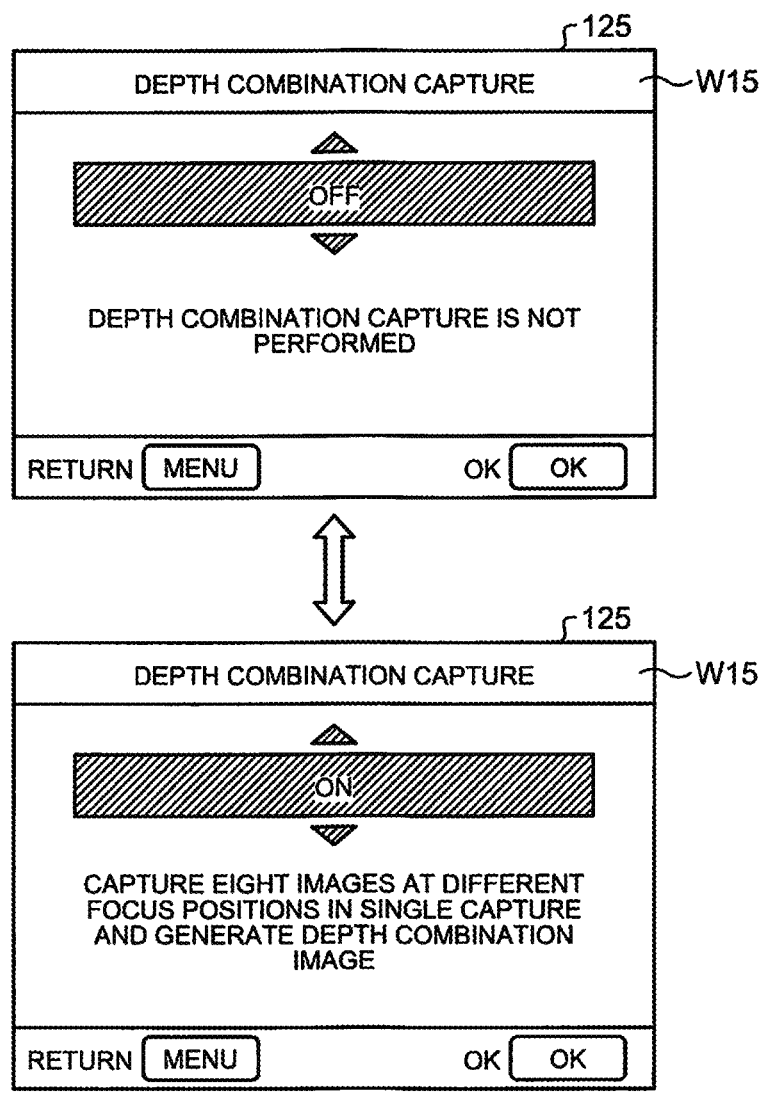
FIG. 43 is a diagram schematically illustrating an outline of the setting information setting method performed by a user.

Referring back to FIG. 38, if the user selects the menu function W4 for making a setting on whether to perform the depth combination capture by operating the rightward button of the selection button 124f, the display controller 112a displays a selection screen W15 for selecting ON or OFF of the depth combination capture as illustrated in FIG. 43.

In the selection screen W15, it is possible to switch between ON and OFF of the depth combination capture by operating the top/bottom/down buttons of the selection button 124f, and it is possible to view a description of the selected state.

Thereafter, if one of ON and OFF of the depth combination capture is selected and the determination button 124g is operated, it is possible to set ON or OFF of the depth combination capture.

Referring back to FIG. 40, by selecting the menu function W10 in the high resolution capture setting change screen W8, it is possible to set a wait time until capture (capture start wait time) after operation (full-press) on the capture start switch of the capture instruction operation button 124a. By appropriately setting the wait time, it is possible to start capture after a shake of the imaging apparatus 100 that has occurred in response to pressing the capture instruction operation button 124a is reduced. By selecting the menu function W10, it is possible to select any of 0 second, ⅛ second, ¼ second, ½ second, 1 second, 2 seconds, 4 seconds, 8 seconds, 15 seconds, and 30 seconds, for example. For example, if the capture start wait time is set to ⅛ second, it is possible to eliminate vibration of the imaging apparatus 100 caused by a mechanical shutter or a mirror and eliminate an influence of a shake (see FIG. 9) including roll of the imaging apparatus 100 caused by pressing the capture instruction operation button 124a. However, the influence of the shake including the roll of the imaging apparatus 100 caused by pressing the capture instruction operation button 124a may be increased depending on a proficiency level of the user; therefore, it may be possible to set the capture start wait time to a longer time (for example, ¼ second or ½ second).

Further, by selecting the menu function W11 of the high resolution capture setting change screen W8, it is possible to set a charge time (charge wait time) in the tripod high resolution capture using the flash (mode 1). By selecting the menu function W9, it is possible to select any of 0 second, 0.1 second, 0.2 second, 0.5 second, 1 second, 2 seconds, 4 seconds, 8 seconds, 15 seconds, and 30 seconds, for example. In the high resolution capture, it is necessary to capture images with strictly the same brightness, so that it is necessary to ensure an adequate charge wait time until a stable light emission intensity is ensured.

Furthermore, by selecting the menu function W12 in the high resolution capture setting change screen W8, it is possible to select the number of captured images for each pixel displacement position in the tripod high resolution capture (mode 1). By selecting the menu function W10, it is possible to select, for example, a mode in which capture is performed four times while performing displacement at a 1 pixel pitch and a mode in which capture is performed eight times while performing displacement at a 0.5 pixel pitch.

Figure 44:
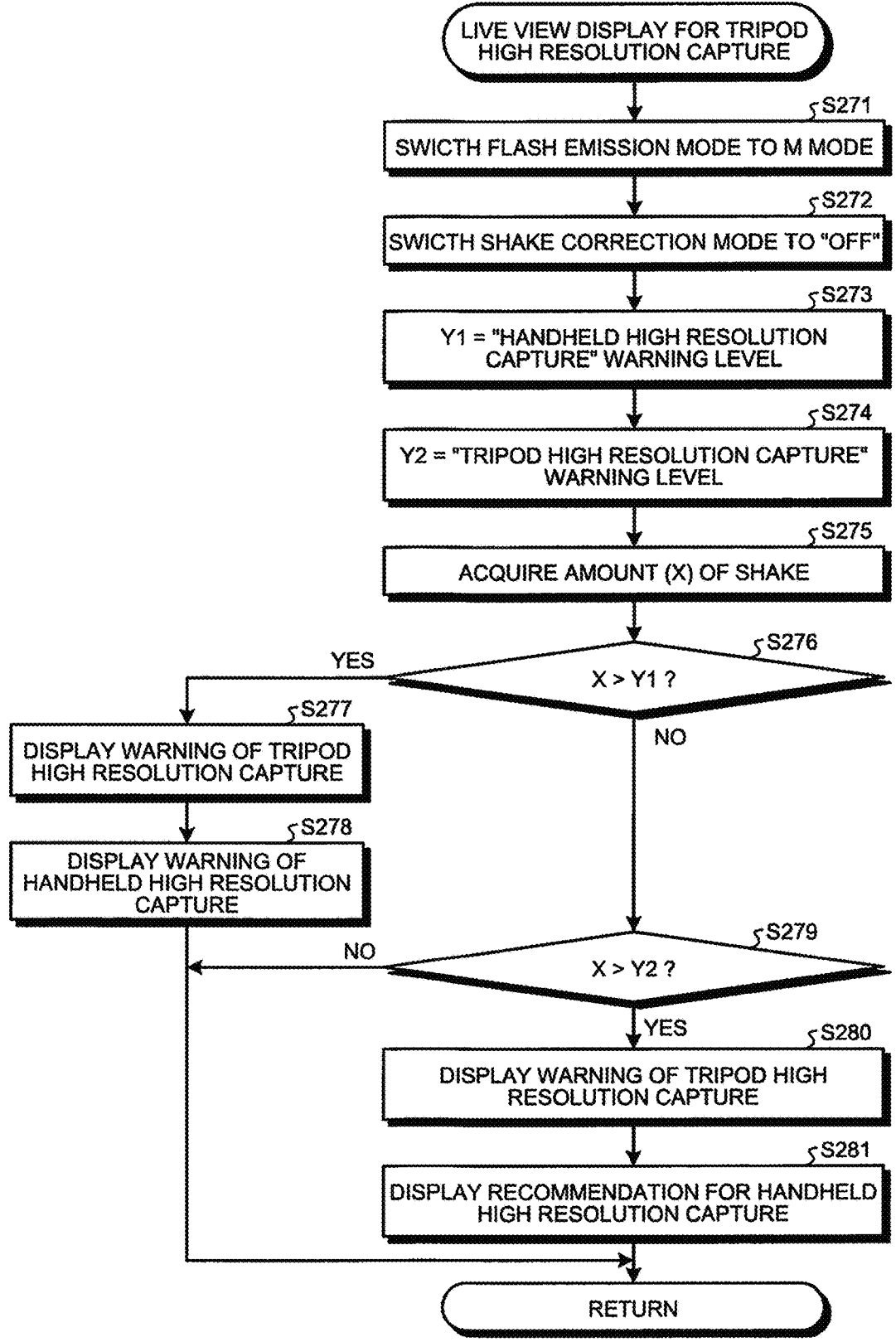
FIG. 44 is a flowchart illustrating an outline of live view display for the tripod high resolution capture in FIG. 6.

The live view display for the tripod high resolution capture described at Step S15 in FIG. 6 will be described below. FIG. 44 is a flowchart illustrating an outline of the live view display for the tripod high resolution capture in FIG. 6.

As illustrated in FIG. 44, first, the flash controller 130 limits the flash emission mode to the manual (M) emission mode (Step S271). When a plurality of images are to be captured in the tripod high resolution capture, and if an amount of flash light is not stable, serious artifact may occur when the captured images are combined; therefore, the amount of flash light is stabilized. However, it may be possible to stabilize the amount of flash light by using the pre-emission intensity control mode, the flashmatic intensity control mode, or the like as described above.

Subsequently, the shake correction controller 117b disables the shake correction function (turn off the shake correction mode) (Step S272).

Thereafter, the system controller 112 sets the variable Y1 to a "handheld high resolution capture" warning level (Step S273).

Further, the system controller 112 sets the variable Y2 to a "tripod high resolution capture" warning level (Step S274).

Subsequently, the system controller 112 acquires an amount X of a shake from the shake detector 109 or the shake detector 119 (Step S275). The amount X of a shake may be a sum of the roll, the angular shake, and the shift, or may be a representative value.

At Step S276, if the system controller 112 determines that the amount X of the shake>the variable Y1 (Step S276: Yes), the display controller 112a causes the display unit 125 to display a warning of the tripod high resolution capture (Step S277). Further, the display controller 112a causes the display unit 125 to display a warning of the handheld high resolution capture (Step S278).

Figure 45:
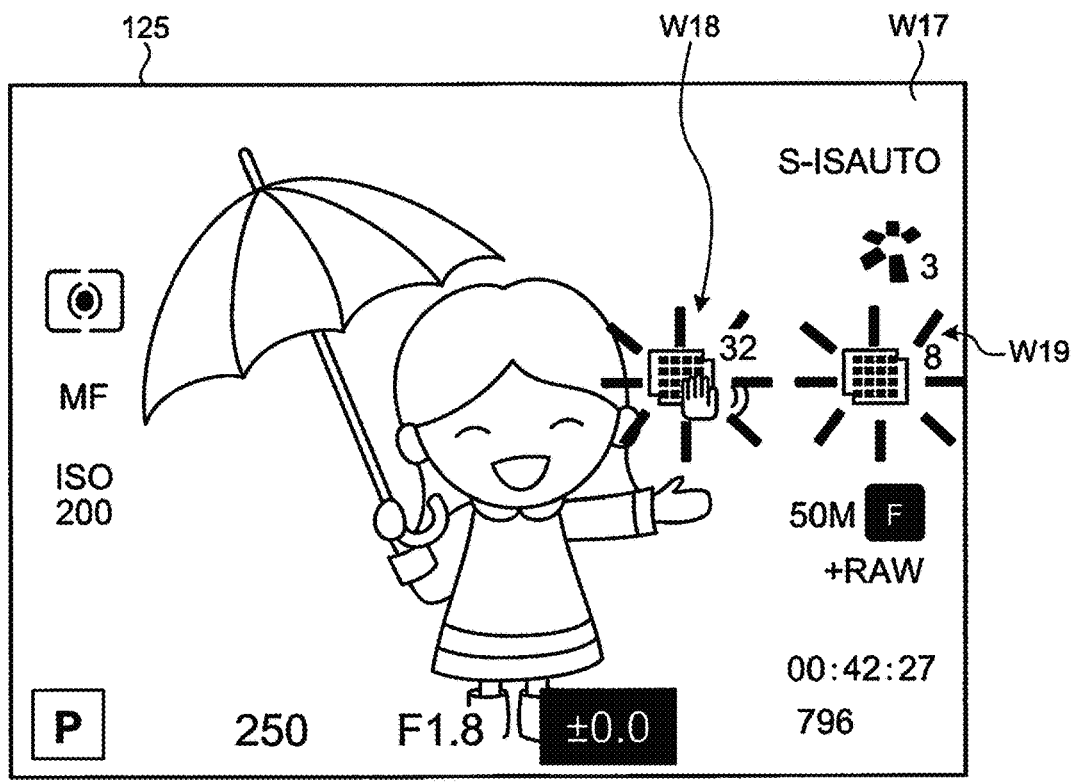
FIG. 45 is a diagram schematically illustrating an example of display of warnings of the tripod high resolution capture and the handheld high resolution capture.

FIG. 45 is a diagram schematically illustrating an example of the tripod high resolution capture and display of the warning of the handheld high resolution capture. As illustrated in FIG. 45, the display controller 112a causes, in a live view screen W17 displayed on the display unit 125, a tripod high resolution capture icon W19 and a handheld high resolution capture icon W18 to blink and gives a warning indicating that the amount of the shake exceeds a warning level of the handheld high resolution capture. If the amount of the shake exceeds the warning level of the handheld high resolution capture, it is highly likely that a shake occurs in both of the tripod high resolution capture and the handheld high resolution capture, and therefore, it is preferable to give the warning to the user.

At Step S276, if the system controller 112 does not determine that the amount X of the shake>the variable Y1 (Step S276: No), the system controller 112 determines whether the amount X of the shake>the variable Y2 (Step S279).

At Step S279, if the system controller 112 determines that the amount X of the shake>the variable Y2 (Step S279: Yes), the display controller 112a causes the display unit 125 to display a warning of the tripod high resolution capture (Step S280). Further, the display controller 112a causes the display unit 125 to display a recommendation for the handheld high resolution capture (Step S281).

Figure 46:
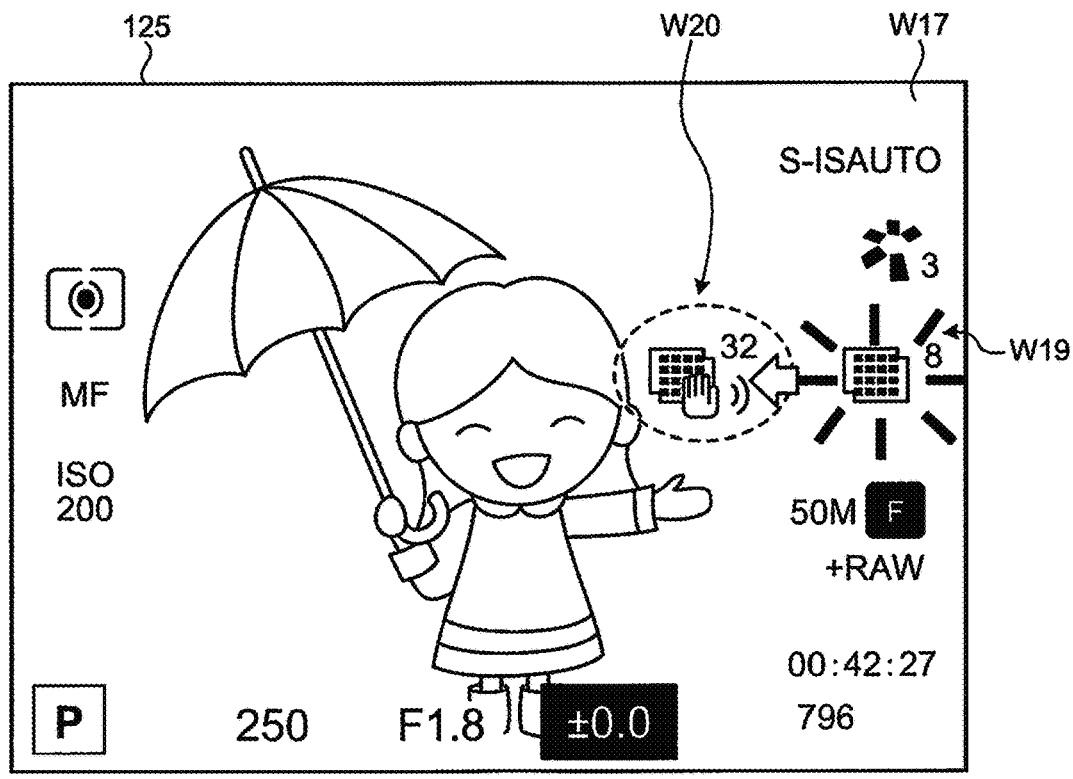
FIG. 46 is a diagram schematically illustrating an example of display of a warning of the tripod high resolution capture and display of a recommendation for the handheld high resolution capture.

FIG. 46 is a diagram schematically illustrating an example of display of the warning of the tripod high resolution capture and display of the recommendation for the handheld high resolution capture. As illustrated in FIG. 46, the display controller 112a causes, in the live view screen W17 displayed on the display unit 125, a tripod high resolution capture icon W19 to blink and gives a warning indicating that a shake exceeds a warning level of the tripod high resolution capture. Further, the display controller 112a causes, in the live view screen W17 displayed on the display unit 125, to display a display W20 for recommending the handheld high resolution capture (in this example, an arrow and a dashed line) to recommend the handheld high resolution capture rather than the tripod high resolution capture. If the amount of the shake is equal to or smaller than the warning level of the handheld high resolution capture and exceeds the warning level of the tripod high resolution capture, it is highly likely that it is possible to capture an appropriate image by performing the handheld high resolution capture rather than the tripod high resolution capture, and therefore, it is preferable to give a notice to the user. Thereafter, the imaging apparatus 100 returns to the subroutine in FIG. 6.

At Step S279, if the system controller 112 does not determine that the amount X of the shake>the variable Y2 (Step S279: No), the imaging apparatus 100 returns to the subroutine in FIG. 6.

Figure 47:
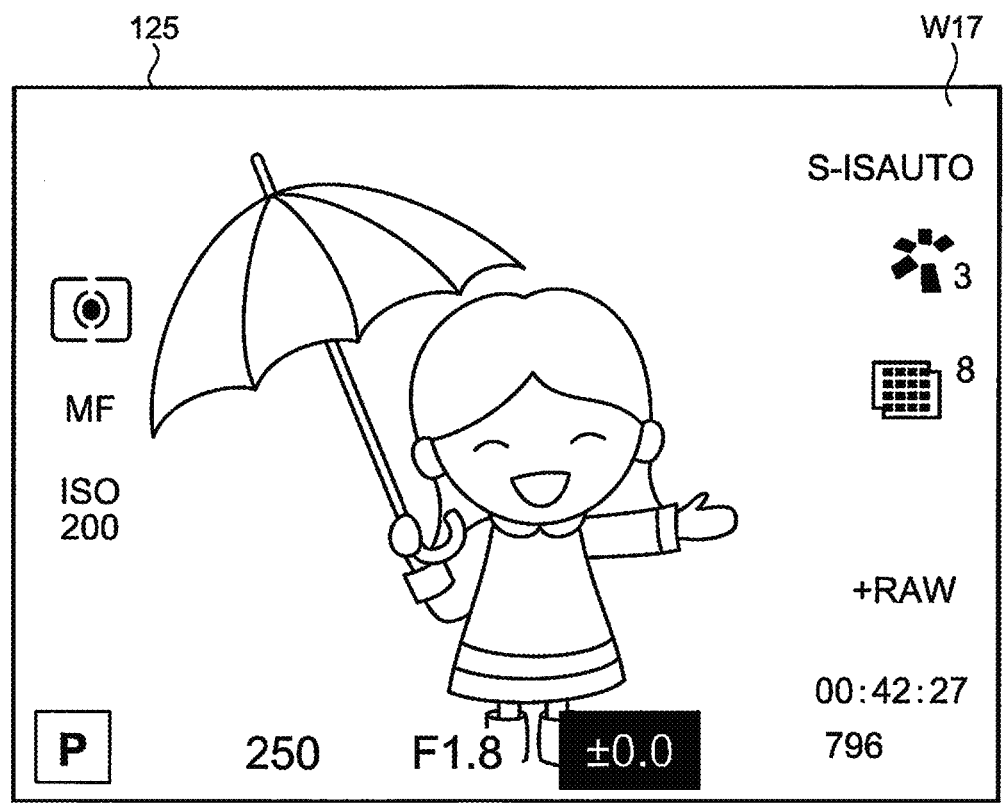
FIG. 47 is a diagram schematically illustrating an example of live view display for the tripod high resolution capture.

FIG. 47 is a diagram schematically illustrating an example of the live view image of the tripod high resolution capture. As illustrated in FIG. 47, if the amount of the shake is adequately small, a warning is not displayed.

Figure 48:
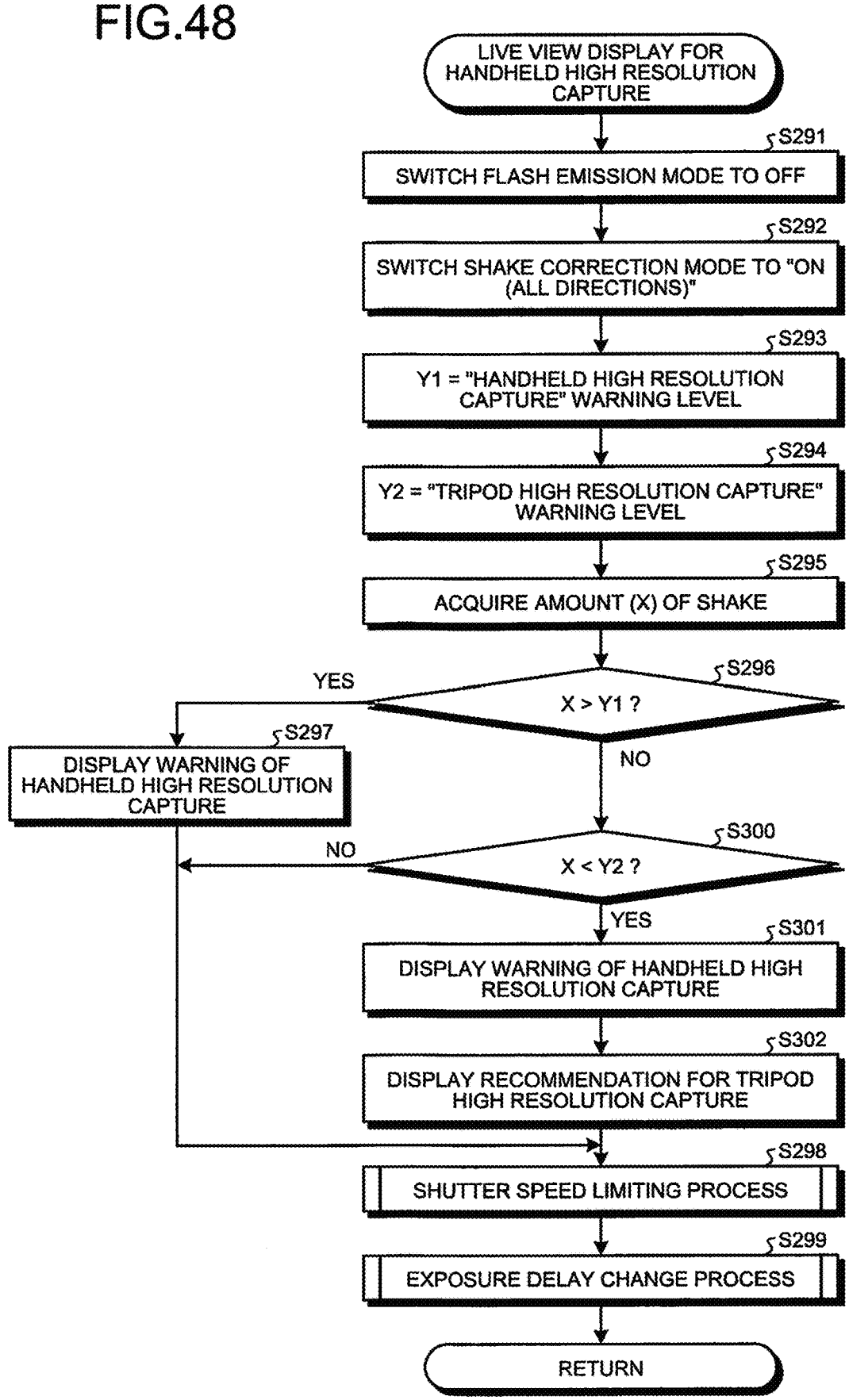
FIG. 48 is a flowchart illustrating an outline of live view display for the handheld high resolution capture in FIG. 6.

The live view display for the handheld high resolution capture described at Step S16 in FIG. 6 will be described below. FIG. 48 is a flowchart illustrating an outline of the live view display for the handheld high resolution capture in FIG. 6.

As illustrated in FIG. 48, first, the flash controller 130 limits the flash such that the flash is stopped (turns off the emission mode) (Step S291). When a plurality of images are to be captured in the handheld high resolution capture, and if an amount of flash light is not stable, serious artifact may occur when the captured images are combined. In the handheld high resolution capture, it is often the case that a large number of images are to be captured, and therefore, it is energetically difficult to ensure a certain amount of flash light for capturing the large number of images. Further, if the flash is used, a total capture time is increased by the charge time of the flash charger 129, which is unfavorable. For the reasons as described above, the flash is turned off in the handheld high resolution capture. However, if it is possible to solve a problem with energy and the flash charge time by adopting a flash system using an external power supply or the like, it may be possible to use the flash by fixing the amount of flash light by using the manual emission, the pre-emission intensity control mode, the flashmatic intensity control mode, or the like.

Subsequently, the shake correction controller 117b enables the shake correction function (turn on the shake correction mode) (Step S292). While the shake correction includes a plurality of types such as "horizontal shake correction", "vertical shake correction", "automatic detection of a direction", and "all directions", the shake correction in the handheld high resolution capture is limited to "all directions".

Thereafter, similarly to Steps S273 and S274 in FIG. 44, the system controller 112 sets the variable Y1 to the "handheld high resolution capture" warning level (Step S293), and sets the variable Y2 to the "tripod high resolution capture" warning level (Step S294).

Subsequently, similarly to Step S275 in FIG. 44, the system controller 112 acquires the amount X of the shake from the shake detector 109 or the shake detector 119 (Step S295).

At Step S296, if the system controller 112 determines that the amount X of the shake>the variable Y1 (Step S296: Yes), the display controller 112a causes the display unit 125 to display the warning of the handheld high resolution capture (Step S297).

Figure 49:
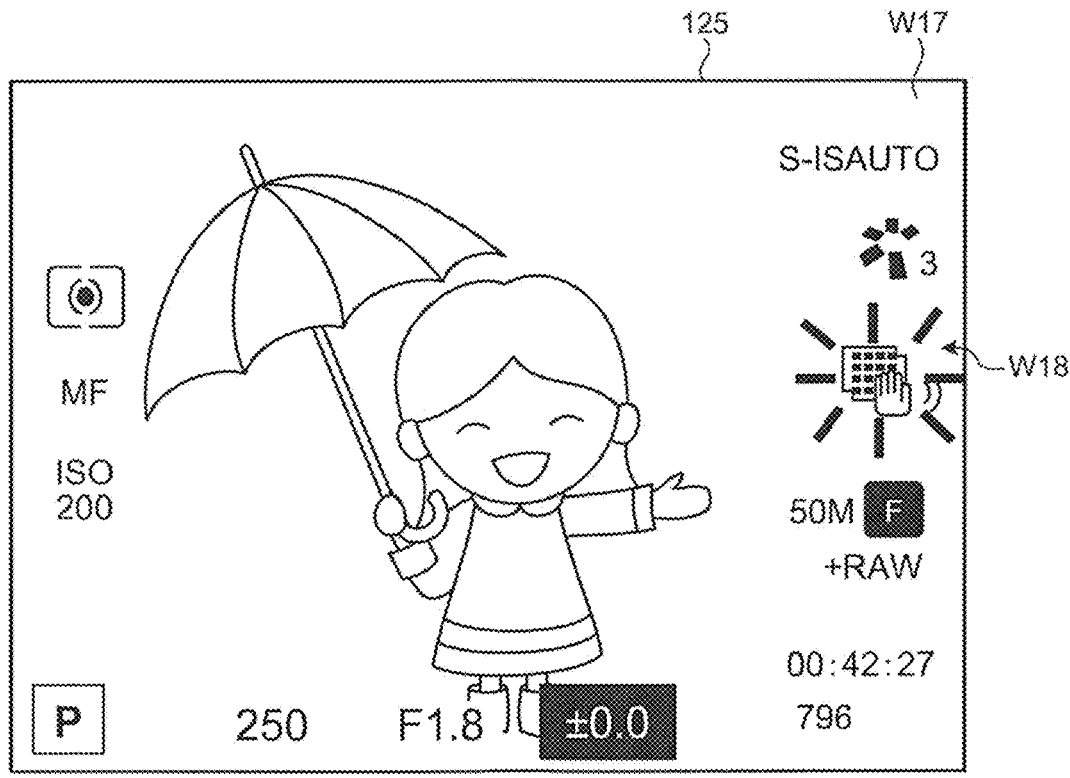
FIG. 49 is a diagram schematically illustrating an example of display of a warning of the handheld high resolution capture.

FIG. 49 is a diagram schematically illustrating an example of display of the warning of the handheld high resolution capture. As illustrated in FIG. 49, the display controller 112a causes, in the live view screen W17 displayed on the display unit 125, the handheld high resolution capture icon W18 to blink and gives a warning indicating that the amount of the shake exceeds the warning level of the handheld high resolution capture. If the amount of the shake exceeds the warning level of the handheld high resolution capture, it is highly likely that a shake occurs in the handheld high resolution capture, and therefore, it is preferable to give the warning to the user. Thereafter, similarly to Steps S121 and S122 in FIG. 23, the imaging apparatus 100 performs processes at Steps S298 and S299 and returns to the subroutine in FIG. 6.

At Step S296, if the system controller 112 does not determine that the amount X of the shake>the variable Y1 (Step S296: No), the system controller 112 determines whether the amount X of the shake>the variable Y2 (Step S300).

At Step S300, if the system controller 112 determines that the amount X of the shake<the variable Y2 (Step S300: Yes), the display controller 112a causes the display unit 125 to display the warning of the handheld high resolution capture (Step S301). Further, the display controller 112a causes the display unit 125 to display a recommendation for the tripod high resolution capture (Step S302).

Figure 50:
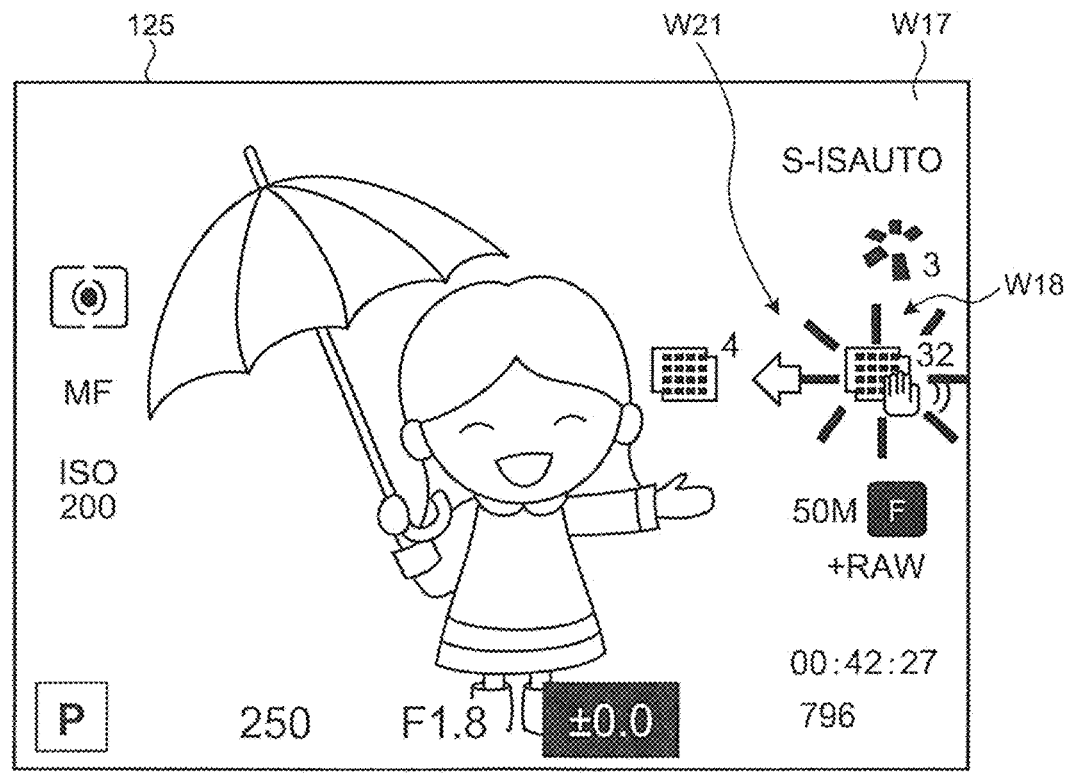
FIG. 50 is a diagram schematically illustrating an example of display of a recommendation for the tripod high resolution capture.

FIG. 50 is a diagram schematically illustrating an example of display of the recommendation for the tripod high resolution capture. As illustrated in FIG. 50, the display controller 112a causes, in the live view screen W17 displayed on the display unit 125, the handheld high resolution capture icon W18 to blink and gives a warning indicating that the shake is smaller than a warning level of the tripod high resolution capture. Further, the display controller 112a displays, in the live view screen W17 displayed on the display unit 125, the display W21 for recommending the tripod high resolution capture (in this example, an arrow) to recommend the tripod high resolution capture rather than the handheld high resolution capture. If the amount of the shake is equal to or smaller than the warning level of the tripod high resolution capture, it is highly likely that it is possible to capture an appropriate image by performing the tripod high resolution capture rather than the handheld high resolution capture, and therefore, it is preferable to give a notice to the user.

At Step S300, if the system controller 112 does not determine that the amount X of the shake<the variable Y2 (Step S300: No), the imaging apparatus 100 returns to the subroutine in FIG. 6.

Figure 51:
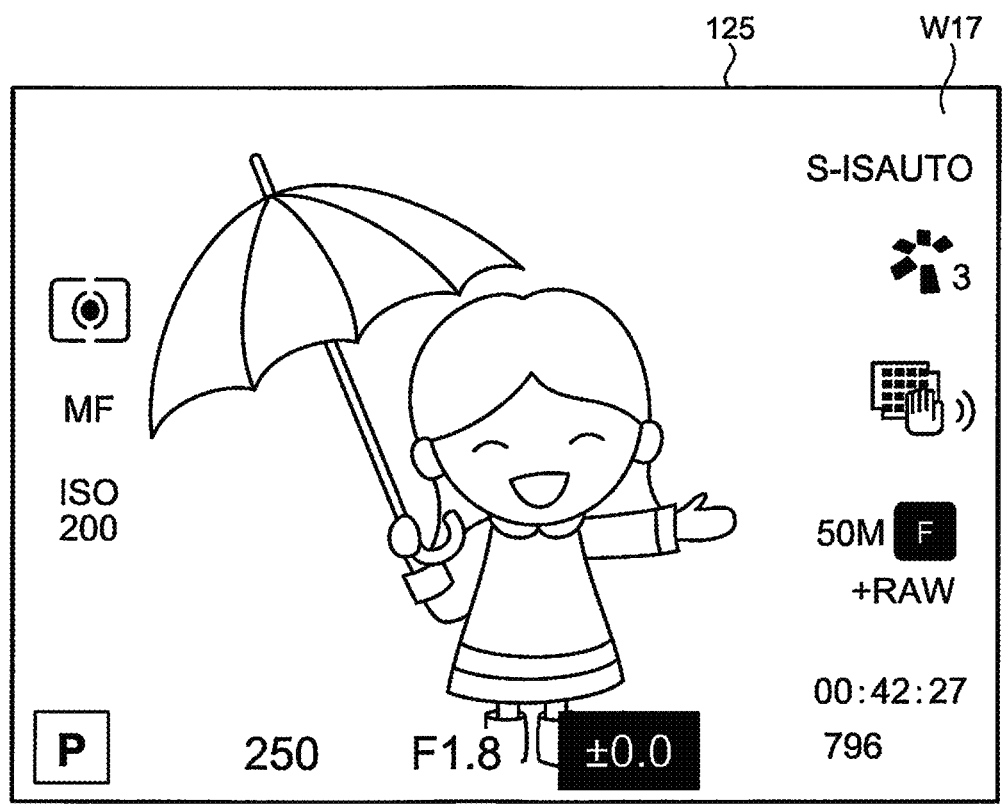
FIG. 51 is a diagram schematically illustrating an example of live view display for the handheld high resolution capture.

FIG. 51 is a diagram schematically illustrating an example of the live view display for the handheld high resolution capture. As illustrated in FIG. 51, if the amount of the shake falls within an appropriate range, the warning is not displayed.

As described above, the display controller 112a causes the display unit 125 to display a warning for recommending the imaging performed by the first imaging drive controller 117c or the imaging performed by the second imaging drive controller 117d, on the basis of the detection result obtained by the shake detector 109 or the shake detector 119. As a result, the user is able to select an appropriate capture method depending on the amount of the shake.

Figure 52:
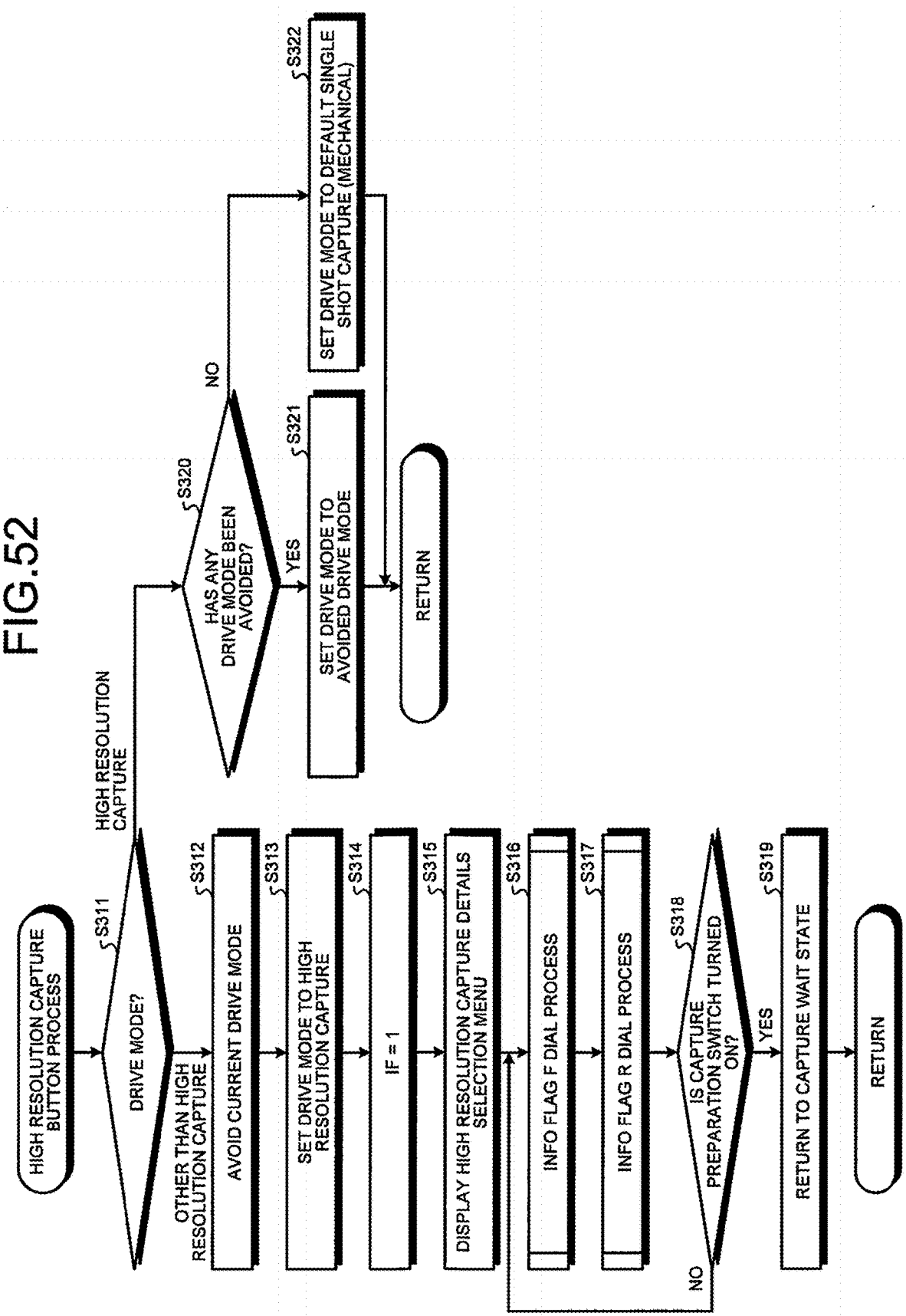
FIG. 52 is a flowchart illustrating an outline of a high resolution capture button process in FIG. 7.

The high resolution capture button process described at Step S31 in FIG. 7 will be described below. FIG. 52 is a flowchart illustrating an outline of the high resolution capture button process in FIG. 7.

As illustrated in FIG. 52, first, the system controller 112 determines whether the drive mode flag is a flag corresponding to the high resolution capture or a flag corresponding to capture other than the high resolution capture (Step S311).

At Step S311, if the system controller 112 determines that the drive mode flag is the flag corresponding to capture other than the high resolution capture (Step S311: other than the high resolution capture), the system controller 112 avoids a current drive mode (Step S312).

Further, the system controller 112 sets the drive mode to the high resolution capture (Step S313), and sets the INFO flag (hereinafter, referred to as "IF") to 1 (Step S314).

Figure 53:
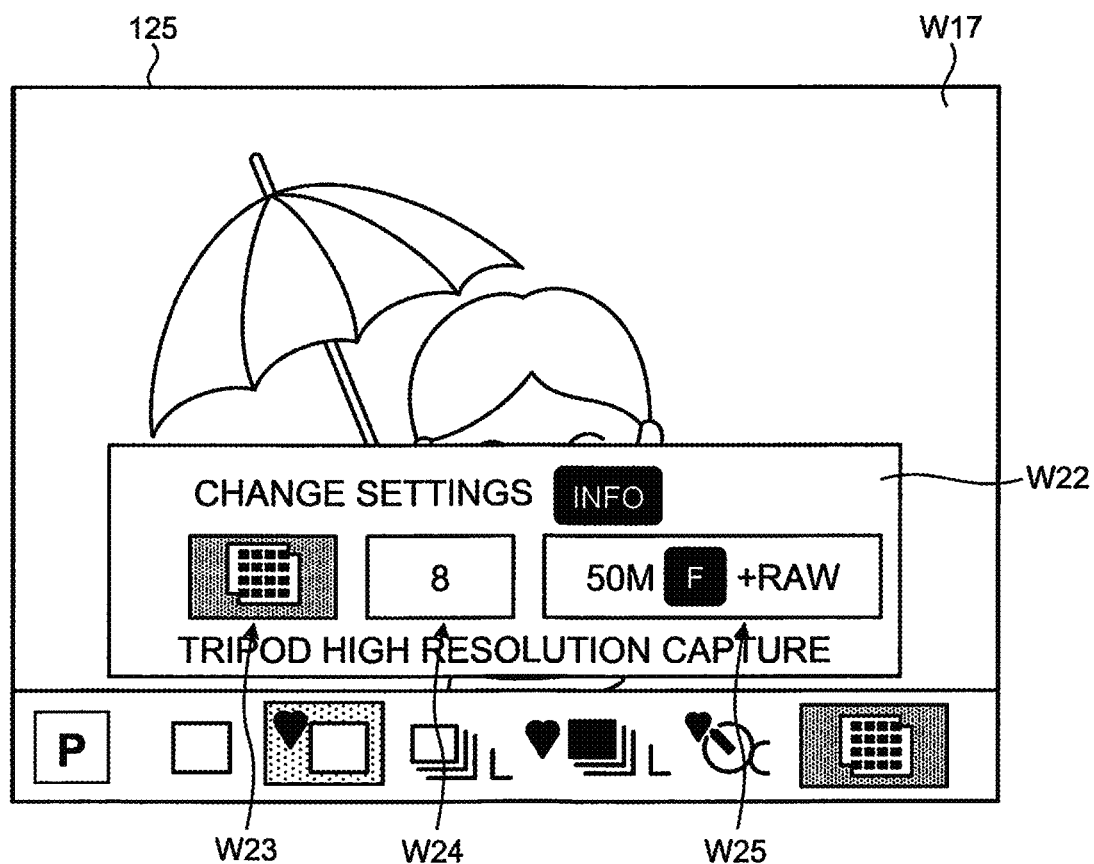
FIG. 53 is a diagram schematically illustrating an example of a high resolution capture details selection menu.

Then, the display controller 112a causes the display unit 125 to display a high resolution capture details selection menu (Step S315). FIG. 53 is a diagram schematically illustrating an example of the high resolution capture details selection menu. As illustrated in FIG. 53, the display controller 112a displays a high resolution capture details selection menu screen W22 in a superimposed manner on the live view screen W17 on the display unit 125. On the high resolution capture details selection menu screen W22, a high resolution capture mode icon W23 for changing a high resolution capture mode, a number-of-capture icon W24 for changing the number of times of capture for each pixel displacement position in the high resolution capture, and an image quality mode icon W25 for changing an image quality mode of the high resolution capture are displayed.

Subsequently, the imaging apparatus 100 performs an INFO flag F dial process of changing a setting item of the high resolution capture in accordance with operation on the F dial 124b (Step S316). Details of the INFO flag F dial process will be described later.

Further, the imaging apparatus 100 performs the INFO flag R dial process of changing contents in the setting item of the high resolution capture in accordance with operation on the R dial 124c (Step S317). Details of the INFO flag R dial process will be described later.

At Step S318, if the capture instruction operation button 124a is pressed halfway and the capture preparation switch enters the ON state (Step S318: Yes), the imaging apparatus 100 terminates the high resolution capture button process, returns to a capture wait state (Step S319), and returns to the subroutine in FIG. 7.

At Step S318, if the capture instruction operation button 124a is not pressed halfway and the capture preparation switch does not enter the ON state (Step S318: No), the imaging apparatus 100 proceeds to Step S316.

At Step S311, if the system controller 112 determines that the drive mode flag is the flag corresponding to the high resolution capture (Step S311: high resolution capture), the system controller 112 determines whether any drive mode has been avoided (Step S320).

At Step S320, if the system controller 112 determines that any drive mode has been avoided (Step S320: Yes), the system controller 112 sets the drive mode to the avoided drive mode (Step S321). Thereafter, the imaging apparatus 100 returns to the subroutine in FIG. 7.

At Step S320, if the system controller 112 does not determine that any drive mode has been avoided (Step S320: No), the system controller 112 sets the drive mode to default single shot capture (using the mechanical shutter) (Step S322). Thereafter, the imaging apparatus 100 returns to the subroutine in FIG. 7.

Figure 54:
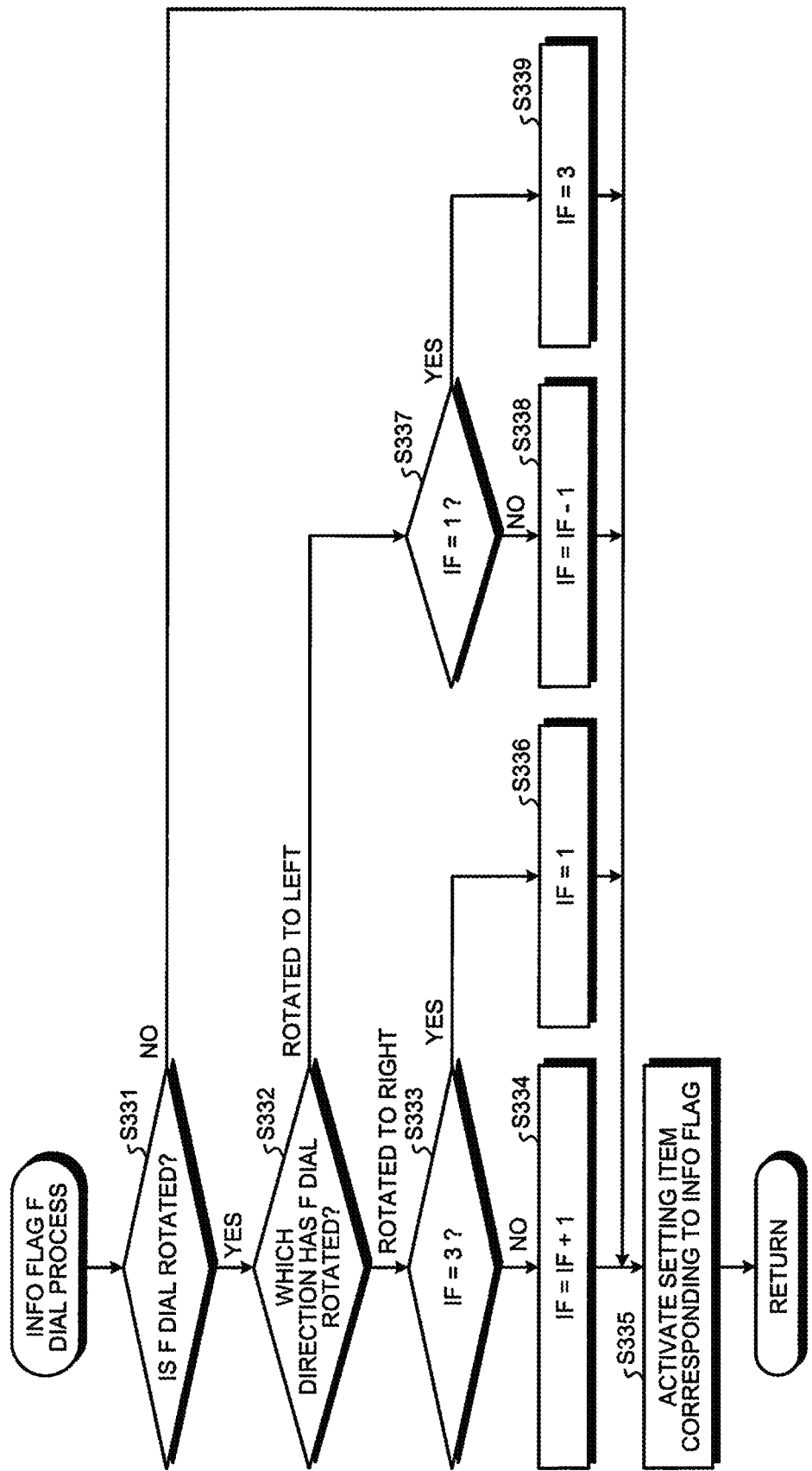
FIG. 54 is a flowchart illustrating an outline of an INFO flag F dial process in FIG. 52.

The INFO flag F dial process described at Step S316 in FIG. 52 will be described below. FIG. 54 is a flowchart illustrating an outline of the INFO flag F dial process in FIG. 52.

As illustrated in FIG. 54, at Step S331, if the system controller 112 determines that the F dial 124b is rotated by operation performed by the user (Step S331: Yes), the system controller 112 determines whether the F dial 124b has rotated to the right or to the left (Step S332).

At Step S332, if the system controller 112 determines that the F dial 124b has rotated to the right (Step S332: rotated to right), the system controller 112 determines whether IF=3(Step S333).

At Step S333, if the system controller 112 does not determine that IF=3 (Step S333: No) the system controller 112 performs a calculation such that IF=IF+1. In other words, the value of the variable IF is incremented (Step S334).

Thereafter, the system controller 112 activates the setting item corresponding to the INFO flag (Step S335). At this time, the display controller 112a displays, in a highlighted manner, any one of the high resolution capture mode icon W23, the number-of-capture icon W24, and the image quality mode icon W25 in the high resolution capture details selection menu screen W22 on the display unit 125 in accordance with operation on the F dial 124b.

Thereafter, the imaging apparatus 100 returns to the subroutine in FIG. 52.

At Step S333, if the system controller 112 determines that IF=3 (Step S333: Yes) the system controller 112 sets IF to 1 (Step S336).

At Step S332, if the system controller 112 determines that the F dial 124b has rotated to the left (Step S332: rotated to left), the system controller 112 determines whether IF=1 (Step S337).

At Step S337, if the system controller 112 does not determine that IF=1 (Step S337: No) the system controller 112 performs a calculation such that IF=IF−1. In other words, the value of the variable IF is decremented (Step S338).

At Step S337, if the system controller 112 determines that IF=1 (Step S337: Yes) the system controller 112 sets IF to 3 (Step S339).

Through the INFO flag F dial process as described above, the user selects, by operating the F dial 124b, an item for which the setting is to be changed among the high resolution capture mode icon W23, the number-of-capture icon W24, and the high resolution capture image quality mode icon W25 in the high resolution capture details selection menu screen W22.

Figure 55:
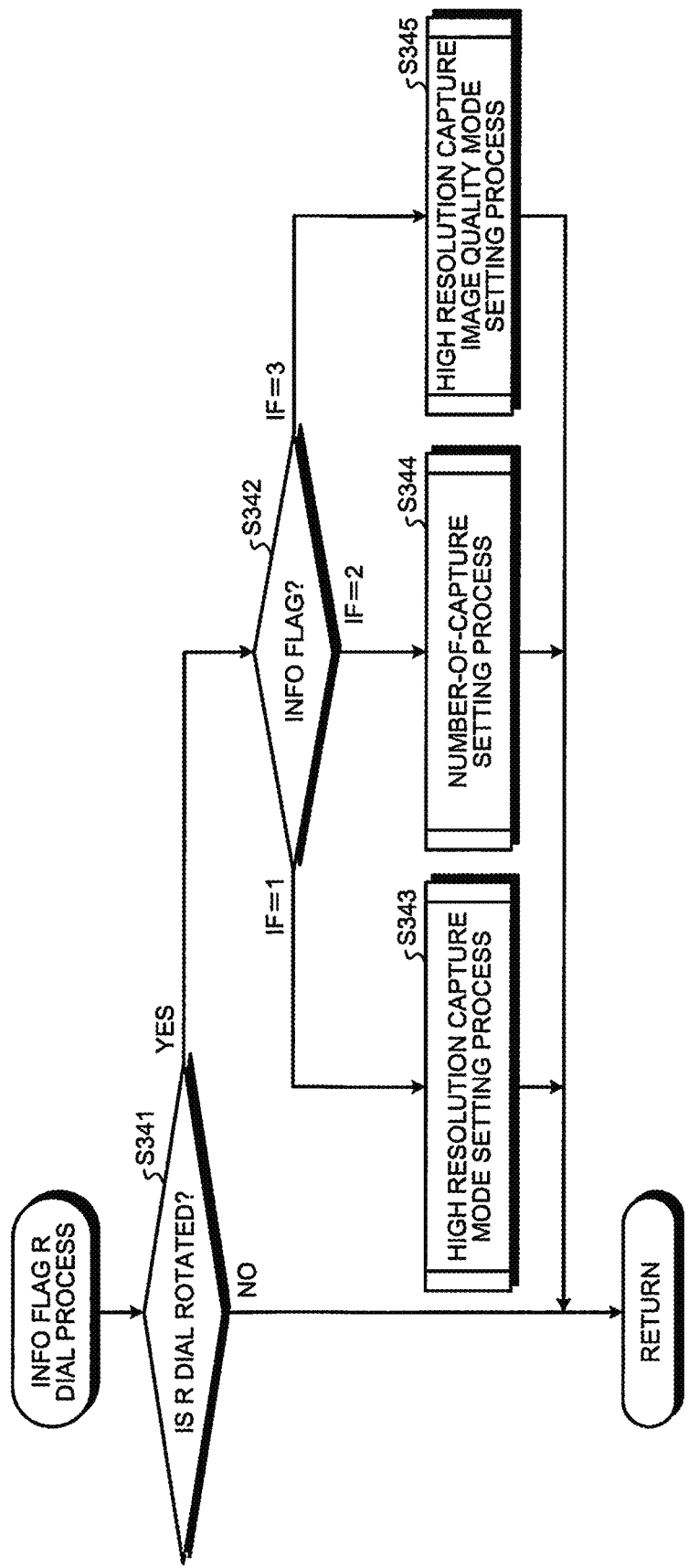
FIG. 55 is a flowchart illustrating an outline of an INFO flag R dial process in FIG. 52.

The INRO flag R dial process described at Step S317 in FIG. 52 will be described. FIG. 55 is a flowchart illustrating an outline of the INFO flag R dial process in FIG. 52.

As illustrated in FIG. 55, at Step S341, if the system controller 112 determines that the F dial 124b is not rotated by the operation performed by the user (Step S341: No), the imaging apparatus 100 returns to the subroutine in FIG. 52.

At Step S341, if the system controller 112 determines that the F dial 124b is rotated by the operation performed by the user (Step S341: Yes), the system controller 112 determines whether the INFO flag (IF) is set to 1, 2, or 3 (Step S342).

At Step S342, if the system controller 112 determines that IF=1 (Step S342: IF=1), the imaging apparatus 100 performs the high resolution capture mode setting process for changing the high resolution capture mode (Step S343). Details of the high resolution capture mode setting process will be described later.

At Step S342, if the system controller 112 determines that IF=2 (Step S342: IF=2), the imaging apparatus 100 performs a number-of-capture setting process of changing the number of times of capture for each pixel displacement position (Step S344). Details of the number-of-capture setting process will be described later.

At Step S342, if the system controller 112 determines that IF=3 (Step S342: IF=3), the imaging apparatus 100 performs the high resolution capture image quality mode setting process of changing the image quality in the high resolution capture (Step S345). Details of the high resolution capture image quality mode setting process will be described later.

Figure 56:
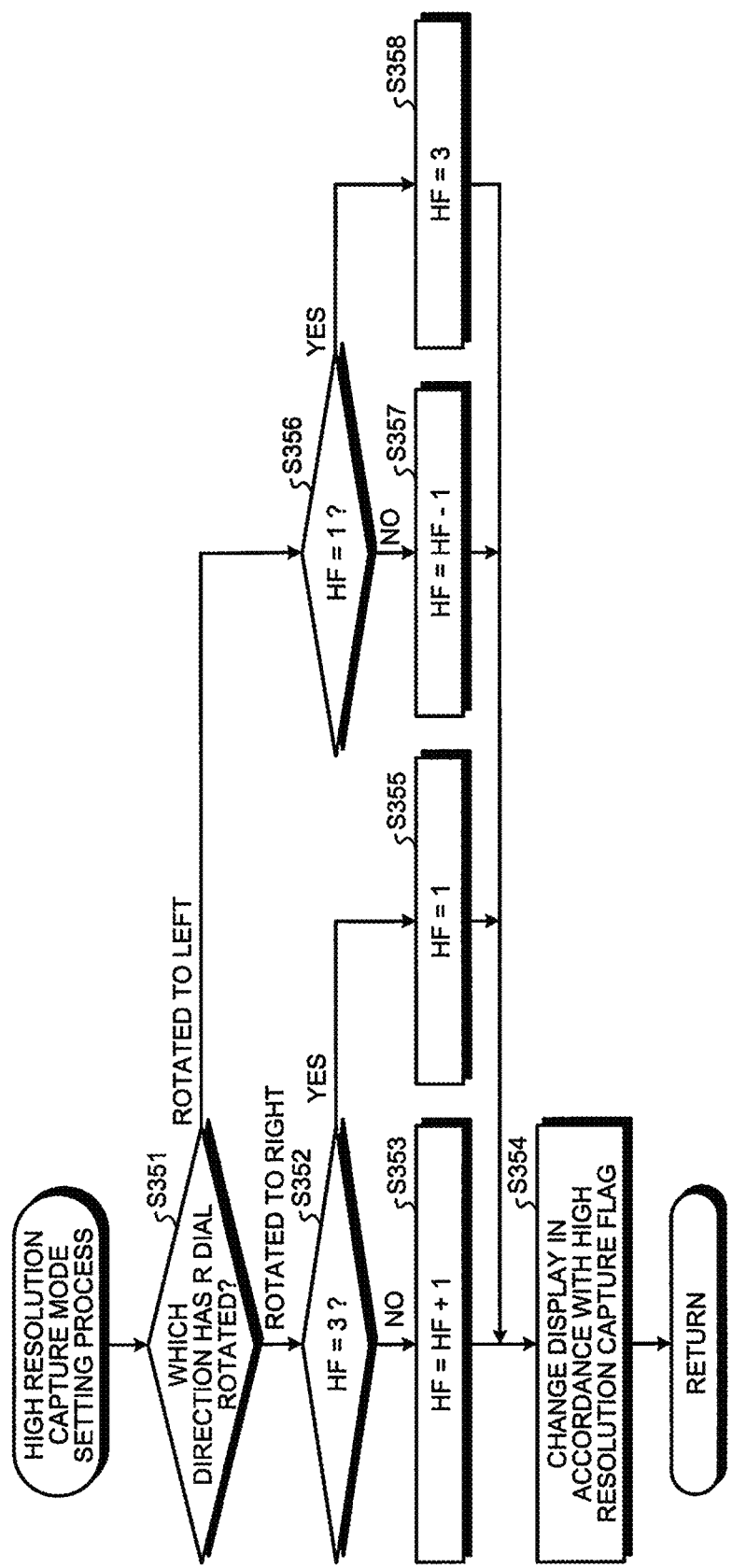
FIG. 56 is a flowchart illustrating an outline of a high resolution capture mode setting process in FIG. 55.

The high resolution capture mode setting process described at Step S343 in FIG. 55 will be described. FIG. 56 is a flowchart illustrating an outline of the high resolution capture mode setting process in FIG. 55.

As illustrated in FIG. 56, first, the system controller 112 determines whether the R dial 124c has rotated to the right or to the left (Step S351).

At Step S351, if the system controller 112 determines that the R dial 124c has rotated to the right (Step S351: rotated to right), the system controller 112 determines whether the high resolution capture flag (HF)=3 (Step S352).

At Step S352, if the system controller 112 does not determine that HF=3 (Step S352: No), the system controller 112 performs a calculation such that HF=HF+1. In other words, the value of the variable HF is incremented (Step S353).

Thereafter, the display controller 112a changes display on the display unit 125 in accordance with the high resolution capture flag (Step S354). Thereafter, the imaging apparatus 100 returns to the subroutine in FIG. 55.

At Step S352, if the system controller 112 determines that HF=3 (Step S352: Yes), the system controller 112 sets HF to 1 (Step S355).

At Step S351, if the system controller 112 determines that the R dial 124c has rotated to the left (Step S351: rotated to left), the system controller 112 determines whether HF=1 (Step S356).

At Step S356, if the system controller 112 does not determine that HF=1 (Step S356: No), the system controller 112 performs a calculation such that HF=HF−1. In other words, the value of the variable HF is decremented (Step S357).

At Step S356, if the system controller 112 determines that HF=1 (Step S356: Yes), the system controller 112 sets HF to 3 (Step S358).

FIG. 57 is a diagram illustrating one example of the high resolution capture flag and the display icon. As illustrated in FIG. 57, the display controller 112a displays a corresponding display icon as illustrated in FIG. 57 on the high resolution capture mode icon W23 in the high resolution capture details selection menu screen W22 in accordance with the value of HF.

Figure 58:
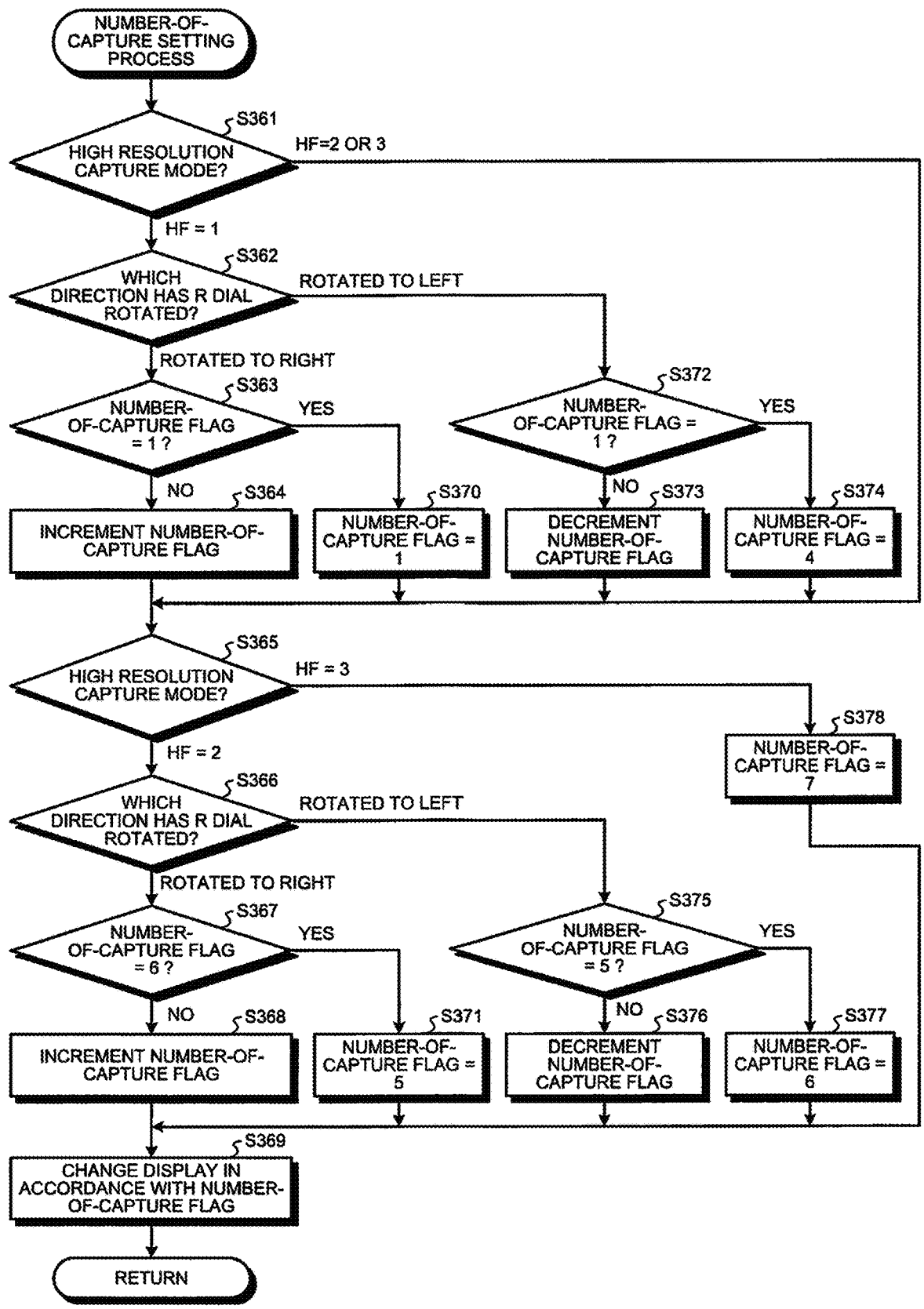
FIG. 58 is a flowchart illustrating an outline of a number-of-capture setting process in FIG. 55.

The number-of-capture setting process at Step S344 in FIG. 55 will be described below. FIG. 58 is a flowchart illustrating an outline of the number-of-capture setting process in FIG. 55.

As illustrated in FIG. 58, at Step S361, if the system controller 112 determines that HF=1 (Step S361: HF=1), the system controller 112 determines whether the R dial 124c has rotated to the right or to the left (Step S362).

At Step S362, if the system controller 112 determines that the R dial 124c has rotated to the right (Step S362: rotated to right), the system controller 112 determines whether the number-of-capture flag indicating the number of times of capture for each pixel displacement position is set to 1 (Step S363).

At Step S363, if the system controller 112 does not determine that the number-of-capture flag=1 (Step S363: No), the system controller 112 increments the number-of-capture flag (Step S364).

Subsequently, at Step S365, if the system controller 112 determines that HF=2 (Step S365: HF=2), the system controller 112 determines whether the R dial 124c has rotated to the right or to the left (Step S366).

At Step S366, if the system controller 112 determines that the R dial 124c has rotated to the right (Step S366: rotated to right), the system controller 112 determines whether the number-of-capture flag=6 (Step S367).

At Step S367, if the system controller 112 does not determine that the number-of-capture flag=6 (Step S367: No), the system controller 112 increments the number-of-capture flag (Step S368). Thereafter, the display controller 112a changes display on the display unit 125 in accordance with the number-of-capture flag (Step S369). Thereafter, the imaging apparatus 100 returns to the subroutine in FIG. 55.

At Step S363, if the system controller 112 determines that the number-of-capture flag=1 (Step S363: Yes), the system controller 112 sets the number-of-capture flag to 1 (Step S370).

At Step S367, if the system controller 112 determines that the number-of-capture flag=6 (Step S367: Yes), the system controller 112 sets the number-of-capture flag to 5 (Step S371).

At Step S362, if the system controller 112 determines that the R dial 124c has rotated to the left (Step S362: rotated to left), the system controller 112 determines whether the number-of-capture flag=1 (Step S372).

At Step S372, if the system controller 112 does not determine that the number-of-capture flag=1 (Step S372: No), the system controller 112 decrements the number-of-capture flag (Step S373).

At Step S372, if the system controller 112 determines that the number-of-capture flag=1 (Step S372: Yes), the system controller 112 sets the number-of-capture flag to 4 (Step S374).

At Step S366, if the system controller 112 determines that the R dial 124*c* has rotated to the left (Step S366: rotated to left), the system controller 112 determines whether the number-of-capture flag=5 (Step S375).

At Step S375, if the system controller 112 does not determine that the number-of-capture flag=5 (Step S375: No), the system controller 112 decrements the number-of-capture flag (Step S376).

At Step S375, if the system controller 112 determines that the number-of-capture flag=5 (Step S375: Yes), the system controller 112 sets the number-of-capture flag to 6 (Step S377).

At Step S361, if the system controller 112 determines that HF=2 or 3 (Step S361: HF=2 or 3), the imaging apparatus 100 proceeds to Step S365.

At Step S365, if the system controller 112 determines that HF=3 (Step S365: HF=3), the system controller 112 sets the number-of-capture flag to 7 (Step S378).

FIG. 59 is a diagram illustrating an example of the number-of-capture flag. As illustrated in FIG. 59, the display controller 112*a* displays a corresponding number illustrated in FIG. 59 on the number-of-capture icon W24 in the high resolution capture details selection menu screen W22 in accordance with a value of the number-of-capture flag. The numbers of capture, such as 2, 4, and 8, associated with number-of-capture flags 1, 2, and 3 indicate that the numbers of times of pixel displacement are 2, 4, and 8, and capture is performed once at each pixel displacement position. Further, the numbers of capture, such as 16, 32, and 64, associated with number-of-capture flags 4, 5, and 6 indicate that the number of times of pixel displacement is 8 in each case, and capture is performed twice, four times, and eight times at each pixel displacement position. Furthermore, a number-of-capture flag 7 is a setting for changing the number of times of pixel displacement and the number of capture at each pixel displacement position in accordance with an amount of a shake or the like.

Figure 60:
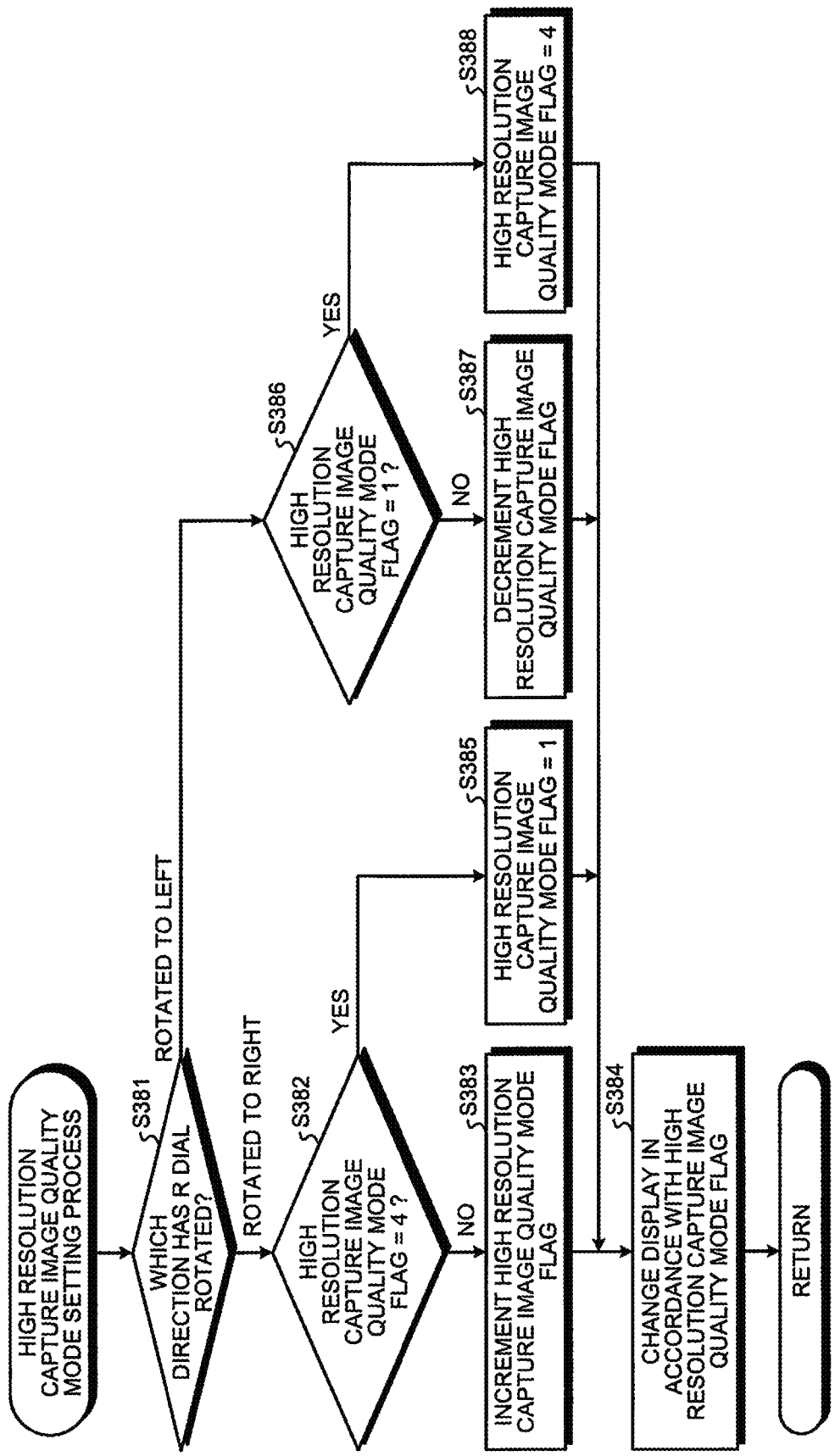
FIG. 60 is a flowchart illustrating an outline of a high resolution capture image-quality mode setting process in FIG. 55.

The high resolution capture image quality mode setting process described at Step S345 in FIG. 55 will be described. FIG. 60 is a flowchart illustrating an outline of the high resolution capture image quality mode setting process in FIG. 55.

As illustrated in FIG. 60, first, the system controller 112 determines whether the R dial 124*c* has rotated to the right or to the left (Step S381).

At Step S381, if the system controller 112 determines that the R dial 124*c* has rotated to the right (Step S381: rotated to right), the system controller 112 determines whether the high resolution capture image quality mode flag=4 (Step S382).

At Step S382, if the system controller 112 does not determine that the high resolution capture image quality mode flag=4 (Step S382: No), the system controller 112 increments the high resolution capture image quality mode flag (Step S383).

Thereafter, the display controller 112*a* changes display on the display unit 125 in accordance with the high resolution capture image quality mode flag (Step S384). Thereafter, the imaging apparatus 100 returns to the subroutine in FIG. 55.

At Step S382, if the system controller 112 determines that the high resolution capture image quality mode flag=4 (Step S382: Yes), the system controller 112 sets the high resolution capture image quality mode flag to 1 (Step S385).

At Step S381, if the system controller 112 determines that the R dial 124*c* has rotated to the left (Step S381: rotated to left), the system controller 112 determines whether the high resolution capture image quality mode flag=1 (Step S386).

At Step S386, if the system controller 112 does not determine that the high resolution capture image quality mode flag=1 (Step S386: No), the system controller 112 decrements the high resolution capture image quality mode flag (Step S387).

At Step S386, if the system controller 112 determines that the high resolution capture image quality mode flag=1 (Step S386: Yes), the system controller 112 sets the high resolution capture image quality mode flag to 4 (Step S388).

FIG. 61 is a diagram illustrating an example of the high resolution capture image quality mode flag. As illustrated in FIG. 61, the display controller 112*a* displays the high resolution capture image quality mode on the high resolution capture image quality mode icon W25 in the high resolution capture details selection menu screen W22 in accordance with the value of the high resolution capture image quality mode flag.

Figure 62:
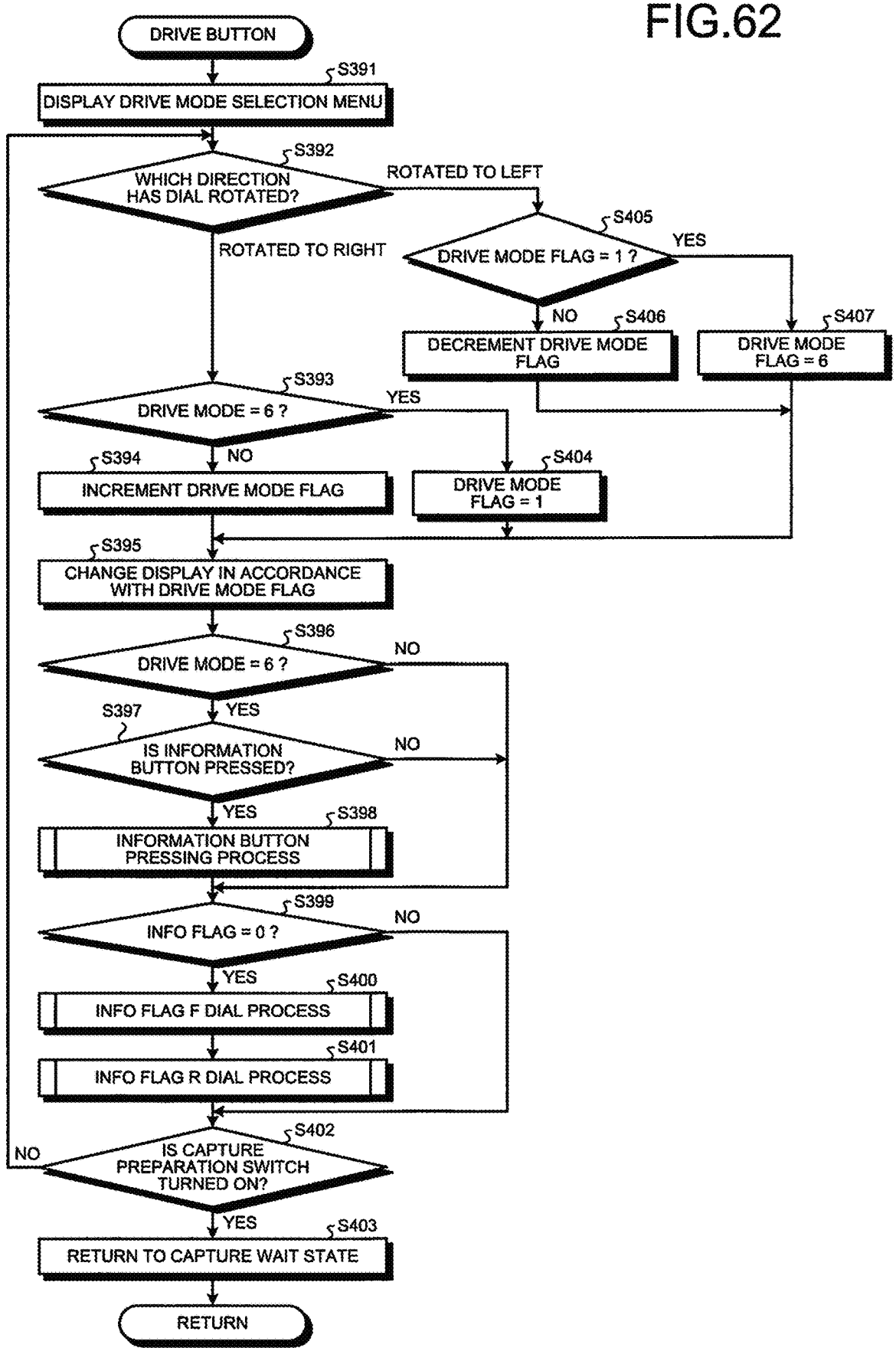
FIG. 62 is a flowchart illustrating an outline of a drive button process in FIG. 7.

The drive button process described at Step S30 in FIG. 7 will be described below. FIG. 62 is a flowchart illustrating an outline of the drive button process in FIG. 7.

As illustrated in FIG. 62, first, the display controller 112*a* causes the display unit 125 to display the drive mode selection menu (Step S391). FIG. 63 is a diagram illustrating an example of the drive mode selection menu. As illustrated in FIG. 63, the display controller 112*a* displays a drive mode selection menu screen W26 in a superimposed manner on the live view screen W17 on the display unit 125. In the upper side of the drive mode selection menu screen W26, a selection mode display screen W27 for displaying the selected drive mode is displayed. FIG. 63 illustrates an example in which a single shot capture mode (silent) is selected as the drive mode.

As illustrated in FIG. 62, first, the system controller 112 determines whether the F dial 124*b* or the R dial 124*c* is rotated to the right or to the left (Step S392).

At Step S392, if the system controller 112 determines that the F dial 124*b* or the R dial 124*c* has rotated to the right (Step S392: rotated to right), the system controller 112 determines whether the drive mode flag=6 (Step S393).

At Step S393, if the system controller 112 does not determine that the drive mode flag=6 (Step S393: No), the system controller 112 increments the drive mode flag (Step S394).

Thereafter, the display controller 112*a* changes display on the display unit 125 in accordance with the drive mode flag (Step S395).

Subsequently, at Step S396, if the system controller 112 determines that the drive mode flag=6 (Step S396: Yes), the system controller 112 determines whether the INFORMATION button 124*d* is pressed (Step S397).

At Step S397, if the system controller 112 determines that the INFORMATION button 124*d* is pressed (Step S397: Yes), the system controller 112 performs the INFORMATION button pressing process (Step S398). Details of the INFORMATION button pressing process will be described later.

Subsequently, at Step S399, if the system controller 112 determines that INFO flag=0 (Step S399: Yes), the system controller 112 performs processes at Steps S400 and S401 similarly to Steps S316 and S317 in FIG. 52.

At Step S402, if the capture instruction operation button 124a is pressed halfway and the capture preparation switch enters the ON state (Step S402: Yes), the imaging apparatus 100 terminates the drive button process, returns to the capture wait state (Step S403), and returns to the subroutine in FIG. 7.

At Step S402, if the capture instruction operation button 124a is not pressed halfway and the capture preparation switch does not enter the ON state (Step S402: No), the imaging apparatus 100 proceeds to Step S392.

At Step S393, if the system controller 112 determines that the drive mode flag=6 (Step S393: Yes), the system controller 112 sets the drive mode flag to 1 (Step S404).

At Step S396, if the system controller 112 does not determine that the drive mode flag=6 (Step S396: No), the imaging apparatus 100 proceeds to Step S399.

At Step S397, if the system controller 112 determines that the INFORMATION button 124d is not pressed (Step S397: No), the imaging apparatus 100 proceeds to Step S399.

At Step S399, if the system controller 112 does not determine that the INFO flag=0 (Step S399: No), the imaging apparatus 100 proceeds to Step S402.

At Step S392, if the system controller 112 determines that the F dial 124b or the R dial 124c has rotated to the left (Step S392: rotated to left), the system controller 112 determines whether the drive mode flag=1 (Step S405).

At Step S405, if the system controller 112 does not determine that the drive mode flag=1 (Step S405: No), the system controller 112 decrements the drive mode flag (Step S406).

At Step S405, if the system controller 112 determines that the drive mode flag=1 (Step S405: Yes), the system controller 112 sets the drive mode flag to 6 (Step S407).

FIG. 64 is a diagram illustrating an example of the drive mode flag. As illustrated in FIG. 64, the display controller 112a displays, in a highlighted manner, any of the drive modes in the drive mode selection menu screen W26 in accordance with the value of the drive mode flag.

Figure 65:
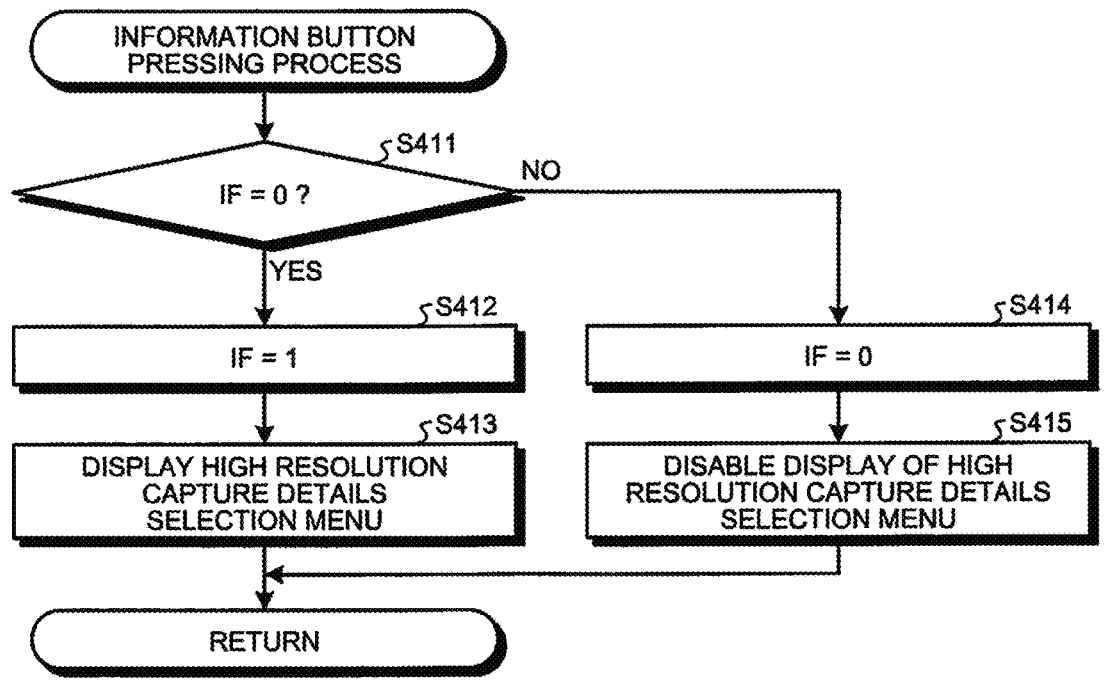
FIG. 65 is a flowchart illustrating an outline of an INFORMATION button pressing process in FIG. 62.

The INFORMATION button pressing process described at Step S398 in FIG. 62 will be described. FIG. 65 is a flowchart illustrating an outline of the INFORMATION button pressing process in FIG. 62.

As illustrated in FIG. 65, at Step S411, if the system controller 112 determines that INFO flag (IF)=0 (Step S411: Yes), the system controller 112 sets IF to 1 (Step S412).

Then, the display controller 112a causes the display unit 125 to display the high resolution capture details selection menu screen W22 (Step S413).

At Step S411, if the system controller 112 does not determine that IF=0 (Step S411: No), the system controller 112 sets IF to 0 (Step S414).

Then, the display controller 112a deletes or darkens the display of the high resolution capture details selection menu screen W22 on the display unit 125 (Step S415).

Figure 66:
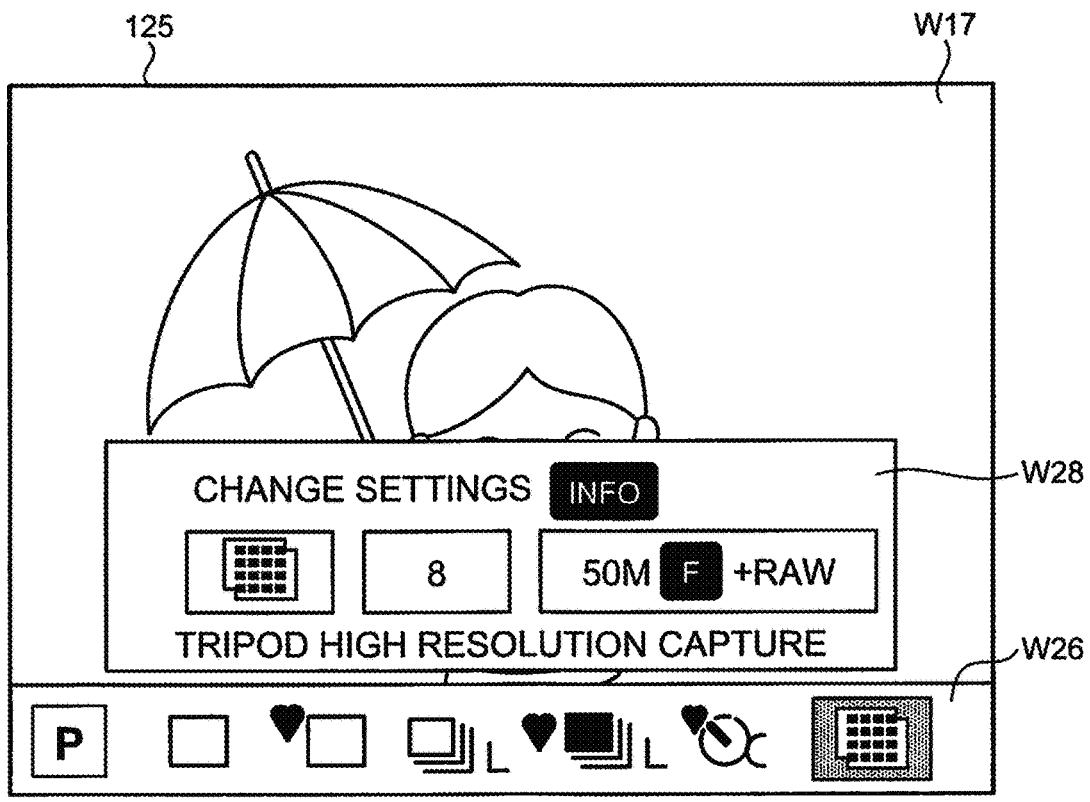
FIG. 66 is a diagram illustrating a state in which the high resolution capture details selection menu is disabled.
Figure 67:
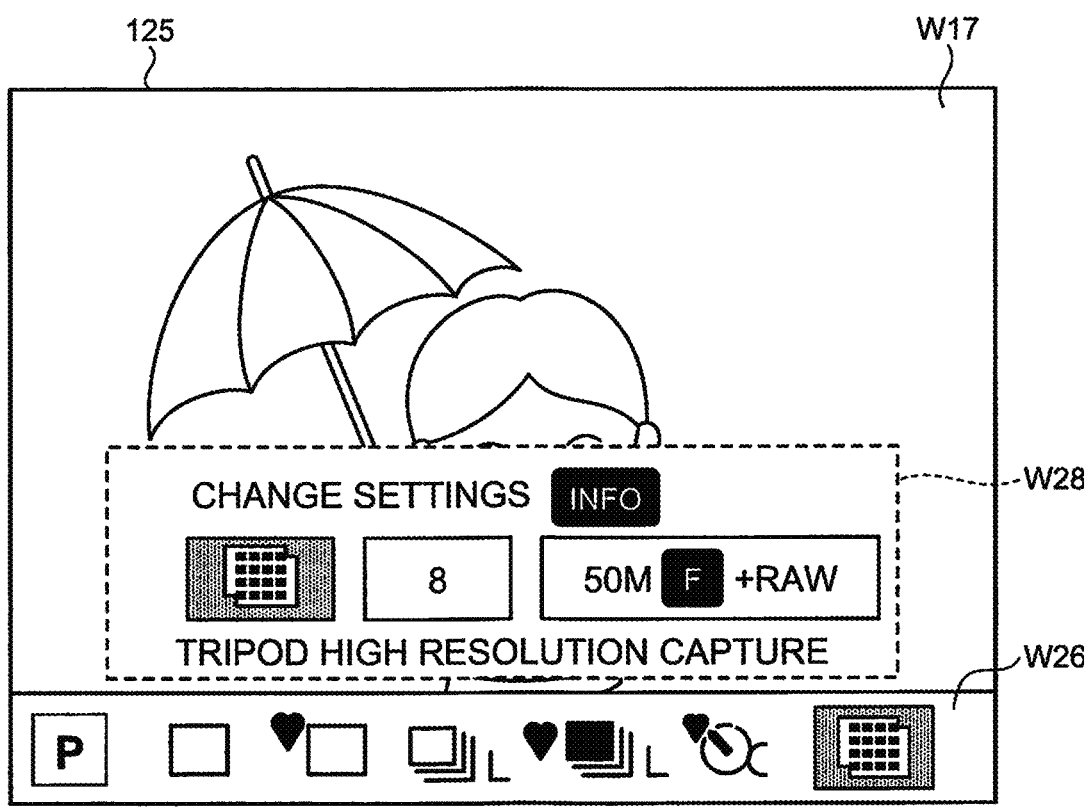
FIG. 67 is a diagram illustrating a state in which the high resolution capture details selection menu is enabled.

Through the INFORMATION button pressing process as described above, it is possible to switch between an enabled state and a disabled state of the high resolution capture details selection menu. FIG. 66 is a diagram illustrating a state in which the high resolution capture details selection menu is disabled. FIG. 67 is a diagram illustrating a state in which the high resolution capture details selection menu is enabled. As illustrated in FIG. 67, in the state in which a high resolution capture details selection menu screen W28 on which the live view screen W17 is superimposed is enabled, it is possible to change the setting of the high resolution capture by operating the F dial 124b and the R dial 124c. In contrast, as illustrated in FIG. 66, in the state in which the high resolution capture details selection menu screen W28 superimposed on the live view screen W17 is disabled, it is difficult to change the setting of the high resolution capture, but it is possible to change the drive mode in the drive mode selection selection menu screen W26 by operating the F dial 124b and the R dial 124c.

Figure 68:
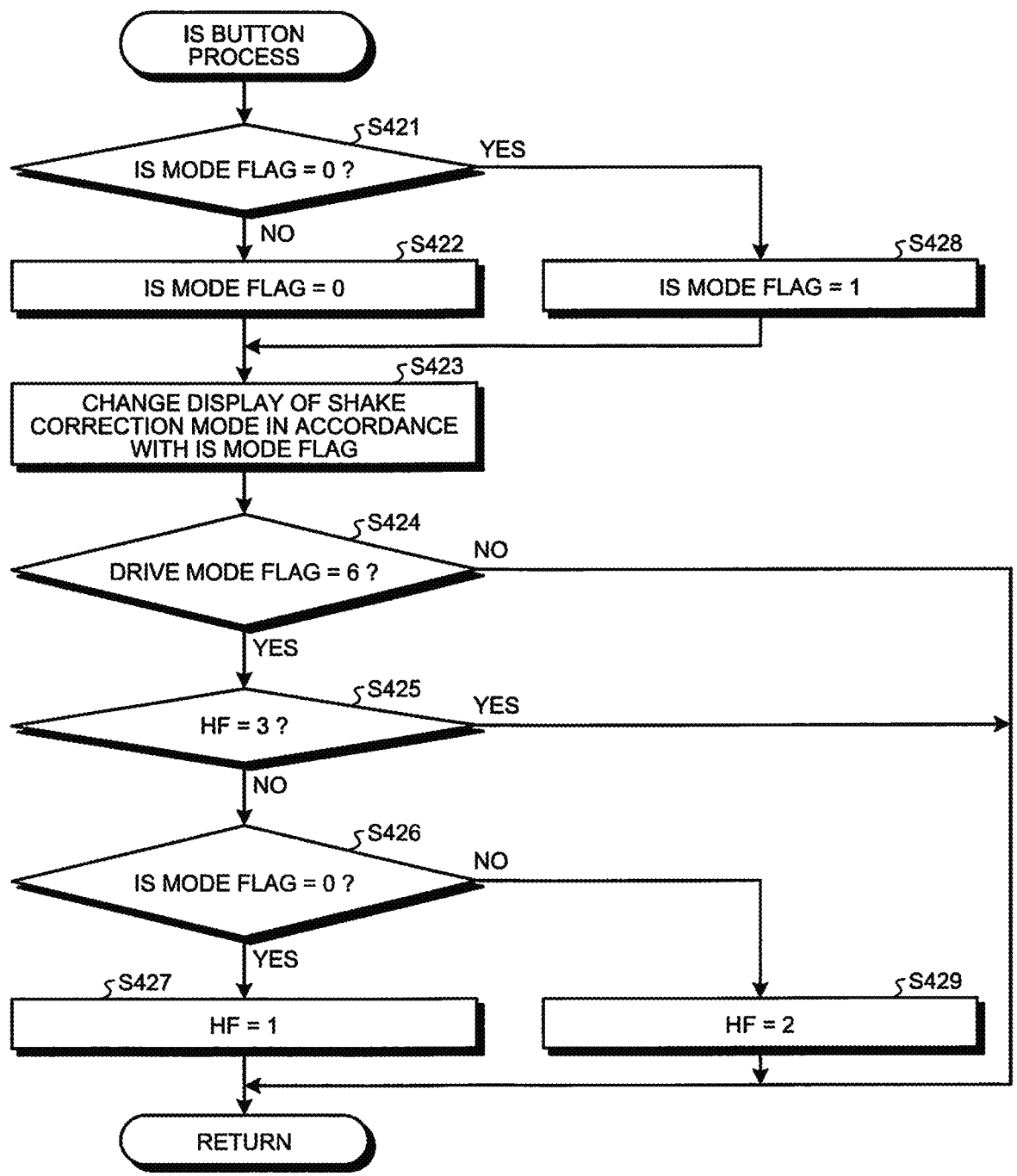
FIG. 68 is a flowchart illustrating an outline of an IS button process in FIG. 7.

The IS button process described at Step S32 in FIG. 7 will be described below. FIG. 68 is a flowchart illustrating an outline of the IS button process in FIG. 7.

As illustrated in FIG. 68, at Step S421, if the system controller 112 does not determine that the IS mode flag=0 (Step S421: No), the system controller 112 sets the IS mode flag to 0 (Step S422).

Thereafter, the display controller 112a changes display of the shake correction mode on the display unit 125 in accordance with the IS mode flag (Step S423).

FIG. 69 is a diagram illustrating an example of the IS mode flag. As illustrated in FIG. 69, the IS mode flag being set to 0 indicates that the shake correction is turned off, and "IS-OFF" is displayed in the live view screen W17 on the display unit 125. In contrast, the IS mode flag being set to 1 indicates that the shake correction is turned on, and "IS-ON" is displayed in the live view screen W17 on the display unit 125.

At Step S424, if the system controller 112 determines that the drive mode flag=6 (Step S424: Yes), the system controller 112 determines whether the high resolution capture flag (HF)=3 (Step S425).

At Step S425, if the system controller 112 does not determine that HF=3 (Step S425: No), the system controller 112 determines whether the IS mode flag=0 (Step S426).

At Step S426, if the system controller 112 determines that the IS mode flag=0 (Step S426: Yes), the system controller 112 sets HF to 1 (Step S427). Thereafter, the imaging apparatus 100 returns to the subroutine in FIG. 7.

At Step S421, if the system controller 112 determines that the IS mode flag=0 (Step S421: Yes), the system controller 112 sets the IS mode flag to 1 (Step S428).

At Step S426, if the system controller 112 does not determine that the IS mode flag=0 (Step S426: No), the system controller 112 sets HF to 2 (Step S429). Thereafter, the imaging apparatus 100 returns to the subroutine in FIG. 7.

Through the IS button process as described above, if the shake correction is turned off (IS mode flag=0), the tripod high resolution capture (HF=1) is set, and, if the shake correction is turned on (the IS mode flag=1), the handheld high resolution capture (HF=2) is set. In this manner, in the high resolution capture, the high resolution capture mode is switched in conjunction with the operation of turning on and off the shake correction; therefore, it is possible to prevent a situation in which the user sets only one of two related functions while forgetting to set the other one of the functions, a situation in which a functional failure occurs due to functional contradiction, and a situation in which a functional failure occurs due to functional contradiction caused by the order of function setting.

Additional advantages and modifications will readily occur to those skilled in the art. Therefore, the disclosure in its broader aspects is not limited to the specific details and representative embodiments shown and described herein. Accordingly, various modifications may be made without departing from the spirit or scope of the general inventive concept as defined by the appended claims and their equivalents.

In a space in which only a small imaging sensor, such as an endoscope or a laparoscope, with a small diameter can be inserted, it is difficult to improve resolution of the imaging sensor; however, by applying a shake that is transmitted to the imaging sensor and by applying the present disclosure, it is possible to improve the resolution.

What is claimed is:

1. An imaging apparatus comprising:
an imager including an imaging sensor configured to acquire an optical image of a subject; and
a processor comprising hardware, the processor being configured to:
perform pixel displacement to displace a positional relationship between the subject and the imager in a unit of less than a pixel pitch;
detect an amount and a direction of a shake;
perform shake correction to correct the positional relationship between the subject and the imager based on a detection result of the amount and the direction of the shake;
perform first imaging for a first predetermined number of times for each position of the pixel displacement to generate a first group of images;
combine the images of the first group to generate a first high-resolution image;
perform second imaging for a second predetermined number of times for each position of the pixel displacement to generate a second group of images, the second predetermined number of times being greater than the first predetermined number of times; and
combine the images of the second group to generate a second high-resolution image,
wherein the processor is further configured to switch between the first imaging and the second imaging,
wherein the processor is configured to switch between the first imaging and the second imaging in response to an input of a user, and
wherein the processor is configured to cause a display to display a prohibition warning and a recommendation warning simultaneously based on the detection result of the amount and the direction of the shake, the prohibition warning being a warning of prohibiting one or both of the first imaging and the second imaging, the recommendation warning being a warning of, when one of the first imaging and the second imaging is prohibited, performing another imaging of the first imaging and the second imaging, the other imaging being not prohibited.

2. The imaging apparatus according to claim 1, wherein the processor is configured to switch between the first imaging and the second imaging based on the detection result of the amount and the direction of the shake.

3. The imaging apparatus according to claim 1, wherein the processor allows the first imaging that generates the images of the first group and the second imaging that generates the images of the second group to be performed alternatively and continuously, and is configured to perform at least one of the combining the images of the first group to generate the first high-resolution image and the combining the images of the second group to generate the second high-resolution image.

4. The imaging apparatus according to claim 1, wherein the processor is configured to perform the first imaging while holding the shake correction.

5. The imaging apparatus according to claim 1, wherein the processor is configured to change the second predetermined number based on the detection result of the amount and the direction of the shake.

6. An imaging apparatus comprising:
an imager including an imaging sensor configured to acquire an optical image of a subject; and
a processor comprising hardware, the processor being configured to:
perform pixel displacement to displace a positional relationship between the subject and the imager in a unit of less than a pixel pitch;
detect an amount and a direction of a shake;
perform shake correction to correct the positional relationship between the subject and the imager based on a detection result of the amount and the direction of the shake;
perform first imaging for a first predetermined number of times for each position of the pixel displacement to generate a first group of images;
combine the images of the first group to generate a first high-resolution image;
perform second imaging for a second predetermined number of times for each position of the pixel displacement to generate a second group of images, the second predetermined number of times being greater than the first predetermined number of times; and
combine the images of the second group to generate a second high-resolution image,
wherein based on the detection result of the amount and the direction of the shake,
the processor is configured to reduce the number of times the pixel displacement is performed in the second imaging to perform imaging so as to reduce a series of drive times for continuous capture as the amount of the shake is greater; and/or
the processor is configured to increase the number of times of imaging for the pixel displacement in the second imaging as the amount of the shake is greater.

7. An imaging apparatus comprising:
an imager including an imaging sensor configured to acquire an optical image of a subject;
a shutter configured to adjust exposure time; and
a processor comprising hardware, the processor being configured to:
perform pixel displacement to displace a positional relationship between the subject and the imager in a unit of less than a pixel pitch;
detect an amount and a direction of a shake;
perform shake correction to correct the positional relationship between the subject and the imager based on a detection result of the amount and the direction of the shake;
perform first imaging for a first predetermined number of times for each position of the pixel displacement to generate a first group of images;
combine the images of the first group to generate a first high-resolution image;
perform second imaging for a second predetermined number of times for each position of the pixel displacement to generate a second group of images, the second predetermined number of times being greater than the first predetermined number of times;

combine the images of the second group to generate a second high-resolution image; and limit, based on the detected amount of the shake, a lower limit value of a shutter speed in the second imaging such that a value of the shutter speed at which an amount of the shake becomes the pixel displacement or less is set by the shake correction.

8. An imaging apparatus comprising:
an imager including an imaging sensor configured to acquire an optical image of a subject;
a flash controller including a plurality of flash emission modes; and
a processor comprising hardware, the processor being configured to:
perform pixel displacement to displace a positional relationship between the subject and the imager in a unit of less than a pixel pitch;
detect an amount and a direction of a shake;
perform shake correction to correct the positional relationship between the subject and the imager based on a detection result of the amount and the direction of the shake;
perform first imaging for a first predetermined number of times for each position of the pixel displacement to generate a first group of images;
combine the images of the first group to generate a first high-resolution image;
perform second imaging for a second predetermined number of times for each position of the pixel displacement to generate a second group of images, the second predetermined number of times being greater than the first predetermined number of times;
combine the images of the second group to generate a second high-resolution image, wherein
when the flash controller does not prohibit the flash, the processor is configured to control the flash to perform a manual emission control with a same light emission intensity as an initial light emission intensity for the pixel displacement in the first imaging or in the second imaging except for a flash emission at an initial pixel displacement.

9. The imaging apparatus according to claim 1, wherein the processor provides a delay time between an input of an instruction for starting imaging and start of the imaging in the second imaging.

10. The imaging apparatus according to claim 1, wherein the processor is configured to detect image shifting in the unit of the pixel pitch or less in the images of the second group with respect to a reference image, cause the imaging sensor to perform the pixel displacement at a 0.5 pixel pitch to generate image data, and combine images that are obtained by shifting the generated image data in a unit of 1 pixel pitch to perform a position corrections.

11. A method of imaging, the method comprising:
performing pixel displacement to displace a positional relationship between a subject and an imager in a unit of less than a pixel pitch;
detecting an amount and a direction of a shake;
performing shake correction to correct the positional relationship between the subject and the imager based on a detection result of the amount and the direction of the shake; and
performing at least one of first high-resolution image generating process and second high-resolution image generating process, the first high-resolution image generating process including performing first imaging for a first predetermined number of times for each position of the pixel displacement to generate a first group of images, and combining the images of the first group to generate a first high-resolution image, the second high-resolution image generating process including performing second imaging for a second predetermined number of times for each position of the pixel displacement to generate a second group of images, and combining the images of the second group to generate a second high-resolution image, the second predetermined number of times being greater than the first predetermined number of times,
wherein based on the detection result of the amount and the direction of the shake,
the processor is configured to reduce the number of times the pixel displacement is performed in the second imaging to perform imaging so as to reduce a series of drive times for continuous capture as the amount of the shake is greater; and/or
the processor is configured to increase the number of times of imaging for the pixel displacement in the second imaging as the amount of the shake is greater.

12. A non-transitory computer-readable recording medium on which a program for imaging is recorded, the program instructing a processor to execute:
performing pixel displacement to displace a positional relationship between a subject and an imager in a unit of less than a pixel pitch;
detecting an amount and a direction of a shake;
performing shake correction to correct the positional relationship between the subject and the imager based on a detection result of the amount and the direction of the shake; and
performing at least one of first high-resolution image generating process and second high-resolution image generating process, the first high-resolution image generating process including performing first imaging for a first predetermined number of times for each position of the pixel displacement to generate a first group of images, combining the images of the first group to generate a first high-resolution image, the second high-resolution image generating process including performing second imaging for a second predetermined number of times for each position of the pixel displacement to generate a second group of images, and combining the images of the second group to generate a second high-resolution image, the second predetermined number of times being greater than the first predetermined number of times,
wherein based on the detection result of the amount and the direction of the shake,
the processor is configured to reduce the number of times the pixel displacement is performed in the second imaging to perform imaging so as to reduce a series of drive times for continuous capture as the amount of the shake is greater; and/or
the processor is configured to increase the number of times of imaging for the pixel displacement in the second imaging as the amount of the shake is greater.

13. The imaging apparatus according to claim 1, wherein the first imaging is a tripod high resolution capture, and the second imaging is a handheld high resolution capture.

14. The imaging apparatus according to claim 13, wherein the processor is further configured to automatically select one of the tripod high resolution capture and the handheld high resolution capture based on a determination of whether or not a shake amount exceeds a threshold.

15. The imaging apparatus according to claim 1, wherein both the first imaging and the second imaging perform at least eight displacements, some of the at least eight displacements being at least one pixel and one other of the at least eight displacements being less than one pixel.

* * * * *